United States Patent
Grinstaff et al.

(10) Patent No.: US 11,401,374 B2
(45) Date of Patent: Aug. 2, 2022

(54) POLY (ALKYL CARBONATE) ADHESIVES

(71) Applicant: Trustees of Boston University, Boston, MA (US)

(72) Inventors: Mark W. Grinstaff, Brookline, MA (US); Anjeza Beharaj, Park Ridge, IL (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 16/544,174

(22) Filed: Aug. 19, 2019

(65) Prior Publication Data

US 2020/0056038 A1    Feb. 20, 2020

Related U.S. Application Data

(60) Provisional application No. 62/823,871, filed on Mar. 26, 2019, provisional application No. 62/765,306, filed on Aug. 20, 2018.

(51) Int. Cl.
| | |
|---|---|
| C08G 64/34 | (2006.01) |
| C08L 69/00 | (2006.01) |
| C08G 64/02 | (2006.01) |
| C09J 7/38 | (2018.01) |
| C09J 169/00 | (2006.01) |
| C08G 64/32 | (2006.01) |

(52) U.S. Cl.
CPC ............ *C08G 64/34* (2013.01); *C08G 64/02* (2013.01); *C08G 64/0208* (2013.01); *C08G 64/32* (2013.01); *C08L 69/00* (2013.01); *C09J 7/38* (2018.01); *C09J 169/00* (2013.01); *C08L 2203/16* (2013.01)

(58) Field of Classification Search
CPC . C08G 64/0208; C08G 64/0225; C08G 64/34
See application file for complete search history.

(56) References Cited

U.S. PATENT DOCUMENTS

| | | | |
|---|---|---|---|
| 4,636,432 A | 1/1987 | Shibano et al. | |
| 4,895,747 A | 1/1990 | Birkholz et al. | |
| 5,409,189 A | 4/1995 | Luhmann et al. | |

(Continued)

FOREIGN PATENT DOCUMENTS

| | | | | |
|---|---|---|---|---|
| WO | 2012/154849 A1 | 11/2012 | | |
| WO | WO-2016086118 A1 | * 6/2016 | ........... | A61K 31/337 |
| WO | WO-2016208281 A | * 12/2016 | ......... | C08G 64/0208 |

OTHER PUBLICATIONS

Ekladious, Iriny et al., "Synthesis of poly (1,2-gycerol carbonate)-paclitaxel conjugates and their utility as a single high-dose replacement for multi-dose treatment regimens in peritoneal cancer", published online Oct. 20, 2017, Chemical Science, 8, 8443-8450 (Year: 2017).*

(Continued)

*Primary Examiner* — Ling Siu Choi
*Assistant Examiner* — David L Miller
(74) *Attorney, Agent, or Firm* — Nixon Peabody LLP; Ronald I. Eisenstein; Ravinderjit Braich

(57) ABSTRACT

The invention provides polymer compositions, compounds, processes, and methods of use of the polymers for biodegradable consumer plastics, adhesives, e.g., bioadhesives, pressure sensitive adhesives and thermos-responsive adhesives.

30 Claims, 8 Drawing Sheets
(7 of 8 Drawing Sheet(s) Filed in Color)

(56) References Cited

U.S. PATENT DOCUMENTS

| | | | |
|---|---|---|---|
| 5,441,193 A | 8/1995 | Gravener | |
| 5,752,964 A | 5/1998 | Francis et al. | |
| 6,299,631 B1 | 10/2001 | Shalaby | |
| 6,592,597 B2 | 7/2003 | Grant et al. | |
| 7,708,180 B2 | 5/2010 | Murray et al. | |
| 7,780,685 B2 | 8/2010 | Hunt et al. | |
| 7,928,183 B2* | 4/2011 | Truong Dinh | C08G 64/0208 528/176 |
| 8,247,520 B2* | 8/2012 | Allen | C08G 64/0208 528/196 |
| 8,487,038 B2 | 7/2013 | Noordover et al. | |
| 8,575,245 B2 | 11/2013 | Lapointe et al. | |
| 10,172,617 B2 | 1/2019 | Shelton, IV et al. | |
| 2004/0086479 A1 | 5/2004 | Grinstaff et al. | |
| 2006/0223973 A1 | 10/2006 | Hinz et al. | |
| 2011/0172785 A1 | 7/2011 | Wolinsky et al. | |
| 2015/0079379 A1 | 3/2015 | Suzuki et al. | |
| 2018/0230267 A1 | 8/2018 | Repsol et al. | |
| 2018/0298251 A1* | 10/2018 | Miyazaki | C09J 7/20 |

OTHER PUBLICATIONS

Vieville, Justine et al., "Polydispersity index of polymers revealed by Dosy Nmr" 2011 Journal of Magnetic Resonance 212 p. 169-173 (Year: 2011).*

Ahn. "Perspectives on mussel-inspired wet adhesion." Journal of the American Chemical Society 139(30): 10166-10171 (2017).

Byrne et al. "Alternating copolymerization of limonene oxide and carbon dioxide." Journal of the American Chemical Society 126(37): 11404-11405 (2004).

Deng et al. "The effect of hyperbranched polyglycerol coatings on drug delivery using degradable polymer nanoparticles." Biomaterials 35(24): 6595-6602 (2014).

Ekinci et al. "Polyglycerol-based polymer network films for potential biomedical applications." Journal of Materials Chemistry 22(39): 21100-21109 (2012).

Ekladious et al. "Synthesis of poly (1, 2-glycerol carbonate)-paclitaxel conjugates and their utility as a single high-dose replacement for multi-dose treatment regimens in peritoneal cancer." Chemical science 8(12): 8443-8450 (2017).

Engler et al. "Hydrophilic polycarbonates: promising degradable alternatives to poly (ethylene glycol)-based stealth materials." Macromolecules 48(6): 1673-1678 (2015).

Felton et al. "Influence of surfactants in aqueous-based polymeric dispersions on the thermomechanical and adhesive properties of acrylic films." Drug development and industrial pharmacy 26(2): 205-210 (2000).

Geschwind et al. "Poly (1,2-glycerol carbonate): a fundamental polymer structure synthesized from CO2 and glycidyl ethers." Macromolecules 46(9): 3280-3287 (2013).

Gillies et al. "Dendrimers and dendritic polymers in drug delivery." Drug Discov Today 10(1): 35-43 (2005).

Gross et al. "Biodegradable polymers for the environment." Science 297(5582): 803-807 (2002).

Guillaume et al. "Polycarbonates and green chemistry." Journal of Applied Polymer Science 131(5): 1-2 (2014).

Lee et al. "A reversible wet/dry adhesive inspired by mussels and geckos." Nature 448(7151): 338-341 (2007).

Lin et al. "Adhesion mechanisms of the mussel foot proteins mfp-1 and mfp-3." Proceedings of the National Academy of Sciences 104(10): 3782-3786 (2007).

Lu et al. "Design of highly active binary catalyst systems for CO2/epoxide copolymerization: Polymer selectivity, enantioselectivity, and stereochemistry control." Journal of the American Chemical Society 128(5): 1664-1674 (2006).

Martin et al. "Terpolymers derived from limonene oxide and carbon dioxide: access to cross-linked polycarbonates with improved thermal properties." Macromolecules 49(17): 6285-6295 (2016).

Mazzoni et al. "Cross-linking effect on dentin bond strength and MMPs activity." Dental Materials 34(2): 288-295 (2018).

Moyano et al. "Viscoelastic and adhesion properties of hot-melts made with blends of ethylene-co-n-butyl acrylate (EBA) and ethylene-co-vinyl acetate (EVA) copolymers." International Journal of Adhesion and Adhesives 88: 34-42 (2019).

Mugabe, et al. "Paclitaxel incorporated in hydrophobically derivatized hyperbranched polyglycerols for intravesical bladder cancer therapy." BJU international 103(7): 978-986 (2009).

Ricapito et al. "Synthetic biomaterials from metabolically derived synthons." Chemical reviews 116(4): 2664-2704 (2016).

Sugimoto. "Recent progress in the synthesis of polymers based on carbon dioxide." Pure and applied chemistry 78 (10): 1823-1834 (2006).

Taherimehr et al. "Green polycarbonates prepared by the copolymerization of CO2 with epoxides." Journal of Applied Polymer Science 131(21): 1-17 (2014).

Thomas et al. "Beyond poly (ethylene glycol): linear polyglycerol as a multifunctional polyether for biomedical and pharmaceutical applications." Biomacromolecules 15(6): 1935-1954 (2014).

Wei et al. "Multivalent anchored and crosslinked hyperbranched polyglycerol monolayers as antifouling coating for titanium oxide surfaces." Colloids and Surfaces B: Biointerfaces 122: 684-692 (2014).

Wolinsky et al. "Prevention of in vivo lung tumor growth by prolonged local delivery of hydroxycamptothecin using poly (ester-carbonate)-collagen composites." Journal of Controlled Release 144(3): 280-287 (2010).

Wolinsky et al. "Poly (carbonate ester) s based on units of 6-hydroxyhexanoic acid and glycerol." Macromolecules 40(20): 7065-7068 (2007).

Zawaneh et al. "Design of an injectable synthetic and biodegradable surgical biomaterial." Proceedings of the National Academy of Sciences 107(24): 11014-11019(2010).

Zhao et al. "Bio-inspired reversible underwater adhesive." Nature communications 8(1): 1-8 (2017).

Zhao et al. "Fully bio-based soybean adhesive in situ cross-linked by interactive network skeleton from plant oil-anchored fiber." Industrial crops and products 122: 366-374 (2018).

Zhong et al. "Strong underwater adhesives made by self-assembling multi-protein nanofibres." Nature nanotechnology 9(10): 858-866 (2014).

Zhou et al. "Recent advances in gecko adhesion and friction mechanisms and development of gecko-inspired dry adhesive surfaces." Friction 1(2): 114-129 (2013).

Zhang et al., "Recent Advances in Glycerol Polymers: Chemistry and Biomedical Applications", Macromol Rapid Commun., 35, (22.), 1906-1924, (2014).

Sanders et al., "A Simple and Efficent Synthesis of Functionalized Cyclic Carbonate Monomers Using Versatile Pentafluorophenyl Ester Intermediate", J. Am. Chem. Soc., 132, 14724-14726, (2010).

Coates et al., "Discrete Metal—Based Catalysts for the Copolymerization of CO2 and Epoxides: Discovery, Reactivity, Optimization, and Mechanism", Angewandte Chemie International Edition 43:6618-6639 (2004).

Cohen et al., "Cobalt Catalysts for the Alternating Copolymerization of Propylene Oxide and Carbon Dioxide Combining High Activity and Selectivity", Journal of the American Chemical Society 127(31):10869-10878 (2005).

Lu et al., "Cobalt catalysts for the coupling of CO 2 and epoxides to provide polycarbonates and cyclic carbonates", Chemical Society Reviews 41:1462-1484 (2012).

Lu et al., "Highly Active, Binary Catalyst Systems for the Alternating Copolymerization of CO2 and Epoxides under Mild Conditions", Angewandte Chemie International Edition 43:3574-3577 (2004).

Lukaszczyk et al., "Synthesis and Modification of Functional Polycarbonates with Pendant Allyl Groups", Macromolecular Bioscience 1(7):282-289 (2001).

Nakano et al., "Selective Formation of Polycarbonate over Cyclic Carbonate: Copolymerization of Epoxides with Carbon Dioxide

(56) References Cited

OTHER PUBLICATIONS

Catalyzed by a Colbalt(III) Complex with a Piperidinium End-Capping Arm", Angewandte Chemie International Edition 45:7274-7277 (2006).
Rokicki G., "Aliphatic cyclic carbonates and spiroorthocarbonates as monomers", Progress in Polymer Science 25:259-342 (2000).
Zhang et al., "Synthesis and Characterization of Poly(glyceric Acid Carbonate):A Degradable Analogue of Poly (acrylic Acid)", Journal of the American Chemical Society 137:12660-12666 (2015).
Zhang et al., "Synthesis of Atactic and Isotactic Poly(1,2-glycerol carbonate)s: Degradable Polymers for Biomedical and Pharmaceutical Applications", Journal of the American Chemical Society 135:6806-6809 (2013).
Anderson et al."The influence of block copolymer microstructure on the toughness of compatibilized polylactide/polyethylene blends." Polymer 45(26): 8809-8823 (2004).
Autumn et al. "Adhesive force of a single gecko foot-hair." Nature 405(6787): 681-685 (2000).
Baik et al. "Bioinspired adhesive architectures: from skin patch to integrated bioelectronics."Advanced Materials 1803309: 1-18 (2019).
Beharaj et al.. "Poly (Alkyl Glycidate Carbonate) s as Degradable Pressure-Sensitive Adhesives." Angewandte Chemie International Edition 58(5): 1407-1411 (2019).
Chen et al. "Development of antifouling hyperbranched polyglycerol layers on hydroxyl poly-p-xylylene coatings." Langmuir 33(51): 14657-14662 (2017).
Cho et al. "Functionalizable Hydrophilic Polycarbonate, Poly (5-methyl-5-(2-hydroxypropyl) aminocarbonyl-1, 3-dioxan-2-one). Designed as a Degradable Alternative for PHPMA and PEG." Macromolecules 48(24): 8797-8805 (2015).
Darensbourg et al. "Postpolymerization functionalization of copolymers produced from carbon dioxide and 2-vinyloxirane: amphiphilic/water-soluble CO2-based polycarbonates." Macromolecules 47(12): 3806-3813 (2014).
Diaz et al. "Reactive compatibilization of PE/PS blends. Effect of copolymer chain length on interfacial adhesion and mechanical behavior." Polymer 48(4): 1058-1065 (2007).
Kamphuis et al. "CO 2-fixation into cyclic and polymeric carbonates: principles and applications." Green chemistry 21 (3): 406-448 (2019).
Kawabe et al. "Effects of surface modification by oxygen plasma on peel adhesion of pressure-sensitive adhesive tapes." Journal of applied polymer science 78(7): 1392-1401 (2000).
Khan et al. "Natural rubber-based pressure-sensitive adhesives: a review." Journal of Polymers and the Environment 19(3): 793-811 (2011).
Konieczynska et al. "Synthesis of aliphatic poly (ether 1, 2-glycerol carbonate) s via copolymerization of CO2 with glycidyl ethers using a cobalt salen catalyst and study of a thermally stable solid polymer electrolyte." ACS Macro Letters 4(5): 533-537 (2015).
Kumar, et al. "Antimicrobial peptide-polymer conjugates with high activity: Influence of polymer molecular weight and peptide sequence on antimicrobial activity, proteolysis, and biocompatibility." ACS applied materials & interfaces 9(43) 37575-37586 (2017).
Li et al. "Construction of functional coatings with durable and broad-spectrum antibacterial potential based on mussel-nspired dendritic polyglycerol and in situ-formed copper nanoparticles." ACS applied materials & interfaces 9(40): 35411-35418 (2017).
Li et al. "Enhanced Adhesion of Carbon Nanotubes by Dopamine Modification." Langmuir 35(13): 4527-4533 (2019).
Lu et al. "CO2 copolymers from epoxides: catalyst activity, product selectivity, and stereochemistry control." Accounts of chemical research 45(10): 1721-1735 (2012).
Maysinger et al. "Dendritic Polyglycerol Sulfates in the Prevention of Synaptic Loss and Mechanism of Action on Glia." ACS chemical neuroscience 9(2): 260-271 (2017).
Nakamura et al. "Tack and viscoelastic properties of an acrylic block copolymer/tackifier system." International Journal of Adhesion and Adhesives 29(8): 806-811 (2009).
Nakano et al. "Copolymerization of epoxides with carbon dioxide catalyzed by iron-corrole complexes: synthesis of a crystalline copolymer." Journal of the American Chemical Society 135(23): 8456-8459 (2013).
Nozaki et al. "Optically active polycarbonates: asymmetric alternating copolymerization of cyclohexene oxide and carbon dioxide." Journal of the American Chemical Society 121(47): 11008-11009 (1999).
Poland. "A quest for polycarbonates provided via sustainable epoxide/CO 2 copolymerization processes." Green Chemistry 19(21): 4990-5011 (2017).
Qin et al. "Cobalt-Based Complexes for the Copolymerization of Propylene Oxide and CO2: Active and Selective Catalysts for Polycarbonate Synthesis." Angewandte Chemie International Edition 42(44): 5484-5487 (2003).
Ray et al. "Polycarbonate and poly (carbonate-ester) s synthesized from biocompatible building blocks of glycerol and lactic acid." Macromolecules 36(10): 3557-3562 (2003).
Ren et al. "Highly active, bifunctional Co (III)-salen catalyst for alternating copolymerization of CO2 with cyclohexene oxide and terpolymerization with aliphatic epoxides." Macromolecules 43(3): 1396-1402 (2010).
Sasaki et al. "The effect of tackifier on phase structure and peel adhesion of a triblock copolymer pressure-sensitive adhesive." International Journal of Adhesion and Adhesives 28(7): 372-381 (2008).
Schneider et al. "Expanding the DOPA universe by genetically encoded, mussel-inspired bioadhesives for material sciences and medicine." Chembiochem: a European journal of chemical biology doi: 10.1002/cbic.201900030 (2019).
Sun et al. "A review on mechanical properties of pressure sensitive adhesives." International Journal of Adhesion and Adhesives 41: 98-106 (2013).
Tic et al. "Properties of a PVAc emulsion adhesive using a nonphthalate plasticizer obtained by condensation of 2-methylpropanal." Journal of Adhesion Science and Technology 32(17): 1861-1875 (2018).
Tsai et al. "Environmentally Benign CO2-Based Copolymers: Degradable Polycarbonates Derived from Dihydroxybutyric Acid and Their Platinum-Polymer Conjugates." Journal of the American Chemical Society 138(13): 4626-4633 (2016).
Webster. "Recent developments in pressure-sensitive adhesives for medical applications." International Journal of Adhesion and Adhesives 17(1): 69-73 (1997).
Wu et al. "Perfectly alternating copolymerization of CO2 and epichlorohydrin using cobalt (III)-based catalyst systems." Journal of the American Chemical Society 133(38): 15191-15199 (2011).
Zhang et al."Terpolymenzation of benzyl glycidyl etner, propylene oxide, and CO2 using binary and bifunctional [rac-SalcyCoIIIX] complexes and the thermal and mechanical properties of the resultant poly (benzyl 1, 2-glycero-co-propylene carbonate)s and poly (1,2-glycerol-co-propylene carbonate)s." Journal of Applied Polymer Science 131(5): 1-7 (2014).
Zhao et al. "Hot-melt pressure-sensitive adhesives based on SIS-g-PB copolymer for transdermal delivery of hydrophilic drugs." International Journal of Adhesion and Adhesives 91: 72-76 (2019).
Darensbourg et al. "Thermodynamics of the carbon dioxide-epoxide copolymerization and kinetics of the metal-free degradation: a computational study." Macromolecules 46(1): 83-95 (2012).
Del Campo et al. "Patterned surfaces with pillars with controlled 3D tip geometry mimicking bioattachment devices." Advanced Materials 19(15): 1973-1977 (2007).
Inoue et al. "Copolymerization of carbon dioxide and epoxide." Journal of Polymer Science Part B: Polymer Letters 7 (4): 287-292 (1969).
Zhang, et al. "Catalysis as an enabling science for sustainable polymers." Chemical reviews 118(2): 839-885 (2017).

* cited by examiner

PMA

PEA

PBA

PMAc

PEAc

PBAc

PGC-E

PGC-B

Elmer's Glue
Poly(vinyl acetate)

Hot Melt Wood Glue
Poly(ethylene-co-vinyl acetate)

Tapes/Bandages
Poly(ethyl acrylate)   Poly(butyl acrylate)

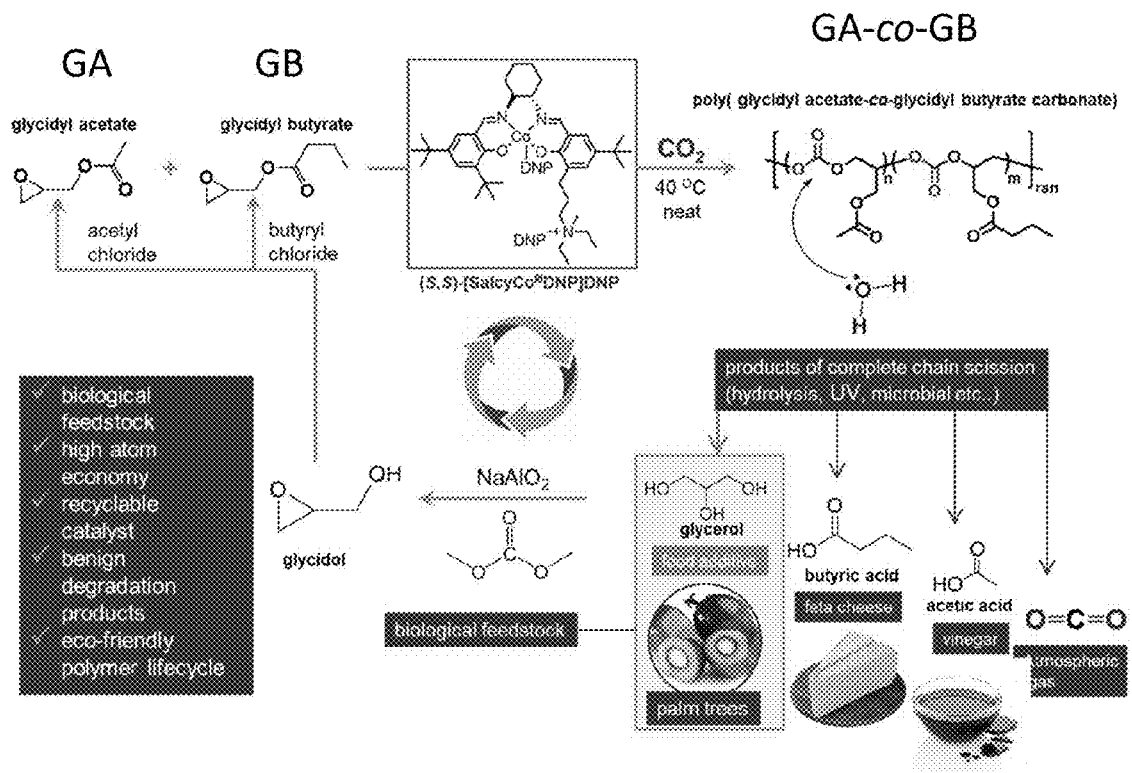
FIG. 7

FIG. 8D
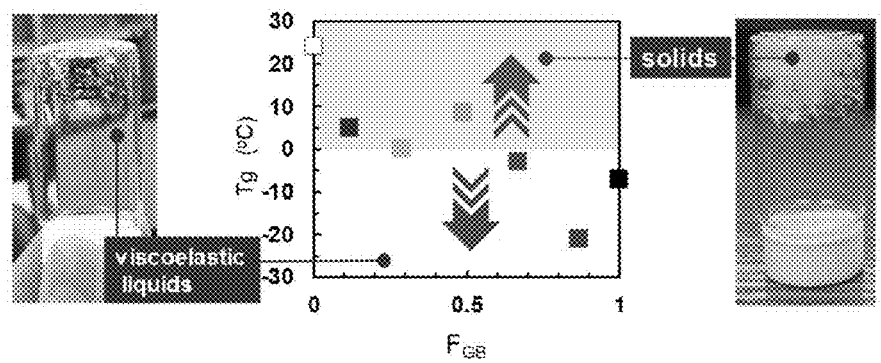

POLY (ALKYL CARBONATE) ADHESIVES

RELATED APPLICATIONS

This application claims benefit under 35 U.S.C. § 119(e) of U.S. Provisional Application No. 62/765,306, filed Aug. 20, 2018, and U.S. Provisional Application No. 62/823,871, filed Mar. 26, 2019, contents of both of which are incorporated herein by reference in their entireties.

GOVERNMENT SUPPORT

This invention was made with government support under Grant No. 1507081 awarded by the National Science Foundation. The government has certain rights in the invention.

FIELD OF THE INVENTION

Provided herein are polymer compositions, compounds, processes, and methods of use of the polymers for adhesives, bioadhesives, and biodegradable consumer plastics.

BACKGROUND

Polyacrylates are widely used in industry; however, their all aliphatic backbone leads to minimal degradability with challenges in recovery and recyclability. Insertion of $CO_2$ into the backbone, forming poly(carbonate) analogues of poly(acrylate)s provides an environmentally friendly and biocompatible alternative polymer.

Pressure sensitive adhesives (PSAs) are ubiquitous in commodity products such as tapes, bandages, labels, packaging, and insulation. With single use plastics comprising almost half of yearly plastic production, it is essential that the design, synthesis, and decomposition products of future materials, including polymer adhesives, are within the context of a healthy ecosystem along with comparable or superior performance to conventional materials. For medical applications, PSAs are utilized in surgical tapes, biomedical electrodes for patient monitoring, and transdermal drug delivery systems. They are also employed in medical surgical devices to temporarily hold an implantable, such as a collagen buttress, in a surgical stapler.

With all these factors coupled together, poly(acrylic acid)s constitute a major concern in industry as well as pharmaceutical and biomedical fields where biodegradability and biocompatibility are highly desired. This disclosure fulfills some of these needs.

SUMMARY OF THE INVENTION

The invention is based, at least in part, on the discovery novel, environmentally friendly, sustainable, strong, and responsive adhesives composed of carbonate terpolymers. These adhesives exhibit polymer compositional dependences on peel and tack strength, bind to metal, glass, wood, and polytetrafluoroethylene, as well as exhibit reversible on-demand adhesion through a temperature trigger in both dry and wet environments.

In one aspect provided herein is a polymer comprising: (i) a repeating unit represented by Formula (I), (II), and/or (III). In some embodiments, the polymer comprises: (i) a repeating unit represented by Formula (I); and (ii) a repeating unit represented by Formula (II) or Formula (III). Repeating units of Formula (I), (II) and (III) are as follows:

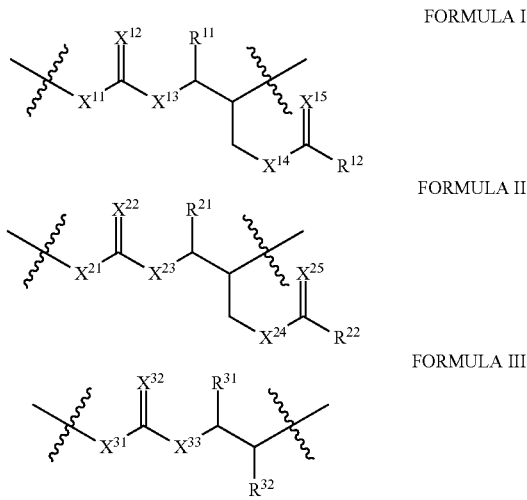

wherein:
$X^{11}, X^{12}, X^{13}, X^{14}, X^{15}, X^{21}, X^{22}, X^{23}, X^{24}, X^{25}, X^{31}, X^{32}$ and $X^{33}$ are independently selected from the group consisting of O, S, Se, and NH; and
$R^{11}, R^{12}, R^{21}, R^{22}, R^{31}$ and $R^{32}$ are independently hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly(ethylene oxide), poly(hydroxyacid)), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, or an ionically crosslinkable group, wherein alkyl, alkenyl, cycloalkyl, aryl, heterocyclyl, heteroaryl, silyl, alkylsilyl, arylsilyl, alkylaryl, and arylalkyl is optionally substituted by one or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen In some embodiments of the polymer, wherein the polymer comprises a repeating unit represented by Formula (II) and a repeating unit represented by Formula (II), the repeating unit represented by Formula I and the repeating unit represented by Formula II are different.

The disclosure also provides composition comprising a polymer described herein. For example, the composition can be in the form of a solution, such as an aqueous or organic solution.

In another aspect, the invention provides an adhesive composition comprising a polymer described herein. In some embodiments, the adhesive composition comprises a polymer wherein the polymer comprises: (i) a repeating unit represented by Formula I; (ii) a repeating unit represented by Formula I and a repeating unit represented by Formula II, provided that the repeating unit represented by Formula I and the repeating unit represented by Formula II are different; (iii) a repeating unit represented by Formula I and a repeating unit represented by Formula III; (iv) a repeating unit represented by Formula IV; (v) a repeating unit represented by Formula I and a repeating unit represented by Formula IV; and/or (vi) a repeating unit represented by Formula III and a repeating unit represented by Formula IV. Repeating units of Formula IV are as follows:

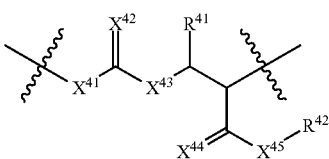

FORMULA IV wherein:
$X^{41}$, $X^{42}$, $X^{43}$, $X^{44}$ and $X^{45}$ are independently selected from the group consisting of O, S, Se, and NH; and
$R^{41}$ and $R^{42}$ are independently hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly(ethylene oxide), poly(hydroxyacid)), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, or an ionically crosslinkable group, wherein alkyl, alkenyl, cycloalkyl, aryl, heterocyclyl, heteroaryl, silyl, alkylsilyl, arylsilyl, alkylaryl, and arylalkyl is optionally substituted by one or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

In some embodiments, the polymer in the adhesive composition comprises: (i) a repeating unit represented by Formula I; (ii) a repeating unit represented by Formula I and a repeating unit represented by Formula II, provided that the repeating unit represented by Formula I and the repeating unit represented by Formula II are different; (iii) a repeating unit represented by Formula I and a repeating unit represented by Formula III; and/or (iv) a repeating unit represented by Formula IV.

In another aspect, the disclosure provides a method for bonding at least two sites together. Generally, the method comprises applying a polymer described herein to at least one site and contacting the at least two sites together. In some embodiments, the polymer comprises: (i) a repeating unit represented by Formula I; (ii) a repeating unit represented by Formula I and a repeating unit represented by Formula II, provided that the repeating unit represented by Formula I and the repeating unit represented by Formula II are different; (iii) a repeating unit represented by Formula I and a repeating unit represented by Formula III; (iv) a repeating unit represented by Formula IV; (v) a repeating unit represented by Formula I and a repeating unit represented by Formula IV; and/or (vi) a repeating unit represented by Formula III and a repeating unit represented by Formula IV.

Without limitations, the polymers described herein can be used to bond any two sites together. For example, the sites can be on biological surfaces and/or synthetic surfaces. Furthermore, the materials to be bonded together can be any desired material, for example, biological materials, metals, glass, wood, TEFLON® surfaces, and the like.

In some embodiments, the polymer for use in the method for adhering two sites together comprises (i) a repeating unit represented by Formula I; (ii) a repeating unit represented by Formula I and a repeating unit represented by Formula II, provided that the repeating unit represented by Formula I and the repeating unit represented by Formula II are different; (iii) a repeating unit represented by Formula I and a repeating unit represented by Formula III; and/or (iv) a repeating unit represented by Formula IV.

The polymers and polymer compositions described herein can serve as a replacement for current acid polymer, mainly poly(acrylic acid)s, with additional and critical benefits that they are readily degradable and the degradation product is nontoxic and biocompatible. The polymers described herein can be processed into a variety of form factors and used as degradable, e.g., biodegradable plastics for consumer and industrial applications where polyalkylacrylates and polycarbonates are used, for example, as adhesives, e.g., bioadhesives, pressure sensitive adhesives and thermo-responsive adhesives.

BRIEF DESCRIPTION OF THE DRAWINGS

This patent or application file contains at least one drawing executed in color. Copies of this patent or patent application publication with color drawings will be provided by the Office upon request and payment of the necessary fee.

FIG. 7 shows the synthetic pathway for producing an adhesive according to some embodiments as well as their lifecycle.

FIG. 8D shows the glass transition temperatures of the terpolymer materials.

DETAILED DESCRIPTION

Figure 1A:
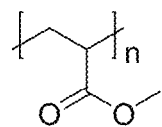
FIG. 1A shows the structure of poly(methyl acrylate) (PMA), poly(ethyl acrylate) (PEA), and poly(butyl acrylate) (PBA).
Figure 1A:
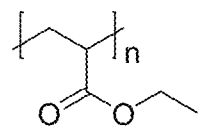
Figure 1A:
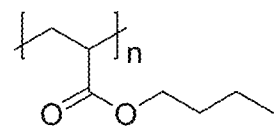

Generally, the polymer comprises at least a repeating unit represented by Formula (I):

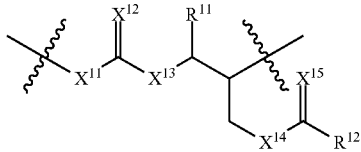

FORMULA I

In Formula (I), $X^{11}$, $X^{12}$, $X^{13}$, $X^{13}$ and $X^{15}$ are independently O, S, Se, or NH. Further, $X^{11}$, $X^{12}$, $X^{13}$, $X^{13}$ and $X^{15}$ can all be different, all same, or some same and some different. Accordingly, in some embodiments, at least two of $X^{11}$, $X^{12}$, $X^{13}$, $X^{13}$ and $X^{15}$ are the same. For example, $X^{11}$ and $X^{12}$ can be the same, $X^{11}$ and $X^{13}$ can be the same, $X^{11}$ and $X^{14}$ can be the same, $X^{11}$ and $X^{15}$ can be the same, $X^{13}$ and $X^{13}$ can be the same, $X^{12}$ and $X^{14}$ can be the same, $X^{12}$ and $X^{15}$ can be the same, $X^{13}$ and $X^{14}$ can be the same, $X^{13}$ and $X^{15}$ can be the same, or $X^{14}$ and $X^{15}$ can be the same.

In some embodiments, at least three of $X^{11}$, $X^{12}$, $X^{13}$, $X^{14}$ and $X^{15}$ are the same. For example, $X^{11}$, $X^{12}$ and $X^{13}$ can be the same; $X^{11}$, $X^{12}$ and $X^{14}$ can be the same; $X^{11}$, $X^{12}$ and $X^{15}$ can be the same; $X^{11}$, $X^{13}$ and $X^{14}$ can be the same; $X^{11}$, $X^{13}$ and $X^{15}$ can be the same; $X^{11}$, $X^{14}$ and $X^{15}$ can be the same; $X^{12}$, $X^{13}$ and $X^{14}$ can be the same; $X^{12}$, $X^{13}$ and $X^{15}$ can be the same; $X^{12}$, $X^{14}$ and $X^{15}$ can be the same; or $X^{13}$, $X^{14}$ and $X^{15}$ can be the same.

In still some embodiments, at least four of $X^{11}$, $X^{12}$, $X^{13}$, $X^{14}$ and $X^{15}$ are the same. For example, $X^{11}$, $X^{12}$, $X^{13}$ and $X^{14}$ can be the same; $X^{11}$, $X^{12}$, $X^{13}$ and $X^{15}$ can be the same; $X^{11}$, $X^{12}$, $X^{14}$ and $X^{15}$ can be the same; $X^{11}$, $X^{13}$, $X^{14}$ and $X^{15}$ can be the same; or $X^{12}$, $X^{13}$, $X^{14}$ and $X^{15}$ can be the same.

In some embodiments, all of $X^{11}$, $X^{12}$, $X^{13}$, $X^{14}$ and $X^{15}$ are the same. For example, all of $X^{11}$, $X^{12}$, $X^{13}$, $X^{14}$ and $X^{15}$ are O.

In Formula (I), $R^{11}$ and $R^{12}$ can be selected independently from the group consisting of hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly(ethylene oxide), poly(hydroxyacid)), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, and an ionically crosslinkable group. The alkyl, alkenyl, cycloalkyl, aryl, heterocyclyl, heteroaryl, silyl, alkylsilyl, arylsilyl, alkylaryl, and arylalkyl of $R^{11}$ and $R^{12}$ can be independently and optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. Further, the optional substituent(s) can be present at an internal position or at a terminal position. In some embodiments, the optional substituent(s) can be independently selected from the group consisting of hydroxyl, hydroxyether, carboxyl, carboxyester, carboxyamide, amino, mono- or di-substituted amino, thiol, thioester, and halogen.

In some embodiments, $R^{11}$ can be hydrogen, alkyl, alkenyl, cycloalkyl, aryl, heterocyclyl, heteroaryl, silyl, alkylsilyl, arylsilyl, alkylaryl or arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $R^{11}$ can be H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. In some embodiments, $R^{11}$ is H, methyl, ethyl, propyl, iso-propyl, butyl, but-2-yl, 2-methylpropyl, t-butyl, pentyl or hexyl. Preferably, $R^{11}$ is H.

In Formula (I), $R^{12}$ can be hydrogen, alkyl, alkenyl, cycloalkyl, aryl, heterocyclyl, heteroaryl, silyl, alkylsilyl, arylsilyl, alkylaryl or arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $R^{12}$ can be H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. In some embodiments, $R^{12}$ is H, methyl, ethyl, propyl, iso-propyl, butyl, but-2-yl, 2-methylpropyl, t-butyl, pentyl or hexyl. Preferably, $R^{12}$ is methyl, ethyl, propyl, or butyl.

In Formula (I), $R^{11}$ and $R^{12}$ can be the same or different. Generally, $R^{11}$ and $R^{12}$ are different. For example, $R^{11}$ and $R^{12}$ can be selected independently from the group consisting of H, methyl, ethyl, propyl, iso-propyl, butyl, but-2-yl, 2-methylpropyl, t-butyl, pentyl and hexyl. In some embodiments, $R^{11}$ is H, methyl, ethyl, propyl, iso-propyl, butyl, but-2-yl, 2-methylpropyl, t-butyl, pentyl or hexyl; and $R^{12}$ is methyl, ethyl, propyl, iso-propyl, butyl, but-2-yl, 2-methylpropyl, t-butyl, pentyl or hexyl. Preferably, $R^{11}$ is H and $R^{12}$ is methyl, ethyl, propyl, or butyl.

In some embodiments, $X^{11}$, $X^{12}$, $X^{13}$, $X^{14}$ and $X^{15}$ are the same and $R^{11}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, $X^{11}$, $X^{12}$, $X^{13}$, $X^{14}$ and $X^{15}$ can be O.

In some embodiments, $X^{11}$, $X^{12}$, $X^{13}$, $X^{14}$ and $X^{15}$ are the same, e.g., O, and $R^{11}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $X^{11}$, $X^{12}$, $X^{13}$, $X^{14}$ and $X^{15}$ are the same, e.g., O, and $R^{11}$ is H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{11}$, $X^{12}$, $X^{13}$, $X^{14}$ and $X^{15}$ are the same, and $R^{11}$ is H, methyl, ethyl, propyl, iso-propyl, butyl, but-2-yl, 2-methylpropyl, t-butyl, pentyl or hexyl. Preferably, $X^1$, $X^{12}$, $X^{13}$, $X^{14}$ and $X^{15}$ are O and $R^{11}$ is H.

In some embodiments, $X^{11}$, $X^{12}$, $X^{13}$, $X^{14}$ and $X^{15}$ are the same and $R^{12}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, $X^{11}$, $X^{12}$, $X^{13}$, $X^{14}$ and $X^{15}$ can be O.

In some embodiments, $X^{11}$, $X^{12}$, $X^{13}$, $X^{14}$ and $X^{15}$ are the same, e.g., O, and $R^{12}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $X^{11}$, $X^{12}$, $X^{13}$, $X^{14}$ and $X^{15}$ are the same, e.g., O, and $R^{12}$ is H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{11}$, $X^{12}$, $X^{13}$, $X^{14}$ and $X^{15}$ are the same, and $R^{12}$ is H, methyl, ethyl, propyl, iso-propyl, butyl, but-2-yl, 2-methylpropyl, t-butyl, pentyl or hexyl. Preferably, $X^{11}$, $X^{12}$, $X^{13}$, $X^{14}$ and $X^{15}$ are O and $R^{12}$ is methyl, ethyl, propyl, or butyl.

In some embodiments, $X^{11}$, $X^{12}$, $X^{13}$, $X^{14}$ and $X^{15}$ are the same, e.g., O, and $R^{11}$ and $R^{12}$ are selected independently from the group consisting of hydrogen, alkyl, alkenyl, cycloalkyl, aryl, heterocyclyl, heteroaryl, silyl, alkylsilyl, arylsilyl, alkylaryl and arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. $R^{11}$ and $R^{12}$ can be same or different. Preferably, $R^{11}$ and $R^{12}$ are different.

In some embodiments, $X^{11}$, $X^{12}$, $X^{13}$, $X^{14}$ and $X^{15}$ are the same, e.g., O, and $R^{11}$ and $R^{12}$ are selected independently from the group consisting of hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position. In some embodiments, $R^{11}$ and $R^{12}$ are the same. In some other embodiments, $R^{11}$ and $R^{12}$ are different.

In some embodiments, $X^{11}$, $X^{12}$, $X^{13}$, $X^{14}$ and $X^{15}$ are the same, e.g., O, and $R^{11}$ and $R^{12}$ are independently H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^1$, $X^{12}$, $X^{13}$, $X^{14}$ and $X^{15}$ are the same, and $R^{11}$ and $R^{12}$ are independently H, methyl, ethyl, propyl, iso-propyl, butyl, but-2-yl, 2-methylpropyl, t-butyl, pentyl or hexyl. Preferably, $X^{11}$, $X^{12}$, $X^{13}$, $X^{14}$ and $X^{15}$ are O; $R^{11}$ is H; and $R^{12}$ is methyl, ethyl, propyl, or butyl.

The inventors have discovered inter alia that copolymerizing two or more different repeating units of Formula (I) can lead to irregularity in the polymer chains. This can lead to diverse adhesive profiles. Accordingly, in some embodiments, the polymer comprises at least two different repeat units of Formula (I), i.e., at least one repeat unit of a first Formula (I) and at least one repeat unit of a second Formula (I). For example, the polymer comprises at least two different repeat units of Formula (I) where at least one of $X^{11}$, $X^{12}$, $X^{13}$, $X^{14}$, $X^5$, $R^{11}$ and $R^{12}$ is different between said at least two different repeat units. For example, the polymer comprises a repeating unit represented by Formula (I) and a repeating unit represented by Formula (II):

FORMULA II

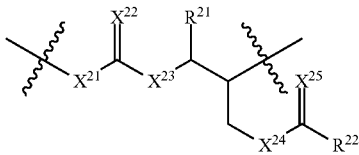

In Formula (II), $X^{21}$, $X^{22}$, $X^{23}$, $X^{23}$ and $X^{25}$ are independently O, S, Se, or NH. Further, $X^{21}$, $X^{22}$, $X^{23}$, $X^{23}$ and $X^{25}$ can all be different, all same, or some same and some different. Accordingly, in some embodiments, at least two of $X^{21}$, $X^{22}$, $X^{23}$, $X^{23}$ and $X^{25}$ are the same. For example, $X^{21}$ and $X^{22}$ can be the same, $X^{21}$ and $X^{23}$ can be the same, $X^{21}$ and $X^{24}$ can be the same, $X^{21}$ and $X^{25}$ can be the same, $X^{23}$ and $X^{23}$ can be the same, $X^{22}$ and $X^{24}$ can be the same, $X^{22}$ and $X^{25}$ can be the same, $X^{23}$ and $X^{24}$ can be the same, $X^{23}$ and $X^{25}$ can be the same, or $X^{24}$ and $X^{25}$ can be the same.

In some embodiments, at least three of $X^{21}$, $X^{22}$, $X^{23}$, $X^{24}$ and $X^{25}$ are the same. For example, $X^{21}$, $X^{22}$ and $X^{23}$ can be the same; $X^{21}$, $X^{22}$ and $X^{24}$ can be the same; $X^{21}$, $X^{22}$ and $X^{25}$ can be the same; $X^{21}$, $X^{23}$ and $X^{24}$ can be the same; $X^{21}$, $X^{23}$ and $X^{25}$ can be the same; $X^{21}$, $X^{24}$ and $X^{25}$ can be the same; $X^{22}$, $X^{23}$ and $X^{24}$ can be the same; $X^{22}$, $X^{23}$ and $X^{25}$ can be the same; $X^{22}$, $X^{24}$ and $X^{25}$ can be the same; or $X^{23}$, $X^{24}$ and $X^{25}$ can be the same.

In still some embodiments, at least four of $X^{21}$, $X^{22}$, $X^{23}$, $X^{24}$ and $X^{25}$ are the same. For example, $X^{21}$, $X^{22}$, $X^{23}$ and $X^{24}$ can be the same; $X^{21}$, $X^{22}$, $X^{23}$ and $X^{25}$ can be the same; $X^{21}$, $X^{22}$, $X^{24}$ and $X^{25}$ can be the same; $X^{21}$, $X^{23}$, $X^{24}$ and $X^{25}$ can be the same; or $X^{22}$, $X^{23}$, $X^{24}$ and $X^{25}$ can be the same.

In some embodiments, all of $X^{21}$, $X^{22}$, $X^{23}$, $X^{24}$ and $X^{25}$ are the same. For example, all of $X^{21}$, $X^{22}$, $X^{23}$, $X^{24}$ and $X^{25}$ are O.

In Formula (II), $R^{21}$ and $R^{22}$ can be selected independently from the group consisting of hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly(ethylene oxide), poly(hydroxyacid)), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, and an ionically crosslinkable group. The alkyl, alkenyl, cycloalkyl, aryl, heterocyclyl, heteroaryl, silyl, alkylsilyl, arylsilyl, alkylaryl, and arylalkyl of $R^{21}$ and $R^{22}$ can be independently and optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. Further, the optional substituent(s) can be present at an internal position or at a terminal position. In some embodiments, the optional substituent(s) can be independently selected from the group consisting of hydroxyl, hydroxyether, carboxyl, carboxyester, carboxyamide, amino, mono- or di-substituted amino, thiol, thioester, and halogen.

In some embodiments, $R^{21}$ can be hydrogen, alkyl, alkenyl, cycloalkyl, aryl, heterocyclyl, heteroaryl, silyl, alkylsilyl, arylsilyl, alkylaryl or arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $R^{21}$ can be H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. In some embodiments, $R^{21}$ is H, methyl, ethyl, propyl, iso-propyl, butyl, but-2-yl, 2-methylpropyl, t-butyl, pentyl or hexyl. Preferably, $R^{21}$ is H.

In Formula (II), $R^{22}$ can be hydrogen, alkyl, alkenyl, cycloalkyl, aryl, heterocyclyl, heteroaryl, silyl, alkylsilyl, arylsilyl, alkylaryl or arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $R^{22}$ can be H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. In some embodiments, $R^{22}$ is H, methyl, ethyl, propyl, iso-propyl, butyl, but-2-yl, 2-methylpropyl, t-butyl, pentyl or hexyl. Preferably, $R^{22}$ is methyl, ethyl, propyl, or butyl.

In Formula (II), $R^{21}$ and $R^{22}$ can be the same or different. Generally, $R^{21}$ and $R^{22}$ are different. For example, $R^{21}$ and $R^{22}$ can be selected independently from the group consisting of H, methyl, ethyl, propyl, iso-propyl, butyl, but-2-yl, 2-methylpropyl, t-butyl, pentyl and hexyl. In some embodiments, $R^{21}$ is H, methyl, ethyl, propyl, iso-propyl, butyl, but-2-yl, 2-methylpropyl, t-butyl, pentyl or hexyl; and $R^{22}$ is methyl, ethyl, propyl, iso-propyl, butyl, but-2-yl, 2-methylpropyl, t-butyl, pentyl or hexyl. Preferably, $R^{21}$ is H and $R^{22}$ is methyl, ethyl, propyl, or butyl.

In some embodiments, $X^{21}$, $X^{22}$, $X^{23}$, $X^{24}$ and $X^{25}$ are the same and $R^{21}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, $X^{21}$, $X^{22}$, $X^{23}$, $X^{24}$ and $X^{25}$ can be O.

In some embodiments, $X^{21}$, $X^{22}$, $X^{23}$, $X^{24}$ and $X^{25}$ are the same, e.g., O, and $R^{21}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $X^{21}$, $X^{22}$, $X^{23}$, $X^{24}$ and $X^{25}$ are the same, e.g., O, and $R^{21}$ is H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{21}$, $X^{22}$, $X^{23}$, $X^{24}$ and $X^{25}$ are the same, and $R^{21}$ is H, methyl, ethyl, propyl, iso-propyl, butyl, but-2-yl, 2-methylpropyl, t-butyl, pentyl or hexyl. Preferably, $X^{21}$, $X^{22}$, $X^{23}$, $X^{24}$ and $X^{25}$ are O and $R^{21}$ is H.

In some embodiments, $X^{21}$, $X^{22}$, $X^{23}$, $X^{24}$ and $X^{25}$ are the same and $R^{22}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, $X^{21}$, $X^{22}$, $X^{23}$, $X^{24}$ and $X^{25}$ can be O.

In some embodiments, $X^{21}$, $X^{22}$, $X^{23}$, $X^{24}$ and $X^{25}$ are the same, e.g., O, and $R^{22}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $X^{21}$, $X^{22}$, $X^{23}$, $X^{24}$ and $X^{25}$ are the same, e.g., O, and $R^{22}$ is H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{21}$, $X^{22}$, $X^{23}$, $X^{24}$ and $X^{25}$ are the same, and $R^{22}$ is H, methyl, ethyl, propyl, iso-propyl, butyl, but-2-yl, 2-methylpropyl, t-butyl, pentyl or hexyl. Preferably, $X^{21}$, $X^{22}$, $X^{23}$, $X^{24}$ and $X^{25}$ are O and $R^{22}$ is methyl, ethyl, propyl, or butyl.

In some embodiments, $X^{21}$, $X^{22}$, $X^{23}$, $X^{24}$ and $X^{25}$ are the same, e.g., O, and $R^{21}$ and $R^{22}$ are selected independently from the group consisting of hydrogen, alkyl, alkenyl, cycloalkyl, aryl, heterocyclyl, heteroaryl, silyl, alkylsilyl, arylsilyl, alkylaryl and arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. $R^{21}$ and $R^{22}$ can be same or different. Preferably, $R^{21}$ and $R^{22}$ are different.

In some embodiments, $X^{21}$, $X^{22}$, $X^{23}$, $X^{24}$ and $X^{25}$ are the same, e.g., O, and $R^{21}$ and $R^{22}$ are selected independently from the group consisting of hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position. In some embodiments, $R^{21}$ and $R^{22}$ are the same. In some other embodiments, $R^{21}$ and $R^{22}$ are different.

In some embodiments, $X^{21}$, $X^{22}$, $X^{23}$, $X^{24}$ and $X^{25}$ are the same, e.g., O, and $R^{21}$ and $R^{22}$ are independently H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{21}$, $X^{22}$, $X^{23}$, $X^{24}$ and $X^{25}$ are the same, and $R^{21}$ and $R^{22}$ are independently H, methyl, ethyl, propyl, iso-propyl, butyl, but-2-yl, 2-methylpropyl, t-butyl, pentyl or hexyl. Preferably, $X^{21}$, $X^{22}$, $X^{23}$, $X^{24}$ and $X^{25}$ are O; $R^{21}$ is H; and $R^{22}$ is methyl, ethyl, propyl, or butyl.

Generally, when the polymer comprises a repeating unit represented by Formula (I) and a repeating unit represented by Formula (II), they are different. For example, $X^{11}$ and $X^{21}$ are different, $X^{12}$ and $X^{22}$ are different, $X^{13}$ and $X^{23}$ are different, $X^{14}$ and $X^{24}$ are different, $X^{15}$ and $X^{25}$ are different, $R^{11}$ and $R^{21}$ are different, and/or $R^{12}$ and $R^{22}$ are different. In some embodiments, $R^{11}$ and $R^{21}$ are different, or $R^{12}$ and $R^{22}$ are different. Preferably, $R^{12}$ and $R^{22}$ are different.

In some embodiments, $X^{11}$, $X^{12}$, $X^{13}$, $X^{14}$, $X^{15}$, $X^{21}$, $X^{22}$, $X^{23}$, $X^{24}$ and $X^{25}$ are the same, e.g., O; and $R^{11}$, $R^{12}$, $R^{21}$ and $R^{22}$ are selected independently from the group consisting of hydrogen, alkyl, alkenyl, cycloalkyl, aryl, heterocyclyl, heteroaryl, silyl, alkylsilyl, arylsilyl, alkylaryl and arylalkyl, and wherein $R^{11}$ is different from $R^{21}$, or $R^{12}$ is different from $R^{22}$. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. Preferably, $R^{12}$ is different from $R^{22}$.

In some embodiments, $X^{11}$, $X^{12}$, $X^{13}$, $X^{14}$, $X^{15}$, $X^{21}$, $X^{22}$, $X^{23}$, $X^{24}$ and $X^{25}$ are the same, e.g., O; and $R^{11}$, $R^{12}$, $R^{21}$ and $R^{22}$ are independently H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen, and where $R^{11}$ is different from $R^{21}$, or $R^{12}$ is different from $R^{22}$. Preferably $R^{12}$ is different from $R^{22}$. For example, $X^{11}$, $X^{12}$, $X^{13}$, $X^{14}$, $X^{15}$, $X^{21}$, $X^{22}$, $X^{23}$, $X^{24}$ and $X^{25}$ are the same, and $R^{11}$, $R^{12}$, $R^{21}$ and $R^{22}$ are independently H, methyl, ethyl, propyl, iso-propyl, butyl, but-2-yl, 2-methylpropyl, t-butyl, pentyl or hexyl, and where $R^{11}$ is different from $R^{21}$, or $R^{12}$ is different from $R^{22}$. Preferably, $X^{11}$, $X^{12}$, $X^{13}$, $X^{14}$, $X^{15}$, $X^{21}$, $X^{22}$, $X^{23}$, $X^{24}$ and $X^{25}$ are O; $R^{11}$ and $R^{21}$ are H; and $R^{12}$ and $R^{22}$ are different from each other selected independently from methyl, ethyl, propyl, or butyl. In some embodiments, $X^{11}$, $X^{12}$, $X^{13}$, $X^{14}$, $X^{15}$, $X^{21}$, $X^{22}$, $X^{23}$, $X^{24}$ and $X^{25}$ are O; $R^{11}$ and $R^{21}$ are H; $R^{12}$ is methyl; and $R^{22}$ is butyl.

Without wishing to be bound by a theory, the adhesive properties of the polymer can be tuned for specific applications by varying the ratio of Formula (I) and Formula (II). Accordingly, the ratio of Formula (I) and Formula (II) can range from 1:99 to 99:1. For example, the ratio of Formula (I) and Formula (II) can be from about 5:95, from about 10:90, from about 15:85, 20:80, from about 25:75, from about 30:70, from about 35:65 from about 40:60, or from about 45:55, to about 55:45, to about 60:40, to about 65:35, to about 70:30, to about 75:25, to about 80:20, to about 85:15, to about 90:10 or to about 95:5. In some embodiments, the ratio of Formula (I) and Formula (II) is from about 5:95 to about 20:80, from about 25:75 to about 40:60, from about 45:55 to about 60:40, from about 65:35 to about 80:20, or from about 80:20 to about 95:5. In some embodiments, the Formula (I) and Formula (II) is about 13:87, about 33:67, about 51:49, about 71:29, or about 88:12. It is to be understood that ratio can be mol/mol or w/w. Preferably the ratio between Formula (I) and Formula (II) is mol/mol.

The inventors have discovered inter alia that incorporating another monomer, e.g, propylene oxide, can allow for more minute modification in thermal and adhesive properties of the polymers, e.g., a polymer comprising a repeat unit represented by Formula (I) disclosed herein. Accordingly, in addition to repeating unit of Formula (I), the polymer can further comprise a repeating unit of Formula (III):

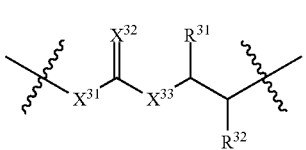

FORMULA (III)

In Formula (III), $X^{31}$, $X^{32}$ and $X^{33}$ are independently O, S, Se, or NH. Further, $X^{31}$, $X^{32}$ and $X^{33}$ can all be different, all same, or some same and some different. Accordingly, in some embodiments, at least two of $X^{31}$, $X^{32}$ and $X^{33}$ the same. For example, $X^{31}$ and $X^{32}$ can be the same, $X^{31}$ and $X^{33}$ can be the same, or $X^{32}$ and $X^{33}$ can be the same. In some embodiments, all three of $X^{31}$, $X^{32}$ and $X^{33}$ are the same. For example, all three of $X^{31}$, $X^{32}$ and $X^{33}$ are O.

In Formula (III), $R^{31}$ and $R^{32}$ can be selected independently from the group consisting of hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly (ethylene oxide), poly(hydroxyacid)), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, and an ionically crosslinkable group. The alkyl, alkenyl, cycloalkyl, aryl, heterocyclyl, heteroaryl, silyl, alkylsilyl, arylsilyl, alkylaryl, and arylalkyl of $R^{31}$ and $R^{32}$ can be independently and optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. Further, the optional substituent(s) can be present at an internal position or at a terminal position. In some embodiments, the optional substituent(s) can be independently selected from the group consisting of hydroxyl, hydroxyether, carboxyl, carboxyester, carboxyamide, amino, mono- or di-substituted amino, thiol, thioester, and halogen.

In some embodiments, $R^{31}$ can be hydrogen, alkyl, alkenyl, cycloalkyl, aryl, heterocyclyl, heteroaryl, silyl, alkylsilyl, arylsilyl, alkylaryl or arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $R^{31}$ can be H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. In some embodiments, $R^{31}$ is H, methyl, ethyl, propyl, iso-propyl, butyl, but-2-yl, 2-methylpropyl, t-butyl, pentyl or hexyl. Preferably, $R^{31}$ is H.

In Formula (III), $R^{32}$ can be hydrogen, alkyl, alkenyl, cycloalkyl, aryl, heterocyclyl, heteroaryl, silyl, alkylsilyl, arylsilyl, alkylaryl or arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $R^{32}$ can be H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. In some embodiments, $R^{32}$ is H, methyl, ethyl, propyl, iso-propyl, butyl, but-2-yl, 2-methylpropyl, t-butyl, pentyl or hexyl. Preferably, $R^{32}$ is methyl, ethyl, propyl, or butyl. More preferably, $R^{32}$ is methyl.

In Formula (III), $R^{31}$ and $R^{32}$ can be the same or different. Generally, $R^{31}$ and $R^{32}$ are different. For example, $R^{31}$ and $R^{32}$ can be selected independently from the group consisting of H, methyl, ethyl, propyl, iso-propyl, butyl, but-2-yl, 2-methylpropyl, t-butyl, pentyl and hexyl. In some embodiments, $R^{31}$ is H, methyl, ethyl, propyl, iso-propyl, butyl, but-2-yl, 2-methylpropyl, t-butyl, pentyl or hexyl; and $R^{32}$ is methyl, ethyl, propyl, iso-propyl, butyl, but-2-yl, 2-methylpropyl, t-butyl, pentyl or hexyl. Preferably, $R^{31}$ is H and $R^{32}$ is methyl, ethyl, propyl, or butyl. More preferably, $R^{31}$ is H and $R^{32}$ is methyl.

In some embodiments, $X^{31}$, $X^{32}$ and $X^{33}$ are the same, e.g., O, and $R^{31}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

In some embodiments, $X^{31}$, $X^{32}$ and $X^{33}$ are the same, e.g., O, and $R^{31}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $X^{31}$, $X^{32}$ and $X^{33}$ are the same, e.g., O, and $R^{31}$ is H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{31}$, $X^{32}$ and $X^{33}$ are the same, and $R^{31}$ is H, methyl, ethyl, propyl, iso-propyl, butyl, but-2-yl, 2-methylpropyl, t-butyl, pentyl or hexyl. Preferably, $X^{31}$, $X^{32}$ and $X^{33}$ are O, and $R^{31}$ is H.

In some embodiments, $X^{31}$, $X^{32}$ and $X^{33}$ are the same, e.g., O, and $R^{32}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

In some embodiments, $X^{31}$, $X^{32}$ and $X^{33}$ are the same, e.g., O, and $R^{32}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $X^{31}$, $X^{32}$ and $X^{33}$ are the same, e.g., O, and $R^{32}$ is H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{31}$, $X^{32}$ and $X^{33}$ are the same, and $R^{32}$ is H, methyl, ethyl, propyl, iso-propyl, butyl, but-2-yl, 2-methylpropyl, t-butyl, pentyl or hexyl. Preferably, $X^{31}$, $X^{32}$ and $X^{33}$ are O, and $R^{32}$ is methyl, ethyl, propyl, or butyl. More preferably, $X^{31}$, $X^{32}$ and $X^{33}$ are O, and $R^{32}$ is methyl.

In some embodiments, $X^{31}$, $X^{32}$ and $X^{33}$ are the same, e.g., O, and $R^{31}$ and $R^{32}$ are selected independently from the group consisting of hydrogen, alkyl, alkenyl, cycloalkyl, aryl, heterocyclyl, heteroaryl, silyl, alkylsilyl, arylsilyl, alkylaryl and arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. $R^{31}$ and $R^{32}$ can be same or different. Preferably, $R^{31}$ and $R^{32}$ are different.

In some embodiments, $X^{31}$, $X^{32}$ and $X^{33}$ are the same, e.g., O, and $R^{31}$ and $R^{32}$ are selected independently from the group consisting of hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position. In some embodiments, $R^{31}$ and $R^{32}$ are the same. In some other embodiments, $R^{31}$ and $R^{32}$ are different.

In some embodiments, $X^{31}$, $X^{32}$ and $X^{33}$ are the same, e.g., O, and $R^{31}$ and $R^{32}$ are independently H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{31}$, $X^{32}$ and $X^{33}$ are the same, and $R^{31}$ and $R^{32}$ are independently H, methyl, ethyl, propyl, iso-propyl, butyl, but-2-yl, 2-methylpropyl, t-butyl, pentyl or hexyl. Preferably, $X^{31}$, $X^{32}$ and $X^{33}$ are O; $R^{31}$ is H; and $R^{32}$ is methyl, ethyl, propyl, or butyl. More preferably, $X^{31}$, $X^{32}$ and $X^{33}$ are O; $R^{31}$ is H; and $R^{32}$ is methyl.

In some embodiments, $X^{11}$, $X^{12}$, $X^{13}$, $X^{14}$, $X^{15}$, $X^{31}$, $X^{32}$, and $X^{35}$ are the same, e.g., O; and $R^{11}$, $R^{12}$, $R^{31}$ and $R^{32}$ are selected independently from the group consisting of hydrogen, alkyl, alkenyl, cycloalkyl, aryl, heterocyclyl, heteroaryl, silyl, alkylsilyl, arylsilyl, alkylaryl and arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

In some embodiments, $X^{11}$, $X^{12}$, $X^{13}$, $X^{14}$, $X^{15}$, $X^{31}$, $X^{32}$, and $X^{35}$ are the same, e.g., O; and $R^{11}$, $R^{12}$, $R^{31}$ and $R^{32}$ are independently H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester. For example, $X^{11}$, $X^{12}$, $X^{13}$, $X^{14}$, $X^{15}$, $X^{31}$, $X^{32}$, and $X^{35}$ are the same, and $R^{11}$, $R^{12}$, $R^{31}$ and $R^{32}$ are independently H, methyl, ethyl, propyl, iso-propyl, butyl, but-2-yl, 2-methylpropyl, t-butyl, pentyl or hexyl. Preferably, $X^{11}$, $X^{12}$, $X^{13}$, $X^{14}$, $X^{15}$, $X^{31}$, $X^{32}$, and $X^{35}$ are O; $R^{11}$ and $R^{31}$ are H; and $R^{12}$ and $R^{32}$ are independently methyl, ethyl, propyl, or butyl. In some embodiments, $X^{11}$, $X^{12}$, $X^{13}$, $X^{14}$, $X^{15}$, $X^{31}$, $X^{32}$, and $X^{35}$ are O; $R^{11}$ and $R^{31}$ are H; $R^{12}$ is methyl; and $R^{32}$ is butyl.

Without wishing to be bound by a theory, the adhesive properties of the polymer can be tuned for specific applications by varying the ratio of Formula (I) and Formula (III). Accordingly, the ratio of Formula (I) and Formula (III) can range from 1:99 to 99:1. For example, the ratio of Formula (I) and Formula (III) can be from about 5:95, from about 10:90, from about 15:85, 20:80, from about 25:75, from about 30:70, from about 35:65 from about 40:60, or from about 45:55, to about 55:45, to about 60:40, to about 65:35, to about 70:30, to about 75:25, to about 80:20, to about 85:15, to about 90:10 or to about 95:5. It is to be understood that ratio can be mol/mol or w/w. Preferably the ratio between Formula (I) and Formula (II) is mol/mol.

In some embodiments, the ratio of Formula (I) and Formula (III) is from about 90:10 to about 85:15, from about 80:20 to about 70:30, from about 60:40 to about 50:50, from about 35:65 to about 30:70, or from about 20:80 to about 25:75. In some embodiments, the ratio of Formula (I) and Formula (III) is about 87:13, about 74:26, about 56:44, about 33:67 or about 22:78.

The inventors have discovered inter alia that polymers comprising a repeat unit of Formula (IV) are unexpectedly adhesive. Accordingly, also provided herein is a polymer comprising a repeat unit represented by Formula (IV):

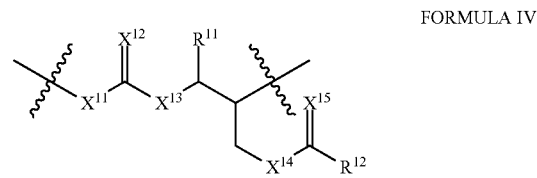

FORMULA IV

In Formula (IV), $X^{41}$, $X^{42}$, $X^{43}$, $X^{43}$ and $X^{45}$ are independently O, S, Se, or NH. Further, $X^{41}$, $X^{42}$, $X^{43}$, $X^{43}$ and $X^{45}$ can all be different, all same, or some same and some different. Accordingly, in some embodiments, at least two of $X^{41}$, $X^{42}$, $X^{43}$, $X^{43}$ and $X^{45}$ are the same. For example, $X^{41}$ and $X^{42}$ can be the same, $X^{41}$ and $X^{43}$ can be the same, $X^{41}$ and $X^{44}$ can be the same, $X^{41}$ and $X^{45}$ can be the same, $X^{43}$ and $X^{43}$ can be the same, $X^{42}$ and $X^{44}$ can be the same, $X^{42}$ and $X^{45}$ can be the same, $X^{43}$ and $X^{44}$ can be the same, $X^{43}$ and $X^{45}$ can be the same, or $X^{44}$ and $X^{45}$ can be the same.

In some embodiments, at least three of $X^{41}$, $X^{42}$, $X^{43}$, $X^{44}$ and $X^{45}$ are the same. For example, $X^{41}$, $X^{42}$ and $X^{43}$ can be the same; $X^{41}$, $X^{42}$ and $X^{44}$ can be the same; $X^{41}$, $X^{42}$ and $X^{45}$ can be the same; $X^{41}$, $X^{43}$ and $X^{44}$ can be the same; $X^{41}$, $X^{43}$ and $X^{45}$ can be the same; $X^{41}$, $X^{44}$ and $X^{45}$ can be the same; $X^{42}$, $X^{43}$ and $X^{44}$ can be the same; $X^{42}$, $X^{43}$ and $X^{45}$ can be the same; $X^{42}$, $X^{44}$ and $X^{45}$ can be the same; or $X^{43}$, $X^{44}$ and $X^{45}$ can be the same.

In still some embodiments, at least four of $X^{41}$, $X^{42}$, $X^{43}$, $X^{44}$ and $X^{45}$ are the same. For example, $X^{41}$, $X^{42}$, $X^{43}$ and $X^{44}$ can be the same; $X^{41}$, $X^{42}$, $X^{43}$ and $X^{45}$ can be the same; $X^{41}$, $X^{42}$, $X^{44}$ and $X^{45}$ can be the same; $X^{41}$, $X^{43}$, $X^{44}$ and $X^{45}$ can be the same; or $X^{42}$, $X^{43}$, $X^{44}$ and $X^{45}$ can be the same.

In some embodiments, all of $X^{41}$, $X^{42}$, $X^{43}$, $X^{44}$ and $X^{45}$ are the same. For example, all of $X^{41}$, $X^{42}$, $X^{43}$, $X^{44}$ and $X^{45}$ are O.

In Formula (IV), $R^{41}$ and $R^{42}$ can be selected independently from the group consisting of hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly(ethylene oxide), poly(hydroxyacid)), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, and an ionically crosslinkable group. The alkyl, alkenyl, cycloalkyl, aryl, heterocyclyl, heteroaryl, silyl, alkylsilyl, arylsilyl, alkylaryl, and arylalkyl of $R^{41}$ and $R^{42}$ can be independently and optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. Further, the optional substituent(s) can be present at an internal position or at a terminal position. In some embodiments, the optional substituent(s) can be independently selected from the group consisting of hydroxyl, hydroxyether, carboxyl, carboxyester, carboxyamide, amino, mono- or di-substituted amino, thiol, thioester, and halogen.

In some embodiments, $R^{41}$ can be hydrogen, alkyl, alkenyl, cycloalkyl, aryl, heterocyclyl, heteroaryl, silyl, alkylsilyl, arylsilyl, alkylaryl or arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $R^{41}$ can be H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. In some embodiments, $R^{41}$ is H, methyl, ethyl, propyl, iso-propyl, butyl, but-2-yl, 2-methylpropyl, t-butyl, pentyl or hexyl. Preferably, $R^{41}$ is H.

In Formula (IV), $R^{42}$ can be hydrogen, alkyl, alkenyl, cycloalkyl, aryl, heterocyclyl, heteroaryl, silyl, alkylsilyl, arylsilyl, alkylaryl or arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $R^{42}$ can be H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. In some embodiments, $R^{42}$ is H, methyl, ethyl, propyl, iso-propyl, butyl, but-2-yl, 2-methylpropyl, t-butyl, pentyl or hexyl. Preferably, $R^{42}$ is methyl, ethyl, propyl, or butyl.

In Formula (IV), $R^{41}$ and $R^{42}$ can be the same or different. Generally, $R^{41}$ and $R^{42}$ are different. For example, $R^{41}$ and $R^{42}$ can be selected independently from the group consisting of H, methyl, ethyl, propyl, iso-propyl, butyl, but-2-yl, 2-methylpropyl, t-butyl, pentyl and hexyl. In some embodiments, $R^{41}$ is H, methyl, ethyl, propyl, iso-propyl, butyl, but-2-yl, 2-methylpropyl, t-butyl, pentyl or hexyl; and $R^{42}$ is methyl, ethyl, propyl, iso-propyl, butyl, but-2-yl, 2-methylpropyl, t-butyl, pentyl or hexyl. Preferably, $R^{41}$ is H and $R^{42}$ is methyl, ethyl, propyl, or butyl.

In some embodiments, $X^{41}$, $X^{42}$, $X^{43}$, $X^{44}$ and $X^{45}$ are the same and $R^{41}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, $X^{41}$, $X^{42}$, $X^{43}$, $X^{44}$ and $X^{45}$ can be O.

In some embodiments, $X^{41}$, $X^{42}$, $X^{43}$, $X^{44}$ and $X^{45}$ are the same, e.g., O, and $R^{41}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $X^{41}$, $X^{42}$, $X^{43}$, $X^{44}$ and $X^{45}$ are the same, e.g., O, and $R^{41}$ is H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{41}$, $X^{42}$, $X^{43}$, $X^{44}$ and $X^{45}$ are the same, and $R^{41}$ is H, methyl, ethyl, propyl, iso-propyl, butyl, but-2-yl, 2-methylpropyl, t-butyl, pentyl or hexyl. Preferably, $X^1$, $X^{42}$, $X^{43}$, $X^{44}$ and $X^{45}$ are O and $R^{41}$ is H.

In some embodiments, $X^{41}$, $X^{42}$, $X^{43}$, $X^{44}$ and $X^{45}$ are the same and $R^{42}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. For example, $X^{41}$, $X^{42}$, $X^{43}$, $X^{44}$ and $X^{45}$ can be O.

In some embodiments, $X^{41}$, $X^{42}$, $X^{43}$, $X^{44}$ and $X^{45}$ are the same, e.g., O, and $R^{42}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position.

In some embodiments, $X^{41}$, $X^{42}$, $X^{43}$, $X^{44}$ and $X^{45}$ are the same, e.g., O, and $R^{42}$ is H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^{41}$, $X^{42}$, $X^{43}$, $X^{44}$ and $X^{45}$ are the same, and $R^{42}$ is H, methyl, ethyl, propyl, iso-propyl, butyl, but-2-yl, 2-methylpropyl, t-butyl, pentyl or hexyl. Preferably, $X^{41}$, $X^{42}$, $X^{43}$, $X^{44}$ and $X^{45}$ are O and $R^{42}$ is methyl, ethyl, propyl, or butyl.

In some embodiments, $X^{41}$, $X^{42}$, $X^{43}$, $X^{44}$ and $X^{45}$ are the same, e.g., O, and $R^{41}$ and $R^{42}$ are selected independently from the group consisting of hydrogen, alkyl, alkenyl, cycloalkyl, aryl, heterocyclyl, heteroaryl, silyl, alkylsilyl, arylsilyl, alkylaryl and arylalkyl. The alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen. $R^{41}$ and $R^{42}$ can be same or different. Preferably, $R^{41}$ and $R^{42}$ are different.

In some embodiments, $X^{41}$, $X^{42}$, $X^{43}$, $X^{44}$ and $X^{45}$ are the same, e.g., O, and $R^{41}$ and $R^{42}$ are selected independently from the group consisting of hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl or arylalkyl can be optionally substituted with one or more one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, and halogen, and where the optional substituent(s) can be present at an internal position or at a terminal position. In some embodiments, $R^{41}$ and $R^{42}$ are the same. In some other embodiments, $R^{41}$ and $R^{42}$ are different.

In some embodiments, $X^{41}$, $X^{42}$, $X^{43}$, $X^{44}$ and $X^{45}$ are the same, e.g., O, and $R^{41}$ and $R^{42}$ are independently H or $C_1$-$C_{10}$alkyl, where $C_1$-$C_{10}$alkyl is optionally substituted with one, two, three, four, five or six substituents selected independently from the group consisting of hydroxyl, hydroxyether, carboxyl, carboxyester, carboxyamide, amino, mono- or di-substituted amino, thiol, thioester, and halogen. For example, $X^1$, $X^{42}$, $X^{43}$, $X^{44}$ and $X^{45}$ are the same, and $R^{41}$ and $R^{42}$ are independently H, methyl, ethyl, propyl, iso-propyl, butyl, but-2-yl, 2-methylpropyl, t-butyl, pentyl or hexyl. Preferably, $X^{41}$, $X^{42}$, $X^{43}$, $X^{44}$ and $X^{45}$ are O; $R^{41}$ is H; and $R^{42}$ is methyl, ethyl, propyl, or butyl. More preferably $R^{42}$ is butyl.

In some embodiments, a polymer of the invention comprises: (i) a repeating unit represented by Formula (I); (ii) a repeating unit represented by Formula I and a repeating unit represented by Formula II, provided that the repeating unit represented by Formula I and the repeating unit represented by Formula II are different; (iii) a repeating unit represented by Formula I and a repeating unit represented by Formula III; (iv) a repeating unit represented by Formula I and a repeating unit represented by Formula IV; (v) a repeating unit represented by Formula IV; and/or (vi) a repeating unit represented by Formula III and a repeating unit represented by Formula IV. For example, the polymer comprises: (i) a repeating unit represented by Formula (I); (ii) a repeating unit represented by Formula I and a repeating unit represented by Formula II, provided that the repeating unit represented by Formula I and the repeating unit represented by Formula II are different; (iii) a repeating unit represented by Formula I and a repeating unit represented by Formula III; and/or (iv) a repeating unit represented by Formula I and a repeating unit represented by Formula IV.

In some embodiments, the polymer comprises: (i) a repeating unit represented by Formula (I); (ii) a repeating unit represented by Formula I and a repeating unit represented by Formula II, provided that the repeating unit represented by Formula I and the repeating unit represented by Formula II are different; and/or (iii) a repeating unit represented by Formula I and a repeating unit represented by Formula III.

In some preferred embodiments, the polymer comprises: (i) a repeating unit represented by Formula I and a repeating unit represented by Formula II, provided that the repeating unit represented by Formula I and the repeating unit represented by Formula II are different; and/or (ii) a repeating unit represented by Formula I and a repeating unit represented by Formula III.

The number of repeat units in a polymer disclosed herein can range from about 10 to about 100,000. For example, the number of repeat units in the polymer can be from about 50 to about 20,000, from about 75 to about 15,000, from about 100 to about 10,000, or from about 150 to about 5,000. Preferably, the number of repeat units in the polymer is from about 200 to about 1,000.

As is well known in the art, polymers can be created having various different chain lengths and architectures. Additionally, physical and chemical properties of a given polymer can be a function of chain length. The polymer dispersion Index (PDI) is a metric that details the distribution of polymer chain lengths within a sample polymer. For certain applications, a relatively short chain length may be desired, while other applications call for polymer properties associated with polymers having relatively long chain lengths. Generally, the PDI can range from about 0.25 to about 5. For example, PDI can range from about 0.25 to about 2. In some embodiments, the polymer has a PDI about 1.5 or lower. Preferably, the polymer has a PDI of about 1.25 or lower.

In some embodiments, the PDI is less than about 1.75, less than about 1.5, less than about 1.25, less than about 1, less than about 0.9, less than about 0.8, less than about 0.75, less than about 0.7, less than about 0.6, less than about 0.5, less than about 0.4, or less than about 0.3. In some embodiments, PDI is about 2, about 2.25, about 2.5, about 2.75, about 3 or higher. In some embodiments, PDI is in the range from about from about 0.25 to about 2. For example, PDI is in the range from about 1 to about 1.5. Preferably, PDI is in the range from about 1.05 to about 1.35.

The polymers can have a molecular weight (MW) of from about 0.5 kDa to about 25 kDa. For example, polymers can have a molecular weight of from about 1 kDa to about 22.5 kDa. In some embodiments, polymers can have a molecular weight of from about 5 kDa to about 20 kDa. In some embodiments, polymers can have molecular weight of from about 5.5 kDa to about 11 kDa, from about 5.5 kDa to about 13 kDa, or from about 11 kDa to about 19.5 kDa. It is to be understood, the molecular weight can be the peak average molecular weight (Mp), the number average molecular weight (Mn), or the weight average molecular weight (Mw). In some embodiments, molecular weight is number average molecular weight (Mn).

Generally, more than 50%, more than 55%, more than 60%, more than 65%, more than 70%, more than 75%, more than 80%, more than 85%, more than 90% or more than 95% of adjacent stereocenters in the polymer have the same relative stereochemistry. In some embodiments, greater than 50%, greater than 55%, greater than 60%, greater than 65%, greater than 70%, greater than 75%, greater than 80%, greater than 85%, greater than 90% or greater than 95%, of the stereocenters are of the same stereochemistry. In some other embodiments, the polymer has a random stereochemistry.

The polymers described herein have adhesive properties. In some embodiments, adhesive is a pressure sensitive adhesive, e.g., the polymer is a pressure sensitive adhesive ("PSA polymer"). A "PSA polymer" is essentially any polymer, copolymer, or blend of polymer that has pressure-sensitive adhesive properties—that is, sufficient inherent tack, sufficient loss modulus, and sufficiently low glass transition temperature, to enable the polymer to form a firm bond with a substrate upon contact under light pressure, e.g., finger pressure, at the temperature of use (e.g., room temperature. Generally, a PSA polymer (dry) requires no activation by water, solvent, or heat in order for it to form such a bond.

Also provided herein are compositions comprising a polymer described herein. As described herein, the inventors have discovered inter alia that adhesive properties of the polymer described here can be tuned for a desired application. Accordingly, in another aspect provided herein is an adhesive composition comprising a polymer described herein.

As used herein an "adhesive" takes the general meaning as understood in the art and is a composition that provides bonding between at least two sites, such as between a first surface of a first object and a second surface of a second object. Some properties that can characterize a polymer, such as a polymer adhesive properties, include the viscoelastic properties, the tack strength the peel strength, the glass transition temperature and the decomposition temperature.

An adhesive's viscoelastic properties relates to is ability to wet a surface and subsequently form an adhesive bond in a useful time frame for its specific purpose. For example, an adhesive tape for some uses would need to form a bond within less than a second while a wood glue could take several hours. Viscoelastic properties can be measured by dynamic mechanical testing (DMT) In DMT an oscillating stress or strain is provided to the material being tested, for example, in ranges between 0 and 100 rads/s and the corresponding stress or strain is measured. For example, DMT testing can be performed with a commercial rheometer using a parallel plate geometry with a gap size (e.g., 50 μm) and frequency sweeps such as between 0.1 rad/s or 1 to 500 rad/s at 1% strain. The temperature can also be controlled and can be selected between values for the particular adhesive application, for example between −50 and 400° C. (e.g., for a low temperature to a high temperature adhesive).

DMT can provide the storage or elastic modulus (G' or E') and the loss or viscous modulus (G" or E"). The storage module relates to the elastic properties of the material and amount of elastic energy stored in a material while the loss modules relates to the viscous part or amount of energy the sample dissipates. Where a material has a higher storage modulus than storage loss, it can be characterized as more elastic, as compared to a material that has a higher storage loss than storage modulus where it can be characterized as more viscous. The ratio of the loss to storage modulus (G"/G' or E"/E') is defined as the tan δ and indicates the relative amount of energy dissipation. In comparing two materials, a first one with a higher tan δ would be more viscous (less elastic) than a second material having a lower tan δ which would be more elastic (less viscous). The sum of the storage modulus and storage loss is known as the complex modulus (G*). The complex viscosity (η) can be directly calculated from the complex modulus.

In some embodiments the polymers as described herein have a storage loss (G") that is larger than or equal to the storage modulus (G'), for example, in a frequency range between about 0 and 100 rad/S (e.g., between about 5 and about 50 rad/s) and in temperature range between about 0 and 100° C. (e.g., between about 15 and about 60° C., between about 20 and about 50° C.). In some embodiments the polymers described herein have a tan δ less than about 20 (Pa), such as less than about 10 Pa, or between about 0.1 and about 10); in a temperature range between about 0 and 100° C. (e.g., between about 15 and about 60° C., between about 20 and about 50° C., e.g., at about 25° C.).

In some embodiments the polymers as described herein have a complex viscosity between about $10^3$ and $10^6$ Pa, in a frequency range between about 0 and 100 rad/S (e.g., between about 5 and about 50 rad/s) and in a temperature range between about 0 and 100° C. (e.g., between about 15 and about 60° C., between about 20 and about 50° C.). In some embodiments the polymers have a complex viscosity between about $3\times10^3$ and $10^4$ Pa at about 50° C., between about $10^4$ and about $10^5$ Pa at about 37° C. and between about $10^5$ and about $10^5$ Pa at about 20° C.

In some embodiments the viscoelastic properties (G', G", tan δ, and η) as described herein for the polymer are for the polymers immersed in a liquid such as including water. In some embodiments the viscoelastic properties (G', G", tan δ, and η) as described herein are for the polymers are for the polymer in a gas such as air.

As used herein "tack strength" relates to the amount of force required to pull apart a first and second object that are bonded using an adhesive. The tack strength of an adhesive to specific material can be quantified by use of a rheometer under controlled conditions such as temperature, the contact areas of the adhesive to the first and/or second object, and the pull apart rate between the first and second object. For example, the tack strength can be measured at room temperature (e.g., between about 20 and 25° C.), or lower than room temperature, or higher than room temperature (e.g., between about 25 and 100° C., between about 35 and about 80° C., such as 37 and 50° C.). The tack strength can be measure using a specific material of interest, or test material, (e.g., a first object), which is coated with the adhesive (e.g., on a first surface), and which is then contacted with a surface of a steel plate (e.g., a second surface of a second object), such as a steel plate having a diameter of 8 mm diameter. The steel plate is lowered onto the adhesive with some applied pressure (e.g., 50 N) and after a time (e.g., 5 sec) the steel plate is pulled away at a fixed rate (e.g., 100 μm/s) from the specific material of interest being tested. The maximum force during the pulling away step can be used as a quantitative measure of the tack strength and is also known as the "Stack". The specific material tested can be any material having surface that can be coated with the adhesive. For example, and without limitation, a ceramic (e.g., glass), a metal, wood or a low energy surface material polytetrafluoroethylene (PTFE) can be tested.

In some embodiments a polymer as described herein can provide a tack strength of at least 20 N, such as at least 25 N, at least 30 N, at least 35N or at least 40 N. In some embodiments the polymer can provide a tack strength between about 20 and about 100 N, such as between 20 and about 80 N, between about 20 and about 60 N, between about 30 and about 50 N, or between about 30 and about 45 N.

In some embodiments the tack strength as described herein for the polymer are for the polymers immersed in a liquid such as including water. For example, where the polymer comprises an adhesive and the adhesive is applied to a surface before or after it is immersed in a liquid. In some embodiments the tack strength as described herein are for the polymers are for the polymer in a gas such as air.

As used herein "peel strength" relates to the amount of force required to pull apart a first and second object that are bonded using an adhesive where at least one of the first object or the second object are flexible. The peel strength is quantified as the force per width required to separate a flexible substrate from a rigid substrate and is sometimes also referred to as the peel force. The peel strength can be measured by peel testing as defined by standard test method ASTM D903. Briefly, in this method a strip of A4 paper (2.6 cm×8 cm-face substrate) is wetted with an adhesive and bonded to a glass slide (base substrate). The paper strip is pulled away from the glass slide at a 180° peel angle and a rate of 360 mm/min using an Instron 5944 series.

In some embodiments a polymer as described herein can provide a peel strength of is at least 1 N/cm, such as at least 1.5 N/cm, at least 2.0 N/cm, at least 2.5 N/cm, at least 3.0 N/cm, at least 3.5 N/cm or even at least 4.0 N/cm. In some embodiments the polymer has a peel strength between about 1.0 and about 10 N/cm, between about 1.5 and about 5 N/cm. In some embodiments the peel strength is in a range between commercially available adhesive tapes (e.g., tapes and bandages comprising poly(ethyl acrylate/poly(butyl acrylate) or commercially available hot-melt glues (e.g., hot melt wood glue comprising and ethylene-co-vinyl acetate (EVA)).

In some embodiments the peel strength as described herein for the polymer are for the polymers immersed in a liquid such as including water. For example, where the polymer comprises an adhesive and the adhesive is applied to a surface before or after it is immersed in a liquid. In some embodiments the peel strength as described herein are for the polymers are for the polymer in a gas such as air.

In some embodiment the glass transition temperature (Tg) is less than about 35° C. such as less than about 10° C., or less than about 0° C. In some embodiments the polymer has a Tg higher than about −50° C., higher than about −25° C., or higher than about −10° C.

In some embodiments the polymer has a decomposition temperature less than about 350° C., less than about 300° C., less than about 250° C. In some embodiments the polymer has a decomposition temperature above about 100° C. above about 150° C. above about 200° C. In some embodiments the polymer has a Tg below about 0° C., such as between about 0° C.

In some embodiments the polymer, such as a carbonate polymer (e.g., is copolymerized with $CO_2$), has a glass transition temperature ($T_g$) higher than a comparative polymer that is an acrylate (e.g., is not copolymerized with $CO_2$). In some embodiments the polymer, such as a carbonate polymer has a decomposition temperature ($T_d$) lower than a comparative polymer that is an acrylate (e.g., is not copolymerized with $CO_2$).

In some embodiments the polymer can be added to or formulated with a solution to provide a polymer in solution. For example, the solution can be an aqueous, e.g., in an aquoues solvent such as water or an organic solution. Without limitation, the organic solution can include solvents such as alcohols, alkanes, aromatic compounds, halogenated compounds, ethers, ketones, sulfoxides, organic acids, and esters. In some embodiments the solvent is selected from acetic acid, acetone, acetonitrile, benzene, 1-butanol, 2-butanol, 2, butanone, t-butyl alcohol, carbon tetrachloride, chlorobenzene, chloroform, cyclohexane, 1,2-dichloroethane, dietylene glycol, diethyl ether, diglyme, glyme, formamide, dimethyle sulfoxide, 1,4-dioxane, ethanol, ethyle acetate, ethylene glycol, glycerin, heptane, hexamethylphophoramide, Hexamethylphosphorous, hexamethylphophorous triamide, hexane, methanol, methyl t-butyle ether, methylene chloride, N-methyl-2-pyrrolidinone, nitromethane, pentane, petroleum ether, 1-propanol, 2-propanol, pyridine, tetrahdyrofurane, triethyle amine, supercritical $CO_2$, water or mixtures of two or more of these, or aqueous solution including water and none or one or more of these. In embodiments where the solvent includes an aqueous solution, the solution can be a buffered solution, a pH adjusted solution, or an electrolyte including one or more dissolved salt therein.

In some embodiments the concentration of the polymer in the solution is between about 1 wt % to 99 wt %. In some embodiments the concentration of the polymer in the solution is more than about 10 wt %, 20 wt %, 30 wt %, 40, wt %, 50 wt %, 60 wt %, 70 wt %, 80 wt %, 90 wt %. In some embodiments the concentration of the polymer in the solution is less than about 90 wt 5, 80 wt %, 70 wt %, 60 wt %, 50 wt %, 40 wt %, 30 wt %, 20 wt %, or 10 wt %. In some embodiments the polymer is dissolved in the solution (e.g., greater than 80 wt % of the polymer is dissolved in the solution, greater than 90 wt % of the polymer is dissolved in the solution, greater than 99 wt % of the polymer is dissolved in the solution). In some embodiments the polymer is not dissolved in the solution (e.g., less that 20 wt % of the polymer is dissolved in the solution, less than 10 wt % of the polymer is dissolved in the solution, less than 1 wt % of the polymer is dissolved in the solution). In some embodiment the polymer forms an emulsion or microemulsion in the solution. In some embodiments, such as where an emulsion or micro-emulsion is formed, the solution further comprises emulsifiers, viscosity modifiers, stabilizing agents and anti-foam agents such as surfactants or colloidal particles. In some embodiments the solution containing the polymer has a viscosity between about 0.8 cP and about 100,000 cP (e.g., between about 1 and about 10,000 cP, between about 1 and about 1000 cp, or between about 1 and about 100 cp). In some embodiments the polymer is formulated as a blend with another polymer such as one or more of a polyethylene oxide, a polypropylene oxide, a polyester, a polyurethane, a polypropylene, polyethylene, polypropylene, polyacrylate, polystyrene, polyethylene terephthalate, polybutylene terephthalate, silicone polymer, or copolymers of these.

Also provided herein is a surface coated with a polymer disclosed herein.

Without limitations, the polymer disclosed herein can be formed into films, sheets, meshes, mats, non-woven mats, foams, fibers, gels, cross-linked gels, and/or particles. The polymer disclosed herein can also be included in melts, waxes, and/or viscous liquids. Further, the polymer can be combined with a second polymer, e.g., a polymer not disclosed herein, to form copolymers or mixtures. Moreover, the polymers described herein can be processed into a variety of form factors and used as degradable, e.g., biodegradable plastics for consumer and industrial applications where polyalkylacrylates and polycarbonates are used.

Polymers described herein can also be used as adhesives, e.g., bioadhesives, pressure sensitive adhesives or thermoresponsive adhesives. Accordingly, in one aspect provided herein is a method for bonding at least two sites together.

Generally, the method comprises applying a polymer described herein, or a composition comprising a polymer described herein, to at least one site and contacting the two sites together.

As used herein a site to be bonded is any surface of an object that can be coated with a polymer described herein or a composition comprising the same, wherein at least a portion of the polymer or composition can be contacted with a second site on the same object or on a site on surface of a second, and where by contacting, the polymer forms a bond between the first site and the second site.

The surfaces to be bonded together can be smooth surface or a rough/textured surfaces. In some embodiments, the site to be bonded comprises a smooth surface. In some other embodiments, the site to be bonded comprises a rough or textured surface. In still some embodiments, one of the sites comprises a smooth surface and one of the sites comprises a a rough or textured surface.

In some embodiments at least a portion of the surface is located in the interior of the object, such as in pours or other openings where the adhesive can form into. In some embodiments the surface is provide by a mesh, web or woven material such as from a fiber. In some embodiments the surface has a low surface energy such as below about 25 mN/m. In some embodiments the surface has an intermediate surface energy between about 25 and about 40 mN/m. In some embodiments the surface has a surface higher surface energy such as between about 4 and about 100 mN/m. In some embodiments the surface has a surface energy greater than about 100 mN/m.

In some embodiments, the first or second sites is immersed in a fluid, such as before or after applying a polymer described herein to the first or second site.

In some embodiments, the site to be bonded is on a biological surface. As used herein, the term "biological surface" includes, without limitation, skin, mucosal membranes, nails, blood vessel walls, and all other biological surfaces of any living organism. In some embodiments the biological surface is provided by connective tissue such as connective tissues including collagen, chondrin, cellulose, and elastin. In some embodiments the biological surface is provided by a biological membrane such as a serous membrane, cutaneous membrane, synovial membrane, meniges, the connective tissues derived therefrom, the fibrous tissues derived therefrom, or combinations of these. In some embodiments the biological surface is provided by a pericardium. In some embodiments the biological surface is provided by a pericardium substitute such as a glutaraldehyde-stabilized pericardium. In some embodiments the biological surface is a skin (cutaneous membrane) such as for providing a skin graft.

In some embodiments the surface is a synthetic surface, such as from a synthetic polymer. For example, and without limitation, a polymer can be selected from low-density polyethylene, high-density polyethylene, polypropylene, polyvinyl chloride, polystyrene, polyesters, polytetrafluoroethylene, polyurethanes, silicones, copolymers thereof and blends thereof. In some embodiments the surface is a ceramic such as a non-metallic oxide, nitride, boride, carbide or silicate (e.g., silica glass, Boron oxide). In some embodiments the synthetic material is a metal oxide, nitride, carbide, boride or silicate such as $TiO_2$, or ZnO. In some embodiments the synthetic material is a metal, such as copper, titanium, steel, iron, gold, silver, platinum, palladium, or amalgams containing these metals. In some embodiments the synthetic surface is a non-metallic elemental compound such as diamond.

In some embodiments the surface is a surface of a medical device. For example, a surgical staple, a transdermal drug delivery patch, a medical implant, a biomedical electrode for patient monitoring, a dressing or a bandage. In some embodiments the medical device is a surgical staple used for resection surgery and application of a buttress such as a collagen buttress.

Some Selected Definitions

For convenience, certain terms employed herein, in the specification, examples and appended claims are collected herein. Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments, and are not intended to limit the claimed invention, because the scope of the invention is limited only by the claims. Further, unless otherwise required by context, singular terms shall include pluralities and plural terms shall include the singular.

Unless otherwise defined, e.g., as above, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described herein. In addition, the materials, methods, and examples are illustrative only and not intended to be limiting.

As used herein, the term "biocompatible" refers to the absence of an adverse acute, chronic, or escalating biological response to an implant or coating, and is distinguished from a mild, transient inflammation which typically accompanies surgery or implantation of foreign objects into a living organism.

As used herein, the term "biodegradable" refers to the erosion or degradation of a material into smaller entities which will be metabolized or excreted under the conditions normally present in a living tissue. Biodegradation is preferably predictable both in terms of the degradation products formed, including metabolic byproducts formed, and in terms of duration, whereas the duration of biodegradation can be dependant upon the chemical structure of the material.

As used herein, the term "co-polymer" refers to a polymer comprised of at least two different monomer constituents. A copolymer can comprise a co-polymer in which a base (main) monomer (which forms a biodegradable polymer) is polymerized with a doping agent as described herein. In some embodiments, a block co-polymer including doping agent in this manner is prepared and then mixed with the biodegradable polymer (i.e., the first monomer polymerized without the doping agent) and bioactive agent in the manufacture of a 3-dimensional composition as described herein. The co-polymer can possess a block or random structure.

Where reference is made to a URL or other such identifier or address, it understood that such identifiers can change and particular information on the internet can come and go, but equivalent information can be found by searching the internet. Reference thereto evidences the availability and public dissemination of such information.

As used herein the term "comprising" or "comprises" is used in reference to compositions, methods, and respective component(s) thereof, that are essential to the invention, yet open to the inclusion of unspecified elements, whether essential or not.

As used herein the term "consisting essentially of" refers to those elements required for a given embodiment. The term permits the presence of elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

As used in this specification and the appended claims, the singular forms "a," "an," and "the" include plural references unless the context clearly dictates otherwise. Thus for example, references to "the method" includes one or more methods, and/or steps of the type described herein and/or which will become apparent to those persons skilled in the art upon reading this disclosure and so forth.

Other than in the operating examples, or where otherwise indicated, all numbers expressing quantities of ingredients or reaction conditions used herein should be understood as modified in all instances by the term "about." The term "about" when used in connection with a value can mean 5%, 4.5%, 4%, 3.5%, 3%, 2.5%, 2%, 1.5%, mean 1% or 0.5% of the value being referred to.

Unless specific definitions are provided, the nomenclature used in connection with, and the laboratory procedures and techniques of, analytical chemistry, biochemistry, synthetic organic chemistry, and medicinal and pharmaceutical chemistry described herein are those known in the art. In the event that there is a plurality of definitions for terms herein, those in this section prevail.

As used herein, the abbreviations for any protective groups, amino acids, and other compounds are, unless indicated otherwise, in accord with their common usage, recognized abbreviations, or the IUPAC-IUB Commission on Biochemical Nomenclature, *Biochem.*, 11:942-944 (1972).

As used herein, use of the singular includes the plural unless specifically stated otherwise. As used herein, "or" means "and/or" unless stated otherwise. Furthermore, use of the term "including" as well as other forms, such as "includes," and "included," is not limiting.

"Alkyl" refers to an aliphatic hydrocarbon group which can be straight or branched having 1 to about 60 carbon atoms in the chain, and which preferably have about 6 to about 50 carbons in the chain. "Lower alkyl" refers to an alkyl group having 1 to about 8 carbon atoms. "Higher alkyl" refers to an alkyl group having about 10 to about 20 carbon atoms. The alkyl group can be optionally substituted with one or more alkyl group substituents which can be the same or different, where "alkyl group substituent" includes halo, amino, aryl, hydroxy, alkoxy, aryloxy, alkyloxy, alkylthio, arylthio, aralkyloxy, aralkylthio, carboxy, alkoxycarbonyl, oxo and cycloalkyl. There can be optionally inserted along the alkyl chain one or more oxygen, silicon, sulfur, or substituted or unsubstituted nitrogen atoms, wherein the nitrogen substituent is lower alkyl. "Branched" refers to an alkyl group in which a lower alkyl group, such as methyl, ethyl or propyl, is attached to a linear alkyl chain. Exemplary alkyl groups include methyl, ethyl, i-propyl, n-butyl, t-butyl, n-pentyl, heptyl, octyl, decyl, dodecyl, tridecyl, tetradecyl, pentadecyl and hexadecyl. Useful alkyl groups include branched or straight chain alkyl groups of 6 to 50 carbon, and also include the lower alkyl groups of 1 to about 4 carbons and the higher alkyl groups of about 12 to about 16 carbons.

"Alkenyl" refers to an alkyl group containing at least one carbon-carbon double bond. The alkenyl group can be optionally substituted with one or more "alkyl group substituents." Exemplary alkenyl groups include vinyl, allyl, n-pentenyl, decenyl, dodecenyl, tetradecadienyl, heptadec-8-en-1-yl and heptadec-8,11-dien-1-yl.

"Alkynyl" refers to an alkyl group containing a carbon-carbon triple bond. The alkynyl group can be optionally substituted with one or more "alkyl group substituents." Exemplary alkynyl groups include ethynyl, propargyl, n-pentynyl, decynyl and dodecynyl. Useful alkynyl groups include the lower alkynyl groups.

"Cycloalkyl" refers to a non-aromatic mono- or multicyclic ring system of about 4 to about 10 carbon atoms. The cycloalkyl group can be optionally partially unsaturated. The cycloalkyl group can be also optionally substituted with an aryl group substituent, oxo and/or alkylene. Representative monocyclic cycloalkyl rings include cyclopentyl, cyclohexyl and cycloheptyl. Useful multicyclic cycloalkyl rings include adamantyl, octahydronaphthyl, decalin, camphor, camphane, and noradamantyl.

"Heterocyclyl" refers to a nonaromatic 5-8 membered monocyclic, 8-12 membered bicyclic, or 11-14 membered tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively). $C_x$heterocyclyl and $C_x$-$C_y$heterocyclyl are typically used where X and Y indicate the number of carbon atoms in the ring system. In some embodiments, 1, 2 or 3 hydrogen atoms of each ring can be substituted by a substituent. Exemplary heterocyclyl groups include, but are not limited to piperazinyl, pyrrolidinyl, dioxanyl, morpholinyl, tetrahydrofuranyl, piperidyl, 4-morpholyl, 4-piperazinyl, pyrrolidinyl, perhydropyrrolizinyl, 1,4-diazaperhydroepinyl, 1,3-dioxanyl, 1,4-dioxanyland the like.

"Aryl" refers to an aromatic carbocyclic radical containing about 6 to about 10 carbon atoms. The aryl group can be optionally substituted with one or more aryl group substituents, which can be the same or different, where "aryl group substituent" includes alkyl, alkenyl, alkynyl, aryl, aralkyl, hydroxy, alkoxy, aryloxy, aralkoxy, carboxy, aroyl, halo, nitro, trihalomethyl, cyano, alkoxycarbonyl, aryloxycarbonyl, aralkoxycarbonyl, acyloxy, acylamino, aroylamino, carbamoyl, alkylcarbamoyl, dialkylcarbamoyl, rylthio, alkylthio, alkylene and —NRR', where R and R' are each independently hydrogen, alkyl, aryl and aralkyl. Exemplary aryl groups include substituted or unsubstituted phenyl and substituted or unsubstituted naphthyl.

"Heteroaryl" refers to an aromatic 5-8 membered monocyclic, 8-12 membered fused bicyclic, or 11-14 membered fused tricyclic ring system having 1-3 heteroatoms if monocyclic, 1-6 heteroatoms if bicyclic, or 1-9 heteroatoms if tricyclic, said heteroatoms selected from O, N, or S (e.g., carbon atoms and 1-3, 1-6, or 1-9 heteroatoms of N, O, or S if monocyclic, bicyclic, or tricyclic, respectively.

Exemplary aryl and heteroaryls include, but are not limited to, phenyl, pyridinyl, pyrimidinyl, furanyl, thienyl, imidazolyl, thiazolyl, pyrazolyl, pyridazinyl, pyrazinyl, triazinyl, tetrazolyl, indolyl, benzyl, naphthyl, anthracenyl, azulenyl, fluorenyl, indanyl, indenyl, naphthyl, tetrahydronaphthyl, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl, and the like. In some embodiments, 1, 2, 3, or 4 hydrogen atoms of each ring can be substituted by a substituent.

"Acyl" refers to an alkyl-CO— group, wherein alkyl is as previously described. Exemplary acyl groups comprise alkyl of 1 to about 30 carbon atoms. Exemplary acyl groups also include acetyl, propanoyl, 2-methylpropanoyl, butanoyl and palmitoyl.

"Aroyl" means an aryl-CO— group, wherein aryl is as previously described. Exemplary aroyl groups include benzoyl and 1- and 2-naphthoyl.

"Alkoxy" refers to an alkyl-O— group, wherein alkyl is as previously described. Exemplary alkoxy groups include methoxy, ethoxy, n-propoxy, i-propoxy, n-butoxy, and heptoxy.

"Aryloxy" refers to an aryl-O— group, wherein the aryl group is as previously described. Exemplary aryloxy groups include phenoxy and naphthoxy.

"Alkylthio" refers to an alkyl-S— group, wherein alkyl is as previously described. Exemplary alkylthio groups include methylthio, ethylthio, i-propylthio and heptylthio.

"Arylthio" refers to an aryl-S— group, wherein the aryl group is as previously described. Exemplary arylthio groups include phenylthio and naphthylthio.

"Aralkyl" refers to an aryl-alkyl- group, wherein aryl and alkyl are as previously described. Exemplary aralkyl groups include benzyl, phenylethyl and naphthylmethyl.

"Aralkyloxy" refers to an aralkyl-O— group, wherein the aralkyl group is as previously described. An exemplary aralkyloxy group is benzyloxy.

"Aralkylthio" refers to an aralkyl-S— group, wherein the aralkyl group is as previously described. An exemplary aralkylthio group is benzylthio.

"Dialkylamino" refers to an —NRR' group, wherein each of R and R' is independently an alkyl group as previously described. Exemplary alkylamino groups include ethylmethylamino, dimethylamino, and diethylamino.

"Alkoxycarbonyl" refers to an alkyl-O—CO— group. Exemplary alkoxycarbonyl groups include methoxycarbonyl, ethoxycarbonyl, butyloxycarbonyl, and t-butyloxycarbonyl.

"Aryloxycarbonyl" refers to an aryl-O—CO— group. Exemplary aryloxycarbonyl groups include phenoxy- and naphthoxy-carbonyl.

"Aralkoxycarbonyl" refers to an aralkyl-O—CO— group. An exemplary aralkoxycarbonyl group is benzyloxycarbonyl.

"Carbamoyl" refers to an H2N—CO— group.

"Alkylcarbamoyl" refers to a R'RN—CO— group, wherein one of R and R' is hydrogen and the other of R and R' is alkyl as previously described.

"Dialkylcarbamoyl" refers to R'RN—CO— group, wherein each of R and R' is independently alkyl as previously described.

"Acyloxy" refers to an acyl-O— group, wherein acyl is as previously described. "Acylamino" refers to an acyl-NH— group, wherein acyl is as previously described. "Aroylamino" refers to an aroyl-NH— group, wherein aroyl is as previously described.

"Alkylene" refers to a straight or branched bivalent aliphatic hydrocarbon group having from 1 to about 30 carbon atoms. The alkylene group can be straight, branched, or cyclic. The alkylene group can be also optionally unsaturated and/or substituted with one or more "alkyl group substituents." There can be optionally inserted along the alkylene group one or more oxygen, sulphur, or substituted or unsubstituted nitrogen atoms, wherein the nitrogen substituent is alkyl as previously described. Exemplary alkylene groups include methylene (—CH-ethylene (—CH$_2$—CH$_2$—), propylene (—(CH$_2$)$_3$—), cyclohexylene (—C$_6$H$_{10}$—), —CH═CH— —CH═CH—, —CH═CH—CH$_2$—, —(CF$_2$)$_n$(CH$_2$)$_m$—, wherein n is an integer from about 1 to about 50 and m is an integer from 0 to about 50, —(CH$_2$)$_n$—N(R)—(CH$_2$)$_m$—, wherein each of m and n is independently an integer from 0 to about 50 and R is hydrogen or alkyl, methylenedioxy (—O—CH$_2$—O—) and ethylenedioxy (—O—(CH$_2$)$_2$—O—). An alkylene group can have about 2 to about 3 carbon atoms and can further have 6-50 carbons.

"Halo" or "halide" refers to fluoride, chloride, bromide, or iodide.

The term "agent" includes without limitation, medicaments, vitamins, mineral supplements, hormones, growth factors, substances used for the treatment, prevention, diagnosis, cure or mitigation of disease or illness, substances that affect the structure or function of the body, or pro-drugs, which become biologically active or more active after they have been placed in a predetermined physiological environment.

Standard techniques can be used for chemical syntheses, chemical analyses, pharmaceutical preparation, formulation and delivery, and treatment of subjects. Reactions and purification techniques can be performed, e.g., using kits according to manufacturer's specifications or as commonly accomplished in the art or as described herein. The foregoing techniques and procedures generally are performed according to conventional methods well known in the art and as described in various general and more specific references that are cited and discussed throughout the present specification. See e.g., Sambrook et al., Molecular Cloning: A Laboratory Manual (2d ed., Cold Spring Harbor Laboratory Press, Cold Spring Harbor, N.Y. (1989).

EXEMPLARY EMBODIMENTS

Exemplary embodiments of the various aspects described herein can be described by one or more of the following numbered embodiments:

Embodiment 1

A polymer comprising: (i) a repeating unit represented by Formula (I); and (ii) a repeating unit represented by Formula (II) or Formula (III):

where:

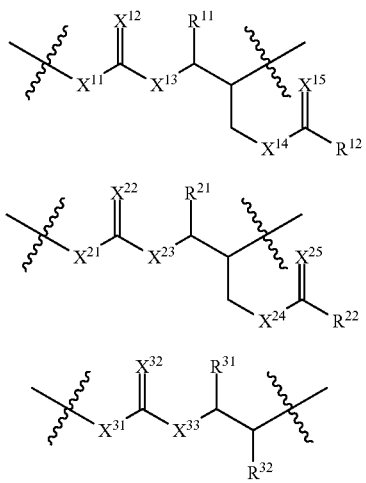

FORMULA I

FORMULA II

FORMULA III wherein:

$X^{11}, X^{12}, X^{13}, X^{14}, X^{15}, X^{21}, X^{22}, X^{23}, X^{24}, X^{25}, X^{31}, X^{32}$ and $X^{33}$ are independently selected from the group consisting of O, S, Se, and NH; and $R^{11}, R^{12}, R^{21}, R^{22}, R^{31}$ and $R^{32}$ are independently hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly(ethylene oxide), poly(hydroxyacid)), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, or an ionically crosslinkable group, wherein alkyl, alkenyl, cycloalkyl, aryl, heterocyclyl, heteroaryl, silyl, alkylsilyl, arylsilyl, alkylaryl, and arylalkyl is optionally substituted by one or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen;

provided that the repeating unit represented by Formula I and the repeating unit represented by Formula II are different.

Embodiment 2

The polymer of Embodiment 1, wherein $R^{12}$ and $R^{22}$ are different.

Embodiment 3

The polymer of Embodiment 1 or 2, wherein the polymer comprises a repeating unit represented by Formula I and a repeating unit represented by Formula II.

Embodiment 4

The polymer of any one of Embodiments 1-3, wherein the polymer comprises a repeating unit represented by Formula I and a repeating unit represented by Formula III.

Embodiment 5

The polymer of any one of Embodiments 1-4, wherein at least two of $X^{11}, X^{12}, X^{13}, X^{14}$ and $X^{15}$ are same.

Embodiment 6

The polymer of any one of Embodiments 1-5, wherein at least three of $X^{11}, X^{12}, X^{13}, X^{14}$ and $X^{15}$ are same

Embodiment 7

The polymer of any one of Embodiments 1-6, wherein at least four of $X^{11}, X^{12}, X^{13}, X^{14}$ and $X^{15}$ are same

Embodiment 8

The polymer of any one of Embodiments 1-7, wherein all of $X^{11}, X^{12}, X^{13}, X^{14}$ and $X^{15}$ are same.

Embodiment 9

The polymer of any one of Embodiments 1-8, wherein at least four of $X^{11}, X^{12}, X^{13}, X^{14}$ and $X^{15}$ are O.

Embodiment 10

The polymer of any one of Embodiments 1-9, wherein $R^{11}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

Embodiment 11

The polymer of any one of Embodiments 1-10, wherein $R^1$ is hydrogen or $C_1$-$C_{10}$alkyl, wherein $C_1$-$C_{10}$alkyl is optionally substituted with one, two, three, four, five or six substituents selected independently from the group consisting of hydroxyl, hydroxyether, carboxyl, amino, mono- or di-substituted amino, thiol, thioester, and halogen.

Embodiment 12

The polymer of any one of Embodiments 1-11, wherein $R^{11}$ is hydrogen, methyl, ethyl, propyl, iso-propyl, butyl, but-2-yl, 2-methylpropyl, t-butyl, pentyl or hexyl.

Embodiment 13

The polymer of any one of Embodiments 1-12, wherein $R^{11}$ is H.

Embodiment 14

The polymer of any one of Embodiments 1-13, wherein $R^{12}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

Embodiment 15

The polymer of any one of Embodiments 1-14, wherein $R^{12}$ is hydrogen or $C_1$-$C_{10}$ alkyl, wherein $C_1$-$C_{10}$alkyl is optionally substituted with one, two, three or four substituents selected independently from the group consisting of hydroxyl, hydroxyether, carboxyl, amino, mono- or di-substituted amino, thiol, thioester, and halogen.

Embodiment 16

The polymer of any one of Embodiments 1-15, wherein $R^{12}$ is hydrogen, methyl, ethyl, propyl, iso-propyl, butyl, but-2-yl, 2-methylpropyl, t-butyl, pentyl or hexyl.

Embodiment 17

The polymer of any one of Embodiments 1-16, wherein $R^{12}$ is methyl, ethyl, propyl, or butyl.

Embodiment 18

The polymer of any one of Embodiments, 1-17, wherein $R^{12}$ is methyl.

Embodiment 19

The polymer of any one of Embodiments, 1-18, wherein at least two of $X^{21}$, $X^{22}$, $X^{23}$, $X^{24}$ and $X^{25}$ are same.

Embodiment 20

The polymer of any one of Embodiments, 1-19, wherein at least three of $X^{21}$, $X^{22}$, $X^{23}$, $X^{24}$ and $X^{25}$ are same.

Embodiment 21

The polymer of any one of Embodiments, 1-20, wherein at least four of $X^{21}$, $X^{22}$, $X^{23}$, $X^{24}$ and $X^{25}$ are same.

Embodiment 22

The polymer of any one of Embodiments, 1-21, wherein all of $X^{21}$, $X^{22}$, $X^{23}$, $X^{24}$ and $X^{25}$ are same.

Embodiment 23

The polymer of any one of Embodiments, 1-22, wherein $X^{21}$, $X^{22}$, $X^{23}$, $X^{24}$ and $X^{25}$ are O.

Embodiment 24

The polymer of any one of Embodiments 1-23, wherein $R^{21}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

Embodiment 25

The polymer of any one of Embodiments, 1-24, wherein $R^{21}$ is hydrogen or $C_1$-$C_{10}$alkyl, wherein $C_1$-$C_{10}$alkyl is optionally substituted with one, two, three, four, five or six substituents selected independently from the group consisting of hydroxyl, hydroxyether, carboxyl, amino, mono- or di-substituted amino, thiol, thioester, and halogen.

Embodiment 26

The polymer of any one of Embodiments 1-25, wherein $R^{21}$ is hydrogen, methyl, ethyl, propyl, iso-propyl, butyl, but-2-yl, 2-methylpropyl, t-butyl, pentyl or hexyl.

Embodiment 27

The polymer of any one of Embodiments, 1-26, wherein $R^{21}$ is H.

Embodiment 28

The polymer of any one of Embodiments, 1-27, wherein $R^{22}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

Embodiment 29

The polymer of any one of Embodiments 1-28, wherein $R^{22}$ is hydrogen or $C_1$-$C_{10}$ alkyl, wherein $C_1$-$C_{10}$alkyl is optionally substituted with one, two, three or four substituents selected independently from the group consisting of hydroxyl, hydroxyether, carboxyl, amino, mono- or di-substituted amino, thiol, thioester, and halogen.

Embodiment 30

The polymer of any one of Embodiments 1-29, wherein $R^{22}$ is hydrogen, methyl, ethyl, propyl, iso-propyl, butyl, but-2-yl, 2-methylpropyl, t-butyl, pentyl or hexyl.

Embodiment 31

The polymer of any one of Embodiments 1-30, wherein $R^{22}$ is methyl, ethyl, propyl, or butyl.

Embodiment 32

The polymer of any one of Embodiments 1-31, wherein $R^{22}$ is methyl, ethyl, propyl, butyl.

Embodiment 33

The polymer of any one of Embodiments 1-32, wherein at least two of $X^{31}$, $X^{32}$, and $X^{33}$ are same.

Embodiment 34

The polymer of any one of Embodiments 1-33, wherein all three of $X^{31}$, $X^{32}$, and $X^{33}$ are same.

Embodiment 35

The polymer of any one of Embodiments 1-34, wherein $X^{31}$, $X^{32}$, and $X^{33}$ are O.

Embodiment 36

The polymer of any one of Embodiments, wherein 1-35, wherein $R^{31}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

Embodiment 37

The polymer of any one of Embodiments 1-36, wherein $R^{31}$ is hydrogen or $C_1$-$C_{10}$alkyl, wherein $C_1$-$C_{10}$alkyl is optionally substituted with one, two, three, four, five or six substituents selected independently from the group consisting of hydroxyl, hydroxyether, carboxyl, amino, mono- or di-substituted amino, thiol, thioester, and halogen.

Embodiment 38

The polymer of any one of Embodiments, 1-37, wherein $R^{31}$ is hydrogen, methyl, ethyl, propyl, iso-propyl, butyl, but-2-yl, 2-methylpropyl, t-butyl, pentyl or hexyl.

Embodiment 39

The polymer of any one of Embodiments 1-38, wherein $R^{31}$ is H.

Embodiment 40

The polymer of any one of Embodiments 1-39, wherein $R^{32}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

Embodiment 41

The polymer of any one of Embodiments 1-40, wherein $R^{32}$ is hydrogen or $C_1$-$C_{10}$ alkyl, wherein $C_1$-$C_{10}$alkyl is optionally substituted with one, two, three or four substituents selected independently from the group consisting of hydroxyl, hydroxyether, carboxyl, amino, mono- or di-substituted amino, thiol, thioester, and halogen.

Embodiment 42

The polymer of any one of Embodiments 1-41, wherein $R^{32}$ is hydrogen, methyl, ethyl, propyl, iso-propyl, butyl, but-2-yl, 2-methylpropyl, t-butyl, pentyl or hexyl.

Embodiment 43

The polymer of any one of Embodiments 1-42, wherein $R^{32}$ is methyl, ethyl, propyl, or butyl.

Embodiment 44

The polymer of any one of Embodiments 1-43, wherein $R^{32}$ is methyl.

Embodiment 45

The polymer of any one of Embodiments 1-44, wherein a ratio of Formula (I) to Formula (II) or (III) is from 1:99 to 99:1.

Embodiment 46

The polymer of any one of Embodiments, 1-45, wherein a number of repeat units of Formula (I) is higher than a number of repeat units of Formula (II) or (III).

Embodiment 47

The polymer of any one of Embodiments, 1-45, wherein a number of repeat units of Formula (I) is lower than a number of repeat units of Formula (II) or (III).

Embodiment 48

The polymer of any one of Embodiments 1-47, wherein the polymer comprises from about from about 10 to about 100,000 repeat units.

Embodiment 49

The polymer of any one of Embodiments 1-48, wherein the polymer has a polymer dispersion Index (PDI) of from about from about 0.25 to about 5, preferably from about 0.25 to about 2, more preferably from about 1.05 to about 1.35.

Embodiment 50

The polymer of any one of Embodiments 1-49, wherein the polymer has a PDI of less than about 1.75, preferably less than about 1.5, more preferably less than about 1.25.

Embodiment 51

The polymer of any one of Embodiments 1-50, wherein the polymer has a molecular weight (MW) of from about 0.5 kDa to about 25 kDa, preferably from about 5.5 kDa to about 11 kDa or from about 5.5 kDa to about 13 kDa, and more preferably from about 11 kDa to about 19.5 kDa Embodiment 52: The polymer of any one of Embodiments 1-51, wherein the polymer has a glass transition temperature (Tg)

Embodiment 53

The polymer of any one of Embodiments 1-52, wherein more than 50%, more than 55%, more than 60%, more than 65%, more than 70%, more than 75%, more than 80%, more than 85%, more than 90% or more than 95% of adjacent stereocenters in the polymer have the same relative stereochemistry.

Embodiment 54

The polymer of any one of Embodiments 1-52, wherein greater than 50%, greater than 55%, greater than 60%, greater than 65%, greater than 70%, greater than 75%, greater than 80%, greater than 85%, greater than 90% or greater than 95%, of the stereocenters are of the same stereochemistry.

Embodiment 55

The polymer of any one of Embodiments 1-52, wherein the polymer has a random stereochemistry.

Embodiment 56

A composition comprising a polymer of any one of Embodiments 1-55.

Embodiment 57

The composition of Embodiment 56, wherein the composition is in form of a solution, polymeric film, sheet, mesh, foam, fiber or particle.

Embodiment 58

The composition of Embodiment 56, wherein the composition is in form of solution.

Embodiment 59

An adhesive composition comprising a polymer, wherein the polymer comprises: (i) a repeating unit represented by Formula I; (ii) a repeating unit represented by Formula I and a repeating unit represented by Formula II, provided that the repeating unit represented by Formula I and the repeating unit represented by Formula II are different; (iii) a repeating unit represented by Formula I and a repeating unit represented by Formula III; and/or (iv) a repeating unit represented by Formula IV, wherein:

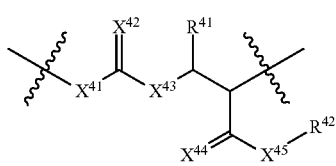

FORMULA IV wherein:
$X^{41}$, $X^{42}$, $X^{43}$, $X^{44}$ and $X^{45}$ are independently selected from the group consisting of O, S, Se, and NH; and $R^{41}$ and $R^{42}$ are independently hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly(ethylene oxide), poly(hydroxyacid)), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, or an ionically crosslinkable group, wherein alkyl, alkenyl, cycloalkyl, aryl, heterocyclyl, heteroaryl, silyl, alkylsilyl, arylsilyl, alkylaryl, and arylalkyl is optionally substituted by one or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

Embodiment 60

The adhesive of Embodiment 59, wherein the polymer is a polymer of any of Embodiments 1-55.

Embodiment 61

The adhesive composition of any one of Embodiments 59-60, wherein at least two of $X^{41}$, $X^{42}$, $X^{43}$, $X^{44}$ and $X^{45}$ are the same.

Embodiment 62

The adhesive composition of any one of Embodiments 59-61, wherein at least three of $X^{41}$, $X^{42}$, $X^{43}$, $X^{44}$ and $X^{45}$ are the same.

Embodiment 63

The adhesive composition of any one of Embodiments 59-62, wherein at least four of $X^{41}$, $X^{42}$, $X^{43}$, $X^{44}$ and $X^{45}$ are the same.

Embodiment 64

The adhesive composition of any one of Embodiments 59-63, wherein all five of $X^{41}$, $X^{42}$, $X^{43}$, $X^{44}$ and $X^{45}$ are the same.

Embodiment 65

The adhesive composition of any one of Embodiments 59-64, wherein $X^{41}$, $X^{42}$, $X^{43}$, $X^{44}$ and $X^{45}$ are O.

Embodiment 66

The adhesive composition of any one of Embodiments 59-65, wherein $R^{41}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

Embodiment 67

The adhesive composition of any one of Embodiments 59-66, wherein $R^{41}$ is hydrogen or $C_1$-$C_{10}$alkyl, wherein

41

$C_1$-$C_{10}$alkyl is optionally substituted with one, two, three, four, five or six substituents selected independently from the group consisting of hydroxyl, hydroxyether, carboxyl, amino, mono- or di-substituted amino, thiol, thioester, and halogen.

Embodiment 68

The adhesive composition of any one of Embodiments 59-67, wherein $R^{41}$ is hydrogen, methyl, ethyl, propyl, iso-propyl, butyl, but-2-yl, 2-methylpropyl, t-butyl, pentyl or hexyl.

Embodiment 69

The adhesive composition of any one of Embodiments 59-68, wherein $R^{41}$ is H.

Embodiment 70

The adhesive composition of any one of Embodiments 59-69, wherein $R^{42}$ is hydrogen, alkyl, alkenyl, cycloalkyl, aryl, heterocyclyl, heteroaryl, silyl, alkylsilyl, arylsilyl, alkylaryl or arylalkyl, where the alkyl, alkenyl, cycloalkyl, aryl, heterocyclyl, heteroaryl, silyl, alkylsilyl, arylsilyl, alkylaryl, and arylalkyl can be optionally substituted by one or more e.g., one, two, three, four, five, six or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen.

Embodiment 71

The adhesive composition of any one of Embodiments 59-70, wherein $R^{42}$ is hydrogen or $C_1$-$C_{10}$ alkyl, wherein $C_1$-$C_{10}$alkyl is optionally substituted with one, two, three or four substituents selected independently from the group consisting of hydroxyl, hydroxyether, carboxyl, amino, mono- or di-substituted amino, thiol, thioester, and halogen.

Embodiment 72

The adhesive composition of any one of Embodiments 59-71, wherein $R^{42}$ is hydrogen, methyl, ethyl, propyl, iso-propyl, butyl, but-2-yl, 2-methylpropyl, t-butyl, pentyl or hexyl.

Embodiment 73

The adhesive composition of any one of embodiments 59-72, wherein $R^{42}$ is methyl, ethyl, propyl, or butyl.

Embodiment 74

The adhesive composition of any one of embodiments 59-73, wherein $R^{42}$ is butyl Embodiment 75: The adhesive composition of any one of embodiments 59-74, wherein the adhesive is pressure-sensitive and/or thermos-responsive.

Embodiment 76

The adhesive composition of any one of embodiments 59-75, wherein the adhesive has a minimum peal force of at least 1 N/cm.

42

Embodiment 77

The adhesive composition of any one of embodiments 59-76, wherein the adhesive has a minimum tack strength of at least 20N.

Embodiment 78

A method for bonding at least two sites together, the method comprising applying a polymer to at least one site and contacting the at least two sites together, wherein the polymer comprises: (i) a repeating unit represented by Formula I; (ii) a repeating unit represented by Formula I and a repeating unit represented by Formula II, provided that the repeating unit represented by Formula I and the repeating unit represented by Formula II are different; (iii) a repeating unit represented by Formula I and a repeating unit represented by Formula III; and/or (iv) a repeating unit represented by Formula IV.

Embodiment 79

The method of Embodiment 78, where at least one site is a biological surface.

Embodiment 80

The method of Embodiment 78 or 79, wherein at least one site is a synthetic surface.

Embodiment 81

The method of Embodiment 80, wherein the synthetic surface is a surface of a medical device.

Embodiment 82

A method of forming an adhesive composition, the method comprising preparing an adhesive polymer comprising: (i) a repeating unit represented by Formula I; (ii) a repeating unit represented by Formula I and a repeating unit represented by Formula II, provided that the repeating unit represented by Formula I and the repeating unit represented by Formula II are different; (iii) a repeating unit represented by Formula I and a repeating unit represented by Formula III; and/or (iv) a repeating unit represented by Formula IV.

Embodiment 83

The method of any one of Embodiments 78-82, wherein the polymer is a polymer of any one Embodiments 1-55 or Embodiments 59-74.

EXAMPLES

The following examples illustrate some exemplary embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The following examples do not in any way limit the invention.

Example 1: Poly(Alkyl Glycidate Carbonate)s as Degradable Pressure Sensitive Adhesives Polyacrylates are widely used in industry; however, their all aliphatic backbone leads to minimal degradability with challenges in recovery and recyclability. Insertion of $CO_2$ into the backbone, forming poly(carbonate) analogues of poly(acrylate)s provides an environmentally friendly and biocompatible alternative polymer. The synthesis of five poly(carbonate) analogues of poly(methyl acrylate), poly (ethyl acrylate), and poly(butyl acrylate) is described. The polymers are prepared via the salen cobalt(III) complex catalyzed copolymerization of $CO_2$ and a derivatized oxirane. All the carbonate analogues possess higher glass transition temperatures ($T_g$=32 to −5° C.) than alkyl acrylates ($T_g$=10 to −50° C.), however, the carbonate analogues ($T_d$=~230° C.) undergo thermal decomposition at lower temperatures than their acrylate counterparts ($T_d$=~380° C.). Additionally, constitutionally isomeric poly(alkyl carbonates) in which the pendant ester group is in the reverse orientation to the backbone were synthesized. Compared to the acrylate derivative, the reverse analogues possess lower glass transition temperatures ($T_g$=24 to 0° C.). However, the polymerization reactions are 10× more efficient and with more polymer produced than the cyclic carbonate byproduct. The poly(alkyl carbonates) exhibit compositional dependent adhesivity, and two of the analogues possess comparative peel strength to DUCT® tape and SCOTCH™ tape. Finally, the poly(carbonate) analogues degrade into glycerol, alcohol, and $CO_2$ in a time and pH dependent manner with the rate of degradation accelerated at higher pH conditions, in contrast to the poly(acrylate)s.

Poly(alkyl acrylate)s are commodity polymers used in the pharmaceutical, cosmetic, automotive, adhesive, electronics, textiles, plastics, and paint industries.[1-5] For example, formulations of these poly(acrylate)s are used as pressure-sensitive adhesives (PSAs) in consumer-grade tapes, baby diapers, medical bandages, etc.[6,7] The PSA sector is among the fastest growing in the adhesive market, and new formulations with increased adhesivity, degradability, or stimuli-responsive characteristics are of interest.[8] However, their wide-spread industrial use on the multi-ton scale affords a significant non-degradable waste stream in society due to their all aliphatic carbon backbone.[9] As mounting plastic waste affects all aspects of life on earth, it is important to take into consideration a polymer's complete lifecycle from synthesis, to use, to degradation.[10,11] It is found herein, inter alia, that introducing a cleavable carbonate linkage within the poly(acrylate) backbone can give a degradable polymer while maintaining key properties, such as adhesivity.

Figure 1B:
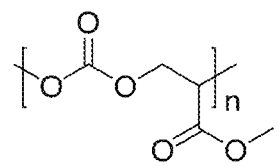
FIG. 1B shows the structure of poly(methyl acrylate carbonate) PMAc, poly(ethyl acrylate carbonate) PEAc, and poly(butyl acrylate carbonate) PBAc.
Figure 1B:
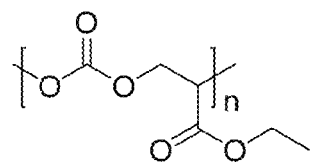
Figure 1B:
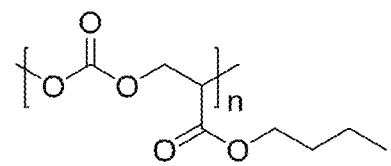
Figure 1C:
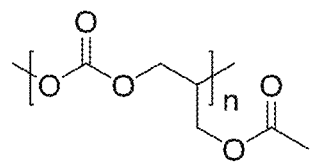
FIG. 1C shows the structures of poly(glycidyl ethyl ester carbonate) PGC-E poly(glycidyl butyl ester carbonate) PGC-B.
Figure 1C:
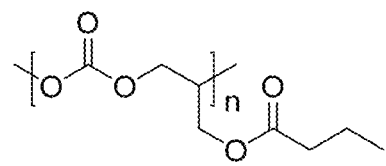

Commercially available poly(acrylate)s poly(methyl acrylate) (PMA), poly(ethyl acrylate) (PEA), and poly(butyl acrylate) (PBA) are shown in FIG. 1A. Corresponding glycidate carbonates poly(methyl acrylate carbonate) PMAc, poly(ethyl acrylate carbonate) PEAc, and poly(butyl acrylate carbonate) PBAc are shown in FIG. 1B. The glycidyl isomers poly(glycidyl ethyl ester carbonate) PGC-E poly(glycidyl butyl ester carbonate) PGC-B are shown in FIG. 1C.

The insertion of a carbonate moiety into the backbone of these acrylate polymers introduces an inherent glycidate or glycerol substructure allowing the carbonate analogue polymers to degrade into safe natural metabolites. (e.g., carbon dioxide, glycerol, glycidates, alcohols, and benign acids). Furthermore, given the polymer structure, it is proposed that these polymers can be synthesized via a green renewable process using $CO_2$ compared to a free radical polymerization reaction.[12,13] Herein is reported the synthesis and characterization of poly(carbonate) analogues of poly(methyl acrylate) (PMA), poly(ethyl acrylate) (PEA), and poly(butyl acrylate) (PBA) by the copolymerization of $CO_2$ and the corresponding alkyl glycidate. Additionally, herein is describe the role pendant chain steric interactions and electronics play in monomer reactivity as well as the properties of the resultant polymers via the study of two constitutionally isomeric polymers where the pendant group esters are in opposite orientation.

Polymers incorporating a glycerol backbone are of significant interest due to their degradability, biocompatibility, and chemical tunability.[14-23] Glycerol is listed as Generally Recognized As Safe (GRAS) by the Food and Drug Administration, and as such, linear, branched, hyperbranched, and dendritic polyglycerols are being investigated for a wide-variety of medical and non-medical use.[24-33]

To install the carbonate moiety within the polymer backbone, a polymerization methodology pioneered and brought to fruition by Coates,[34] Darensbourg,[35] Frey,[36] Inoue,[37,38] Lu,[39,40] and Nozaki[41,42] was selected. Specifically, the poly(carbonate)s were synthesized via the copolymerization of an oxiranyl monomer and $CO_2$ using a metal salen catalyst with a quaternary ammonium salt, rac-[SalcyCo$^{III}$DNP]DNP. Polymer selectivity was determined by $^1$H NMR spectroscopy (not shown) as the ratio of the polymeric methine hydrogen to the cyclic carbonate methine hydrogen. Turn over frequency (TOF) was calculated as ([product]/[product+monomer])·catalyst loading·$h^{-1}$ as determined by $^1$H NMR. Finally, number average molecular weight and dispersity were determined via GPC analysis in THF with polystyrene standards (not shown).

Figure 2:
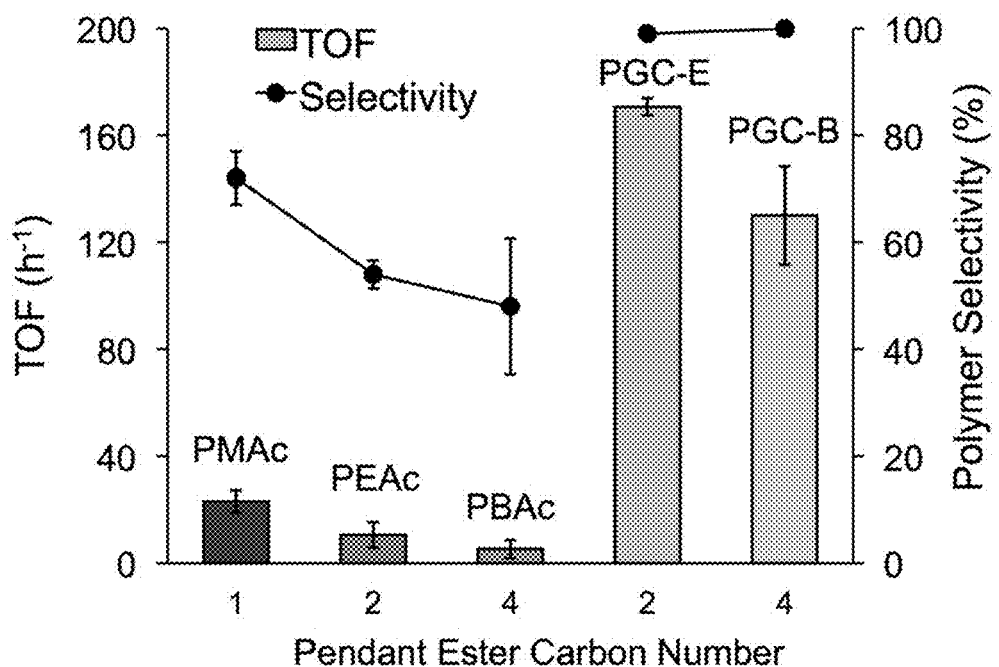
FIG. 2 is a graph showing polymerization efficiency of epoxide monomers with $CO_2$ using rac-[salcyCoIIIDNP] DNP catalyst.

The carbonate acrylate mimetics polymerize with low TOF values in the presence of the cobalt salen catalyst (1000:1 monomer:catalyst loading) at 25° C. and 1.54 MPa of $CO_2$ to give PMAc, PEAc, and PBAc ($M_n$=7.3 to 10.6 kg/mol with narrow dispersities <1.2) and significant formation of the cyclic carbonate. FIG. 2 is a plot showing polymerization efficiency of epoxide monomers with $CO_2$ and rac-[salcyCoIIIDNP]DNP. Reactions were performed in neat monomer (10 mmol) in an 8 mL autoclave under 1.52 MPa of $CO_2$ with catalyst loading of 1000:1 at 25° C. N=3, Avg±STD. Table 1 lists some physical properties of the prepared polymers. Of the three monomers, the methyl ester glycidate displays the highest polymer selectivity of 72%, compared to 54% for the ethyl ester and 48% for the butyl ester monomers. The catalytic TOF of the glycidate epoxides decreases with increasing carbon number of the pendant ester (24, 15 and 5.6 $h^{-1}$ for methyl, ethyl, and butyl respectively). These low TOF values are similar to the value reported for the polymerization of poly(benzyl glycidate carbonate) (TOF=11 $h^{-1}$) under the same temperature and catalyst loading.[20] Upon screening the polymerization conditions, similar trends are observed for all monomers. Raising the reaction temperature increases turnover rates but diminishes polymer selectivity, preferring the formation of cyclic carbonate. Increasing catalyst loading affords a bell curve with an optimal polymer selectivity centered at 500:1 mono-mer:catalyst loading (data not shown).

TABLE 1

Thermal Properties of Acrylates and Carbonates.

| Polymer | $M_n$(Kg/mol) [a] | Đ($M_w/M_n$) | $T_g$(° C.) [b] | $T_d$(° C.)[c] |
|---|---|---|---|---|
| PMA | 26 | 1.9 | 10 | 389 |
| PEA | 99 | 1.8 | −27 | 384 |
| PBA | 95 | 1.7 | −50 | 376 |
| PMAc | 7.3 | 1.2 | 17 | 236 |
| PEAc | 10.6 | 1.2 | 32 | 244 |
| PBAc | 9.8 | 1.3 | −5 | 237 |

TABLE 1-continued

Thermal Properties of Acrylates and Carbonates.

| Polymer | $M_n$(Kg/mol) [a] | Đ($M_w/M_n$) | $T_g$(° C.) [b] | $T_d$(° C.)[c] |
|---|---|---|---|---|
| PGC-E | 9.9 | 1.2 | 24 | 214 |
| PGC-B | 5.9 | 1.2 | 0 | 228 |

[a] Molar mass and dispersity are determined by GPC analysis with polystyrene standards.
[b] The glass transition is measured via DSC.
[c] Thermal decomposition is determined from the TGA curve at 50% weight loss.

Next, the copolymerization of $CO_2$ and the corresponding oxiranyl glycidyl monomers where the pendant group esters are in the opposite orientation to the epoxide used above were investigated. These epoxide monomers are less sterically crowded and the electron withdrawing effect of the carbonyl is removed, while still preserving the ester functionality in the resulting polymer. The ethyl glycidyl ester and butyl glycidyl ester monomers efficiently polymerize in the presence of the cobalt salen catalyst (1000:1 monomer: catalyst loading) at 25° C. under 1.54 MPa of $CO_2$ with significantly greater TOF values (up to 10 fold) to give the corresponding polymeric constitutional isomers with moderate molar mass ($M_n$=5.9 kg/mol to 9.9 kg/mol) and dispersities of <1.2 (FIG. 2 and Table 1). A similar trend in TOF and selectivity, to that of the glycidate polymerization, is observed with the values decreasing with increasing carbon number of the pendant ester (ethyl and butyl: TOF=171 $h^{-1}$ and 129 $h^{-1}$ and selectivity 99% and >99%, respectively). Decreasing the monomer:catalyst loading gives higher TOF values (with the optimal ratio being 2000:1) while increasing the temperature affords more cyclic carbonate (data not shown).

The low TOF values and polymer molar mass observed with the ester glycidate polymerizations are likely a consequence of the carbonyl group alpha to the methine carbon of the epoxide affording increased: 1) steric hindrance during the polymerization reaction; and 2) reactivity of the more substituted methine carbon of the epoxide via the electron withdrawing effects from the adjacent carbonyl. In support of this interpretation, Darensbourg et al. reported a low TOF of 9.3 $h^{-1}$ for the synthesis of poly(tert-butyl 3,4-dihydroxybutanoate carbonate) which is an oxirane containing a bulky side chain.[43] Additionally, gaussian model (B3LYP, NBO) of the epoxide LUMO of the methine carbon-oxygen sigma* is lower than the methylene carbon-oxygen sigma* (data not shown). This effect is also experimentally observed, as $^{13}$C NMR of glycidyl polymers exhibit 100% head-to-tail polymer backbone formation, indicating nucleophilic attack only on the least substituted side of the epoxide. However, $^{13}$C NMR of the glycidate polymers display head-to-tail, tail-to-tail, and head-to-head regiosequences as well, indicating nucleophilic attack on the more substituted carbon is also occurring (data not shown).

All the polymers exhibit bimodal distributions (data not shown) due to residual water molecules (e.g., in the reactor chamber) starting new polymer chains through nucleophilic attack of the epoxide. This is a known phenomenon in these reactions as previously discussed by Darensbourg.[44] Additionally, Maldi-ToF chain-end analysis indicates the main distribution corresponds to a hydroxyl initiator and hydroxyl terminal group, while the minor distribution is initiated with dinitrophenolate (from the catalyst) and a hydroxyl terminal group. (data not shown). Although bimodal, these polymers exhibit narrow dispersities (<1.2) when integrating over both peaks. The polymers, like the poly(alkyl acrylate)s, are soluble in polar aprotic solvents such as dimethylformamide, tetrahydrofuran, dichloromethane, dimethylsulfoxide and acetonitrile, while not soluble in relatively polar protic solvents such as water and methanol.

It is hypothesize that the proximity of the carbonyl functionality to the polymer backbone in PMAc, PEAc, and PBAc will restrict polymer motion leading to enhanced crystallinity, greater decomposition temperatures ($T_d$), and higher glass transition temperatures ($T_g$) compared to PGC-E, and PGC-B, as well as PMA, PEA and PBA. At room temperature, PMA is a pliable solid with a $T_g$ of 10° C., while PEA and PBA are viscous liquids and possess lower $T_g$ values of −27° C. and −50° C. respectively. No melting and/or crystallization temperatures are observed for PMA, PEA and PBA. In contrast, PMAc, PGC-E, and PEAc are brittle solids at room temperature with $T_g$=17, 24, and 32° C., respectively. All of the carbonate analogues possess higher $T_g$ than their corresponding poly(acrylate) derivatives (Table 1). This finding is attributed to the sp2 hybridization of the carbonate in the backbone limiting bond rotation, and, thus, leading to greater polymer rigidity.

Additionally, PGC-E possesses a lower $T_g$ (24° C.) compared to PEAc (32° C.). The higher $T_g$ value for PEAc is likely attributed to the side-chain carbonyl group, which imparts backbone rigidity and facilitates interchain packing through dipole interactions to form a more thermally stable bulk material. Unexpectedly, PGC-B exhibits a higher $T_g$ (0° C.) than PBAc (−5° C.), suggesting that the pendant chain carbon length dominates polymer packing when longer than two units. Furthermore, as mentioned above, PBAc contains varied regiosequences in its backbone chain, while PGC-B is perfectly alternating. This irregularity in PBAc likely leads to a larger packing volume. The polyacrylate materials exhibit higher thermal decomposition ($T_d$) at 50% weight loss (~380° C.) compared to all of the carbonate analogues (~225° C.).

The cytotoxicity of all the acrylate and carbonate polymers was evaluated against NIH 3T3 fibroblast cells at a high concentration of 2.5 mg/mL for 24 hours in transwell plates (data not shown). One-way ANOVA testing (p>0.05) revealed no statistical significance between the control and polymer groups, indicating that the polymers do not leech cytotoxic compounds.

Figure 3:
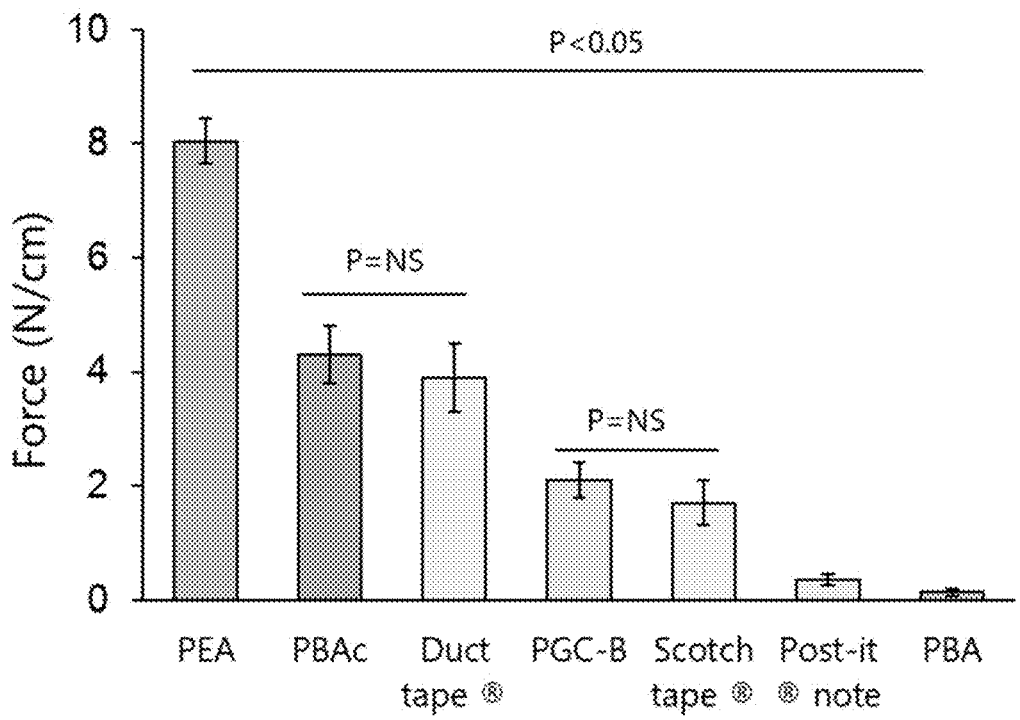
FIG. 3 is a graph showing Peel strength of poly(acrylate)s, poly(carbonate) analogues, and commercial adhesives.

To determine the effect of introducing a carbonate linkage into the poly(alkyl acrylate) structure on the adhesive properties, peel tests were conducted at 180° between glass ($SiO_2$) and A4 paper (180° on glass following ASTM D903; N=3, Avg±STD). FIG. 3 is a plot showing Peel strength of poly(acrylate)s, poly(carbonate) analogues, and commercial adhesives at 22° C. Only room temperature viscous polymers were examined. PBA exhibits the weakest peel strength (0.13 N/cm) while PEA possess the highest (8.04 N/cm). The poly butyl carbonate analogues, PBAc and PGC-B, are stronger adhesives than PBA, but weaker than PEA. The relative enhancement in adhesivity with the carbonate polymers likely reflects increased polymer-polymer van der walls forces and dipole interactions compared to the aliphatic poly(acrylate)s. PBAc (4.3 N/cm) and PGC-B (2.1 N/cm) exhibit comparable adhesive strength to commercial DUCT® tape, (3.9 N/cm, 3M 2929) and SCOTCH™ tape (1.7 N/cm, 3M 810), respectively. All of the carbonate and acrylate polymers display cohesive failure in testing, consistent with failure in the bulk layer of the material.

Aliphatic polymers are immune to most degradation methods and are only degraded by specific microbes. The process itself is long and, thus, polyacrylates exhibit main chain degradation in soil at a rate of 0.12% per 6 month, if at all.[45] In contrast, polycarbonates are known to degrade via UV radiation, oxidative cleavage, water erosion, as well as microbial, thus, polycarbonate life expectancy peaks at 3 years.[46] To evaluate the effect of introducing a carbonate linkage into the polymer backbone on degradation, studies with PEAc, PGC-E, and PEA were conducted over a 35 day period (data not shown). The polymers were dissolved in a THF/water solution of 3:1 v/v %, and the number average molecular weight ($M_n$) was monitored via GPC analysis as a function of time. The pH of the buffer solution was varied from 5 to 9 so as to cover a range of environmental and biomedical relevance.

The molar mass of PEA remained relatively constant over the one month period at all three pH ranges (although some pendant ester hydrolysis did occur) as the initial and final $M_n$ were not statistically different from each other (One way ANOVA, p>0.05). Indeed, there was significant error in the acrylate data due to high dispersity of the commercial acrylate polymer. Both PEAc and PGC-E showed appreciable degradation in all three conditions. Degradation occurred fastest at pH 9 and slowest at pH 5 for both polymers. PGC-E exhibited the fastest degradation rates with $t_{1/2}$=2, 18, and >35 days for pH 9, 7, and 5, respectively. PEAc exhibited degradation with $t_{1/2}$=33, >35, >35 days for pH 9, 7, and 5, respectively. PGC-E degraded faster than PEAc in all three buffers. Additionally, none of the polymers degraded in neat organic solvent (THF) for a span of 30 days (data not shown). As the degradation products are $CO_2$ and benign alcohols and acids, these ecologically friendly products are part of a renewable cycle. As more than 260 million metric tons of plastic products are made per annum[47], tailoring polymers for faster or controlled degradation is critical to meet the ever-increasing demand for plastic goods in a growing world economy.

In conclusion, five novel carbonate polymers that structurally mimic widely utilized commercial poly(acrylate)s are described. The alkyl glycidate and glycidyl ester poly(carbonate)s are synthesized via copolymerization of the corresponding epoxide and $CO_2$ using a cobalt(III) salen catalyst. The polymerization efficiency is greater for the glycidyl monomers with TOF values ten times larger, along with less cyclic carbonate formation. The reported methodology is amenable to preparing polymers possessing varied alkyl ester chain lengths with narrow dispersities. The thermal and degradation properties of these two constitutional isomer polymers are significantly different. The PMAc, PEAc, and PBAc polymers possess higher $T_g$s than their PGC-E/B counterparts as well as higher $T_g$s than the commercial poly(acrylate)s. Additionally, the carbonates retain the adhesive properties of their acrylate analogues. Introduction of the carbonate linkage within the polymer backbone provides a means for polymer degradation of both polymers unlike the poly(acrylate)s. Due to the degradable nature and the relatively benign degradation products, these polymers add to the repertoire of known biodegradable and biocompatible carbonates, and will be of interest for applications in the biomedical/pharmaceutical and consumer product space.

Experimental

1. General Information.

1.1 All manipulations involving air- and/or water-sensitive compounds were carried out in a glovebox. All oxiranyl monomers were refluxed over CaH2, and fractionally distilled under a nitrogen atmosphere prior to use. Carbon dioxide (99.995%, bone dry) was purchased from Airgas and used as received. Reagents were purchased from Sigma Aldrich and used as received.

1.2 NMR experiments. $^1H$ and $^{13}C$ NMR spectra were recorded on a Varian 500 MHz type (1H, 500 MHz; 13 C, 125 MHz) spectrometer. Their peak frequencies were referenced against the solvent, chloroform-d at δ 7.24 for 1H NMR and δ 77.23 ppm for $^{13}C$ NMR, respectively.

1.3 Size Exclusion Chromatography. All polymer molecular weights were determined by gel permeation chromatography versus polystyrene standards (Agilent Technologies) using THF as the eluent at a flow rate of 1.0 mL/min through a Styragel column (HR4E THF, 7.8×300 mm) with a refractive index detector.

1.4 MALDI-TOF. MALDI-TOF mass values for polymers were determined using a Bruker autoflex Speed MALDI-TOF mass spectrometer equipped with a SMARTbeam II and a flash detector. Samples were prepared by dissolving in a 1:1 vol/vol mixture of matrix solvent (20 mg/mL aqueous solution of dihydrobenzoic acid in 50% acetonitrile with 0.1% TFA) and 10 mg polymer dissolved in minimal amount THF.

1.5 DSC/TGA. Thermogravimetric Analysis (TGA) measurements were performed using TGA Q50. All samples were heated from 20 to 500° C. at a heating rate of 10° C./min. All samples were also tested with Differential Scanning Calorimetry (DSC) at a heating rate of 10° C./min and a cooling rate of 10° C./min from −50 to 140° C. The weight of all samples was between 2 to 10 mg and the samples underwent three heat-cool-heat cycles.

1.6 Mechanical peel testing: Peel Strength—180° Peel Tests.

The peel adhesion test was carried out at room temperature (23° C.) by using Fischerbrand glass microscope (SiO2) slides (base stock) and a A4 paper (face stock) as substrates.

The face dimensions for the glass slides were 7.6 cm×2.6 cm. The adhesive was coated on the non-frosted surface of the glass plate containing a coating area of 5.7 cm×2.6 cm with a coating thickness of ~50 m. Then, the paper substrate was stuck on the coated glass slide. The sample was let to settle for 1 minute prior to testing on a custom built machine using a Newton Spring Scale with peel speed operating at 10 cm/min.

Commercial all-purpose Duct Tape (3M 2929) and SCOTCH™ tape (3m 810) were used as received, (besides width modifications) and stuck to the glass. DUCT® tape was cut to half its original width, SCOTCH™ tape was not modified. Post-it Notes (3M, 3 in×3 in) were measures as is with base stock and face stock being paper. Three specimens were used for each adhesive formulation in this test. The average from the load-propagation graph was used to calculate the peeling force. Peel strength is defined as the average load per width of the bondline required to separate progressively a flexible member from a rigid member (ASTM D 903).

1.7 Cell Culture. NIH 3T3 mouse fibroblasts (ATCC) were cultured in Dulbecco's modified Eagle's medium supplemented with 10% bovine calf serum and 1% penicillin-streptomycin. Cells were maintained in a humidified environment at 37° C. with 5% CO2.

1.8 In Vitro Evaluation of Biocompatibility. NIH 3T3 cells were seeded in a 24-well plate at a density of 6.5×104 cells/well and allowed to adhere for 24 h at 37° C. in 5% $CO_2$. The culture media was then replaced with fresh media, and cells were incubated with dry polymer samples using transwell inserts (6.5 mm outer diameter, 0.4 m pores). Cell viability was assessed 24 h after treatment via the MTS in vitro cytotoxicity assay (CellTiter 96 Aqueous One, Promega).

2. Synthetic Procedures.

2.1 Procedure for the Synthesis of Glycidate Monomers.

All glycidate monomers were synthesized according to previous literature.[48] Butyl acrylate (20 mL, 162 mmol) and tetrabutylammonium chloride (9.0 g, 32 mmol) were added to a roundbottom flask in an ice bath. To the mixture, a 5 wt-% NaOCl aq. solution (265 mL, 178 mmol) and a saturated aq. solution of sodium bicarbonate (150 mL) was added. The reaction was stirred at 0° C. for 2-4 hr, until all monomer was reacted by TLC analysis. The reaction was washed with ethyl acetate (150 mL) to collect the oxiranyl product. The separated organic layer was washed with brine (100 mL) three times and dried with sodium sulfate. The organic layer was evaporated off, and the product was purified by fraction distillation to yield butyl glycidate as a clear oil (7.2 mL, 55 mmol, 34% yield). The methyl glycidate and ethyl glycidate synthesis followed the same procedure, taking more caution with the evaporation stages as the boiling points of these products are low.

2.2 Procedure for the Synthesis of Glycidyl Monomers.

All glycidyl monomers were synthesized according to previous literature.[49] A roundbottom flask was charged with 200 mL dichloromethane, trimethylamine (84 mL, 600 mmol) and glycidol (20 mL, 300 mmol). The reaction was placed in an icebath and stirred for 30 minutes. Acetyl chloride (23.4 mL, 333 mmol) was added dropwise and the reaction was stirred for another 3 hours at room temperature. The subsequent solution was filtered to remove the salt precipitate. The organic layer was washed with saturated sodium bicarbonate (100 mL) three times, once with brine (100 mL), dried over sodium sulfate, and evaporated off under low pressure. The crude product was fraction distilled to produce pure glycidyl acetate as a clear oil. (29 mL, 272 mmol, 91% yield). Glycidyl butyrate synthesis followed the same procedure.

2.3 Representative Procedure for Copolymerization of Oxiranyl Ester with $CO_2$ Using rac-[SalcyCo$^{III}$DNP]/DNP.

In a glovebox, butyl glycidate (1.4 ml, 10 mmol) was added into a high pressure autoclave, followed by the addition of rac-SalcyCo$^{III}$DNP (5.6 mg, 0.010 mmol). The autoclave was transferred out of the glovebox and charged with $CO_2$ to 220 psi. The reaction was allowed to run at 25° C. for 24 h. Subsequently, the $CO_2$ pressure was released and the reaction mixture was diluted in minimal amount DCM. The mixture was added dropwise into cold MeOH (20 ml) and the precipitated polymer was collected. The precipitation was repeated for a total of 3 times until complete removal of the catalyst and unreacted monomer. The resultant material was dried under vacuum to yield 0.42 g (26%) of a brittle white solid.

REFERENCES

1. Penzel, E. In Ullman's Encyclopaedia of Industrial Chemistry; 2002.
2. Santoro, R.; Venkateswaran, S.; Amadeo, F.; Zhang, R.; Brioschi, M.; Callanan, A.; Agrifoglio, M.; Banfi, C.; Bradley, M.; Pesce, M. Biomater. Sci. 2018, 22-26.
3. Lam, Y. L.; Maesener, M. De; Lawson, J.; Boersma, D. Expert Rev. Med. Devices 2017, 14, 755-762.
4. Kureha, T.; Hiroshige, S.; Matsui, S.; Suzuki, D. Colloids Surfaces B Biointerfaces 2017, 155, 166-172.
5. Lee, K. I.; Wang, X.; Guo, X.; Yung, K. F.; Fei, B. Int. J. Biol. Macromol. 2017, 95, 826-832.
6. Klapperich, C. M.; Noack, C. L.; Kaufman, J. D.; Zhu, L.; Bonnaillie, L.; Wool, R. P. J. Biomed. Mater. Res.—Part A 2009, 91, 378-384.
7. Pu, G.; Dubay, M. R.; Zhang, J.; Severtson, S. J.; Houtman, C. J. Ind. Eng. Chem. Res. 2012, 51, 12145-12149.
8. Khan, I.; Poh, B. T. J. Polym. Environ. 2011, 19, 793-811.
9. Yates, M. R.; Barlow, C. Y. Resour. Conserv. Recycl. 2013, 78, 54-66.
10. Gross, R. A.; Kalra, B. Science. 2002, 297, 803-807.
11. Zhang, X.; Fevre, M.; Jones, G. O.; Waymouth, R. M. Chem. Rev. 2017, 118, 839-885.
12. Cho, S.; Heo, G. S.; Khan, S.; Gonzalez, A. M.; Elsabahy, M.; Wooley, K. L. Macromolecules 2015, 48, 8797-8805.
13. Engler, A. C.; Ke, X.; Gao, S.; Chan, J. M. W.; Coady, D. J.; Ono, R. J.; Lubbers, R.; Nelson, A.; Yang, Y. Y.; Hedrick, J. L. Macromolecules 2015, 48, 1673-1678.
14. Ekinci, D.; Sisson, A. L.; Lendlein, A. J. Mater. Chem. 2012, 22, 21100.
15. Maysinger, D.; Ji, J.; Moquin, A.; Hossain, S.; Hancock, M. A.; Zhang, I.; Chang, P. K. Y.; Rigby, M.; Anthonisen, M.; Grutter, P.; Breitner, J. C. S.; McKinney, R. A.; Reimann, S.; Haag, R.; Multhaup, G. ACS Chem. Neurosci. 2018, 9(2), 260-271.
16. Kumar, P.; Takayesu, A.; Abbasi, U.; Kalathottukaren, M. T.; Abbina, S.; Kizhakkedathu, J. N.; Straus, S. K. ACS Appl. Mater. Interfaces 2017, 9, 37575-37586.
17. Li, M.; Gao, L.; Schlaich, C.; Zhang, J.; Donskyi, I. S.; Yu, G.; Li, W.; Tu, Z.; Rolff, J.; Schwerdtle, T.; Haag, R.; Ma, N. ACS Appl. Mater. Interfaces 2017, 9, 35411-35418.
18. Thomas, A.; Miller, S. S.; Frey, H. Biomacromolecules 2014, 15, 1935-1954.
19. Ray, W. C.; Grinstaff, M. W. Macromolecules 2003, 36, 3557-3562.
20. Zhang, H.; Lin, X.; Chin, S.; Grinstaff, M. W. J. Am. Chem. Soc. 2015, 137, 12660-12666.
21. Zhang, H.; Grinstaff, M. W. J. Am. Chem. Soc. 2013, 135, 6806-6809.
22. Wolinsky, J. B.; Ray, W. C.; Colson, Y. L.; Grinstaff, M. W. Macromolecules 2007, 40, 7065-7068.
23. Zhang, H.; Grinstaff, M. W. Macromol Rapid Comun. 2015, 510, 84-91.
24. Mugabe, C.; Hadaschik, B. A.; Kainthan, R. K.; Brooks, D. E.; So, A. I.; Gleave, M. E.; Burt, H. M. BJU Int. 2009, 103, 978-986.
25. Ekladious, I.; Liu, R.; Zhang, H.; Foil, D. H.; Todd, D. A.; Graf, T. N.; Padera, R. F.; Oberlies, N. H.; Colson, Y. L.; Grinstaff, M. W. Chem. Sci. 2017, 8, 8443-8450.
26. Deng, Y.; Saucier-sawyer, J. K.; Hoimes, C. J.; Zhang, J.; Seo, Y.; Andrejecsk, J. W.; Saltzman, W. M. Biomaterials 2014, 35, 6595-6602.
27. Wei, Q.; Krysiak, S.; Achazi, K.; Becherer, T.; Noeske, P. L. M.; Paulus, F.; Liebe, H.; Grunwald, I.; Dernedde, J.; Hartwig, A.; Hugel, T.; Haag, R. Colloids Surfaces B Biointerfaces 2014, 122, 684-692.
28. Chen, P.-R.; Wang, T.-C.; Chen, S.-T.; Chen, H.-Y.; Tsai, W.-B. Langmuir 2017, 33, 14657-14662.
29. Konieczynska, M. D.; Lin, X.; Zhang, H.; Grinstaff, M. W. ACS Macro Lett. 2015, 4, 533-537.
30. Guillaume, S. M.; Mespouille, L. J. Appl. Polym. Sci. 2014, 131(5).
31. Gillies, E. R.; Frechet, J. M. J. Drug Discov. Today 2005, 10, 35-43.

32. Wolinsky, J. B.; Liu, R.; Walpole, J.; Chirieac, L. R.; Colson, Y. L.; Grinstaff Mark W., M. W. *J. Control. Release* 2010, 144, 280-287.
33. Zawaneh, P. N.; Singh, S. P.; Padera, R. F.; Henderson, P. W.; Spector, J. A.; Putnam, D. *Proc. Natl. Acad. Sci. U.S.A* 2010, 107, 11014-11019.
34. Coates, G. W.; Moore, D. R. *Angew. Chemie-Int. Ed.* 2004, 43, 6618-6639.
35. Darensbourg, D. J.; Yeung, A. D. *Macromolecules* 2013, 46, 83-95.
36. Geschwind, J.; Frey, H. *Macromolecules* 2013, 46, 3280-3287.
37. Inoue, S.; Koinuma, H.; Tsuruta, T. *J. Polym. Sci. Part B Polym. Lett.* 1969, 7, 287-292.
38. Sugimoto, H.; Inoue, S. *Pure Appl. Chem.* 2006, 78, 1823-1834.
39. Wu, G.; Wei, S.; Ren, W.; Lu, X.; Xu, T.; Darensbourg, D. J. *J. Am. Chem. Soc.* 2011, 133, 15191-15199.
40. Lu, X. B.; Shi, L.; Wang, Y. M.; Zhang, R.; Zhang, Y. J.; Peng, X. J.; Zhang, Z. C.; Li, B. *J. Am. Chem. Soc.* 2006, 128, 1664-1674.
41. Nakano, K.; Kobayashi, K.; Ohkawara, T.; Imoto, H.; Nozaki, K. *J. Am. Chem. Soc.* 2013, 135, 8456-8459.
42. Nakano, K.; Kamada, T.; Nozaki, K. *Angew. Chemie— Int. Ed.* 2006, 45, 7274-7277.
43. Tsai, F.-T.; Wang, Y.; Darensbourg, D. *J. J. Am. Chem. Soc.* 2016, 138, 4626-4633.
44. Han, B.; Zhang, L.; Kyran, S. J.; Liu, B.; Duan, Z.; Darensbourg, D. J. *J. Polym. Sci. Part A Polym. Chem.* 2016, 54, 1938-1944.
45. Wilske, B.; Bai, M.; Lindenstruth, B.; Bach, M.; Rezaie, Z.; Frede, H.-G.; Breuer, L. *Environ. Sci. Pollut. Res.* 2014, 21, 9453-9460.
46. Ram, A.; Zilber, O.; Kenig, S. *Polym. Eng. Sci.* 1985, 25, 535-540.
47. Hopewell, J.; Dvorak, R.; Kosior, E. *Philos. Trans. R. Soc. B Biol. Sci.* 2009, 364, 2115-2126
48 B. Ochiai, T. Hirano, *Facile synthesis of glycidates via oxidation of acrylates with aqueous solution of NaOCl in the presence of ammonium salts. Heterocycles,* 2014 89(2), 487-493.
49. Y. J. K. Araujo et al. *Synthesis and enzymatic resolution of racemic 2,3-epoxy propyl esters obtained from glycerol. Tetrahedron Letters* 56 (2015) 1696-1698

Example 2 Sustainable Polycarbonate Adhesives for Dry and Aqueous Conditions with Thermo-Responsive Properties Pressure sensitive adhesives are ubiquitous in commodity products such as tapes, bandages, labels, packaging, and insulation. With single use plastics comprising almost half of yearly plastic production, it is essential that the design, synthesis, and decomposition products of future materials, including polymer adhesives, are within the context of a healthy ecosystem along with comparable or superior performance to conventional materials. A novel polymer library of sustainable polymer adhesives with an eco-design is reported that perform in both dry and wet environments. Poly(propylene-co-glycidyl butyrate carbonate)s (PPGBC)s are synthesized via the green synthetic pathway of propylene oxide, glycidyl butyrate, and $CO_2$ terpolymerization, catalyzed by a cobalt salen complex bearing a quaternary ammonium salt. This new polymeric adhesive system, composed of environmentally benign building blocks, implements carbon dioxide sequestration techniques, poses minimal environmental hazards, exhibits varied peel strengths from SCOTCH™ tape to hot-melt wood-glue, and adheres to metal, glass, wood, and TEFLON® surfaces. In addition, one formulation activates with a local temperature trigger at 37° C. to adhere to surfaces. Cell studies show this polymer is non-toxic and non-immunogenic in vitro.

Pressure sensitive adhesives (PSAs), soft polymeric materials that adhere to surfaces via van der Waals interactions under pressure, are primarily composed of acrylic copolymers and poly-styrene/isoprene/butadiene based blends.[50,51] These viscoelastic polymers teeter the delicate balance of liquid enough to wet a surface and elastic enough to resist direction of motion. Viscoelastic fine-tuning of bulk polymer properties is accomplished through the addition of tackifiers[52,53], plasticizers[54,55], post-polymerization cross-linking[56,57], or the covalent combination of two or more distinct monomers[55-61].

Due to their ability to bond dissimilar materials without incompatibility concerns, PSAs are ubiquitous in commodity products such as tapes[62,63], bandages[64], labels[65], household decorations[66], and packaging.[67] Driven by high demand in consumer goods, the PSA market value is expected to reach $9.5 billion by 2024, with environmentally friendly PSAs representing the fastest growing technology segment.[68] Recent advances in this field of adhesion chemistry include biomimetic approaches[69] such as nanoscale fabrication of the fibrillous geometry found in the adhesive pads of gecko's feet[70-73], and utilization of dopamine enriched proteins as found in the adhesive footpad of marine mussels[74-79].

Herein, is report a library of novel, environmentally friendly, sustainable, strong, and responsive adhesives composed of carbonate terpolymers. These adhesives exhibit polymer compositional dependences on peel and tack strength, bind to metal, glass, wood, and polytetrafluoroethylene, as well as exhibit reversible on-demand adhesion through a temperature trigger in both dry and wet environments. From a polymeric materials design perspective, there is a need to consider the environmental impact of a polymer's lifecycle, the polymerization methodology, and the nature of the building blocks and subsequent polymer breakdown products[80-82]. To this end, a synthetic pathway pioneered by Inoue et al.[83] and brought to realization by Coates[84] and Darensbourg[85], and a catalyst ligand framework optimized by Lu et al.[86], in which carbon dioxide is functionalized and used as a means of inserting a carbonate moiety into a polymeric backbone, leading to a biodegradable polymer, was used. This system is highly amenable to many oxiranyl monomers[87-90], including those derived from biological feed stocks lessening the dependency on petroleum, and allows for the fine-tuning of the polymer composition and microstructure to attain desired chemical, physical, degradation, and mechanical properties.

Figure 4A:
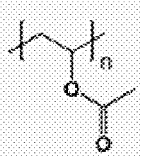
FIG. 4A shows the structure of poly(vinyl acetate).
Figure 4B:
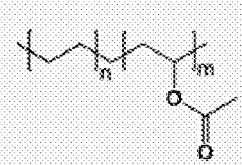
FIG. 4B shows the structure of poly(ethylene-co-vinyl acetate).
Figure 4C:
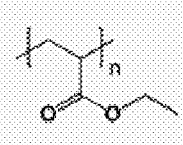
FIG. 4C shows the structure of poly(ethyl acrylate) on the left and poly(buyl acrylate) on the right.
Figure 4C:
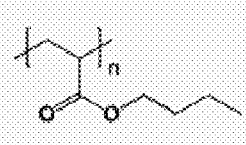
Figure 4D:
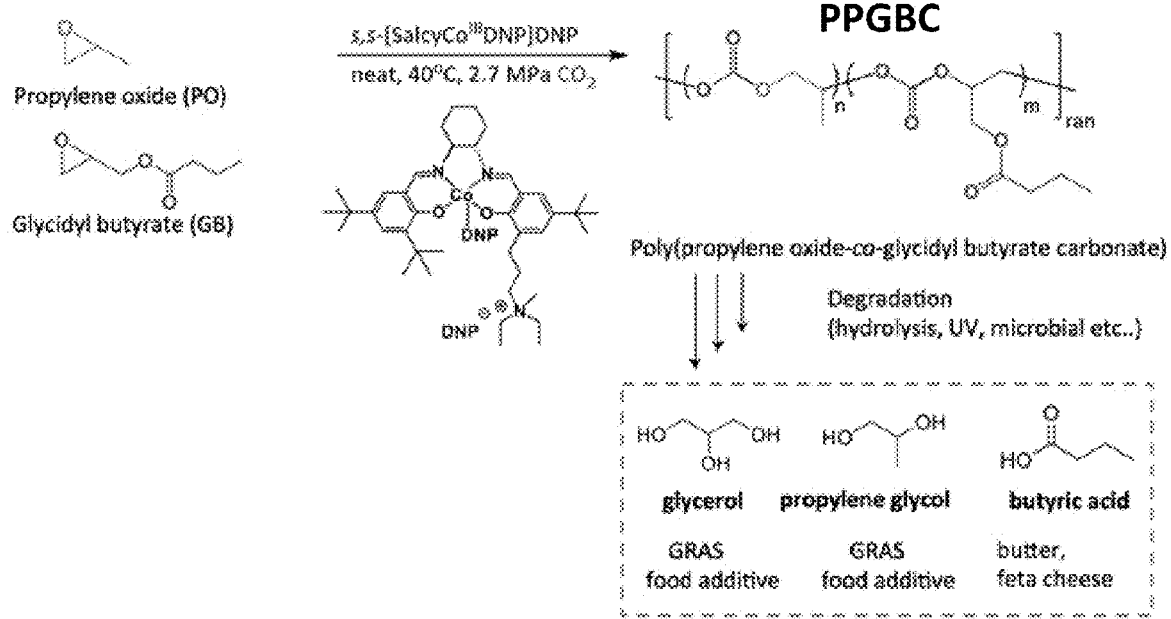
FIG. 4D is a schematic showing the synthesis of poly(propylene-co-glycidyl butyrate carbonate) (PPGBC).

FIG. 4A-4C show the structure of some commercial adhesives. FIG. 4A shows the structure of poly(vinyl acetate) which is principle component in ELMER'S GLUE®; FIG. 4B shows poly(ethylene-co-vinyl acetate) which is the principle component in hot melt wood glue; FIG. 4C shows the structure of poly(ethyl acrylate) on the left and poly(buyl acrylate) on the right which are used as adhesives in tapes and bandages. In order to mimic the pendant functionality of current commercial adhesives, poly (propylene-co-glycidyl butyrate carbonate) (PPGBC) via the terpolymerization of glycidyl butyrate (GB), propylene oxide (PO), and 2.7 MPa of $CO_2$ catalyzed by a salen cobalt complex (2000:1 catalyst loading) at 40° C. (FIGS. 4B and 4C) was synthesized as schematically shown in FIG. 4D. The ester side chain of glycidyl butyrate imparts adhesivity through van der Waals interactions, while propylene oxide allows for tighter compaction of polymer chains, raising the glass transition temperature and polymeric cohesive strength. The degradation of PPGBC due to, for example UV light and microbial degradation can proceed via chain scission of PPGBC and produces biologically benign small molecules comprised of glycerol and propylene oxide, food additives identified as Generally Recognized as Safe (GRAS) by the FDA, as well as butyric acid, a compound responsible for the characteristic smell of feta cheese[91], and $CO_2$, an atmospheric gas.

Results and Discussions.

A library of co- and ter-polymers with varying monomeric feed ratios of glycidyl butyrate (GB) and propylene oxide (PO) as shown in Table 2 were synthesized. The catalyst polymerized PO with high turn-over frequency (444 h−1), high polymer selectivity (>99%), moderate molecular weight (22 kg/mol) and low dispersity (1.18). Under the same conditions, the catalyst polymerized GB with lower TOF (77 h−1), lower polymer selectivity (86%), lower molecular weight of (12 kg/mol), and similar dispersity (1.2). In the $CO_2$/PO/GB terpolymerization, increasing the PO monomer feed concentration led to sequentially higher TOFs compared to GB alone. Similarly, increasing PO monomer feed concentration afforded greater molecular weight polymers and higher polymeric selectivity over the cyclic carbonate.

(~5%) and analyzed by 1H NMR (data not shown). The Fineman-Ross linearization method revealed a strong correlation ($R2=0.9994$) between monomer percentage in the feed and monomer incorporated into the polymer. The monomeric reactivity ratios for GB ($rGB=k11/k12$) and PO ($rPO=k22/k21$) are 1.32 and 0.26, respectively (data not shown), indicating consecutive incorporation of two GB units is more favored during the terpolymerization. Since the GB monomeric feed strongly resembles GB polymer incorporation at high conversions (Table 2, ~60%), the terpolymer possesses a gradient distribution of PO insertion, with more PO units incorporated toward the end of the chain.

Figure 5A:
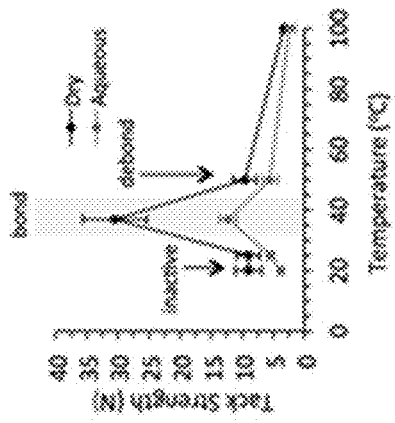
FIG. 5A shows results of peel testing
Figure 5B:
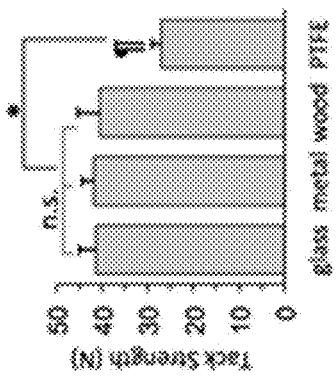
FIG. 5B shows Tack Strength of and adhesive according to some embodiments applied to four surfaces.
Figure 5C:
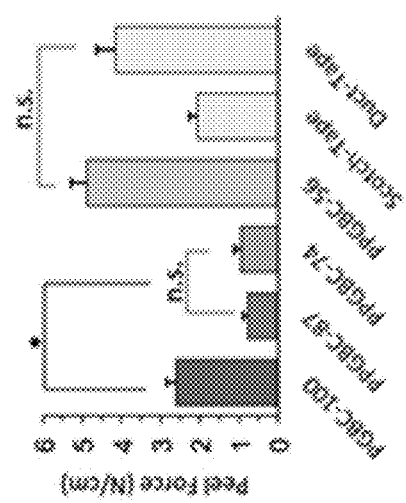
FIG. 5C shows Tack Strength of an adhesive according to some embodiments.
Figure 5D:
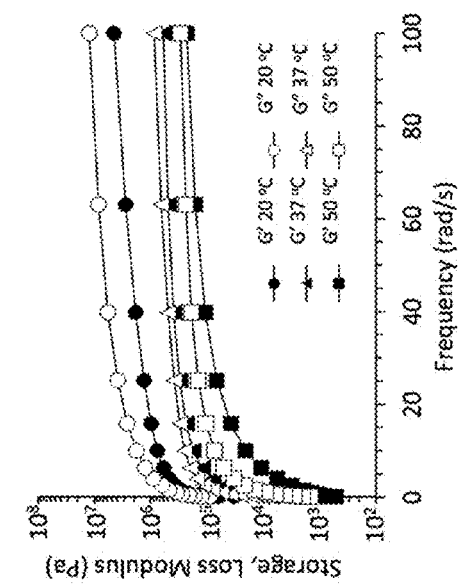
FIG. 5D shows Tack Strength vs different applied axial pressure for an adhesive according to some embodiments.
Figure 5E:
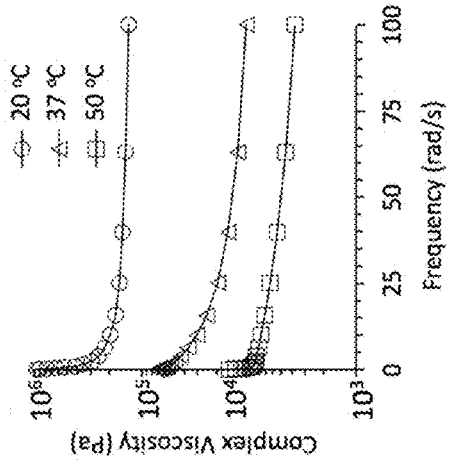
FIG. 5E shows a Frequency Sweep of the complex viscosity (i) of an adhesive according to some embodiments at three different temperature ranges.

Some measured adhesive properties are shown in FIG. 5A-5F. FIG. 5A shows results of peel testing (180°) at room temperature (22° C.) of viscous poly(propylene-co-glycidyl butyrate carbonate)s and commercial adhesives. *Statistically significant (ANOVA, P<0.05) (N=3). N.S.=not statistically significant (ANOVA, P>0.05) (N=3). FIG. 5B shows Tack Strength of PPGBC-56 applied to four surfaces at room temperature; Denotes adhesive failure. FIG. 5C shows Tack Strength of PPGBC-56 with 1 N of applied axial force at different temperatures tested in atmospheric conditions and underwater. FIG. 5D shows Tack Strength vs different applied axial pressure for PPGBC-56; 0 Denotes measurement was above 55 N, (beyond the rheometer's upper limit of detection). FIG. 5E shows a Frequency Sweep of the complex viscosity (η) of PPGBC-56 at three different tem-

TABLE 2

Terpolymerization of GB/PO/$CO_2$ catalyzed by (S,S)-[SalcyCo$^{III}$DNP]DNP

| Entry | $f_{GB:PO}$[a] | $F_{GB:PO}$[b] | TOF[c] (h$^{-1}$) | Selectivity[d] (%) | Tg[e] (° C.) | Mn[f] (Kg/mol) | Đ[f] ($M_w/M_n$) |
|---|---|---|---|---|---|---|---|
| PGBC-100 | 100:0 | 100:0 | 74 | 85 | −7 | 12.4 | 1.2 |
| PPGBC-87 | 90:10 | 87:13 | 78 | 86 | −30 | 6.1 | 1.12 |
| PPGBC-74 | 70:30 | 74:26 | 129 | 82 | −29 | 6 | 1.1 |
| PPGBC-56 | 50:50 | 56:44 | 144 | 95 | −9 | 8.6 | 1.08 |
| PPGBC-33 | 30:70 | 33:67 | 158 | 90 | −12 | 13.6 | 1.11 |
| PPGBC-22 | 10:90 | 22:78 | 225 | 99 | 0 | 9.6 | 1.11 |
| PPC-100 | 0:100 | 0:100 | 444 | >99 | 28 | 22 | 1.18 |

The reaction was performed in neat epoxide (10 mmol) in a 15 mL autoclave under 2.7 MPa $CO_2$ pressure at 40° C. with 2000:1 catalyst loading. [a] Molar ratio of monomer feed. [b] Molar ratio of monomer incorporation in polymer chain. [c] Turnover frequency (TOF)=mole of product (polycarbonates)/mol of cat. per hour. Reactions were stopped at ~60% conversion. [d] Percent of polymer formed vs. cyclic carbonate as determined by $^1$H NMR [e] Determined by DSC analysis [f] Determined by gel permeation chromatography in THF, calibrated with polystyrene standards.

The glass transition temperature, measured by differential scanning calorimetry, is 28° C. and −7° C. for PO and GB, respectively. For the terpolymers, as the GB content increases the glass transition reduces from 0° C. to −30° C. A bimodal distribution of chain length is observed for all polymers by GPC analysis, but dispersities remained low at ~1.2 (data not shown). This observable phenomenon is due to adventitious water molecules as MALDI-ToF spectroscopy revealed two initiating groups (hydroxyl and dinitrophenoxide) for polymeric chains and one terminating group (hydroxyl) (data not shown).

Figure 5F:
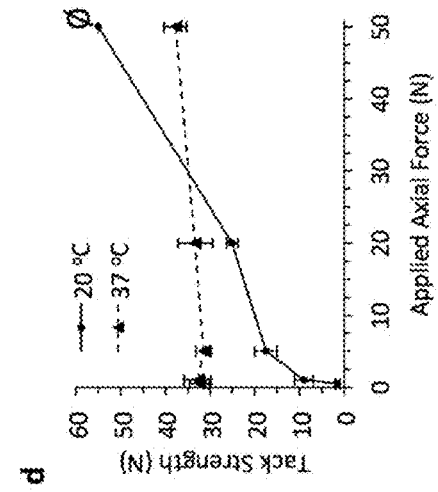
FIG. 5F shows Frequency Sweep of the storage (G') and loss (G") modulus of an adhesive according to some embodiments at 20, 37 and 50° C.

Fineman-Ross analysis was undertaken to determine the probabilistic sequence distribution of monomers in the copolymer composition. In order to approximate steady state kinetics, the reactions were stopped at low conversions perature ranges. FIG. 5F shows Frequency Sweep of the storage (G') and loss (G") modulus of PPGBC-56 at 20, 37 and 50° C.

Peel testing was conducted to compare the relative adhesive strengths, defined as the force per width required to separate a flexible substrate from a rigid substrate, for all the viscous terpolymers at room temperature (FIG. 5A). Glass slides ($SiO_2$) were used as the base substrate, and A4 paper (2.6 cm×8 cm), wetted with neat adhesive, was used as the face substrate. Testing was performed on an Instron 5944 series at 180° peel angle at a rate of 360 mm/min following procedures from ASTM D903.

PPGBC-56 exhibits superior adhesion with a peel force of 4.9±0.41 N/cm compared to all other terpolymers and similar to DUCT® tape (3M 2929) (4.1±0.48 N/cm). PGBC-100 (2.6±0.23 N/cm) exhibits peel strength comparable to SCOTCH™ tape (3M 810) (2.1±0.20 N/cm). PPGBC-74 and PPGBC-87, exhibiting low glass transition temperatures (~−30° C.), both demonstrate comparably low peel strength of ~0.8 N/cm (FIG. 5A). All the polymer adhesives cohesively fail due to weaker bulk forces than surface bonding forces.

To assess PPGBC-56's adhesiveness to chemically distinct materials, probe-tack testing on metal, glass, wood, and polytetrafluoroethylene (PTFE), using a DHR-2 rheometer at room temperature was performed. The top 8 mm diameter steel plate (50.3 mm² surface area) was lowered at a rate of 100 μm/s unto one of the four adhesive coated substrates with an applied axial force of 50 N. After 5 seconds of contact, the top steel substrate was pulled apart with a rate of 100 m/s, and the tack strength (Stack), defined as the peak of the force curve, was measured. PPGBC-56 possesses a similar tack strength of ~38 N to metal, wood, and steel (FIG. 5B). A reduced but still substantial tack strength is observed for PTFE of 27±1.8 N. PPGBC-56 cohesively fails to metal, wood, and steel while adhesively fails to PTFE. The lower adhesive strength is likely due to the weaker van der Waals forces of PTFE from the high electronegativity of the fluorine atoms.

In order to identify a temperature responsive PSA, the adhesion energy of all the polymer formulations at 37° C. and 50° C., using a metal-on-metal probe-tack testing protocol was assessed. Of the formulations, PPGBC-56 exhibited the desired tack profile for bonding at 37° C. and debonding at 50° C. (data not shown). Specifically, as shown in FIG. 5C, the tack strength of PPGBC-56 with 1 N of applied axial pressure and 5 second dwell time at 20° C. was 9.0±1.8 N in a dry environment. Raising the temperature to 37° C. significantly increased the Stack to 30.4±5.2 N while a further increase in temperature to 50° C. lowered the Stack to 9.6±1.6 N and by 100° C., the tack strength is significantly lowered to 3.3±0.2 N. The same trend is observed with the PPGBC-56 in an aqueous environment with diminished tack strength overall.

A material's viscosity directly correlates with its timely ability to wet a surface and subsequently form an adhesive bond. To quantify the relationship between the pressure applied to PPGBC-56 and its ability to form a strong adhesive bond, metal-on-metal tack testing with varying applied axial forces at 20° C. and 37° C. using an 8 mm steel parallel plate geometry was conducted. Again, the probe's dwell time was 5 seconds and the top plate was pulled apart with a rate of 100 μm/s.

At a temperature of 20° C., a strong correlation between applied axial force and peak tack strength is observed for PPGBC-56 (FIG. 5D). At a low applied force, 0.5 N, the Stack is 1.49±0.53 N and the materials exhibit adhesive failure. As the normal force applied increases from 1 to 5 to 20 N, the Stack then increases from 9.03±1.83 N to 17.5±2.51 N to 25.0±1.31 N. At 50 N applied axial force, the debonding force is greater than the maximum load cell of the rheometer (55 N), and thus, the Stack is estimated to be >55 N. At a temperature of 37° C., a significantly different tack profile is observed. Even 0.5 N of applied axial force is sufficient to achieve maximum tack strength. As the polymer's viscosity is significantly less at this temperature, with a stronger viscous than elastic profile (FIGS. 5E and 5F), PPGBC-56 wets and strongly adheres to the probe's surface with minimal applied force (i.e., essentially independent of applied force). An applied axial force of 0.5 N requires 32.1±2.3 N of force to separate the materials. Increasing the applied force to 1N, 5N and 20 N did not change the peak debonding force, which remained ~31 N. At 50 N of applied axial force, the Stack force increases to 37.0±2.51 N, although bearing no statistical significance.

Figure 6A:
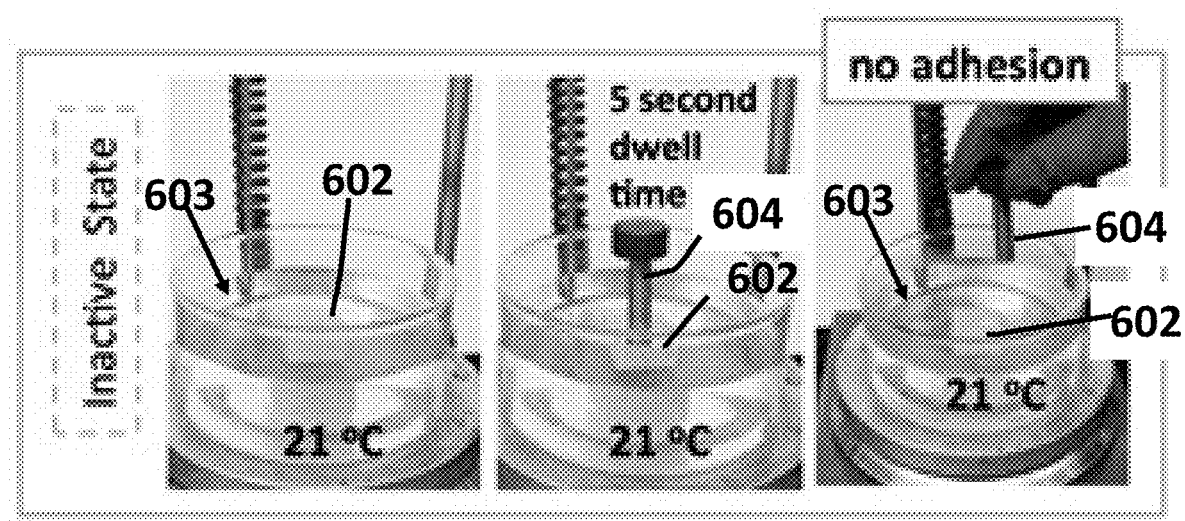
FIG. 6A shows a procedure for testing the adhesion under water where the adhesive is in an inactive state.
Figure 6B:
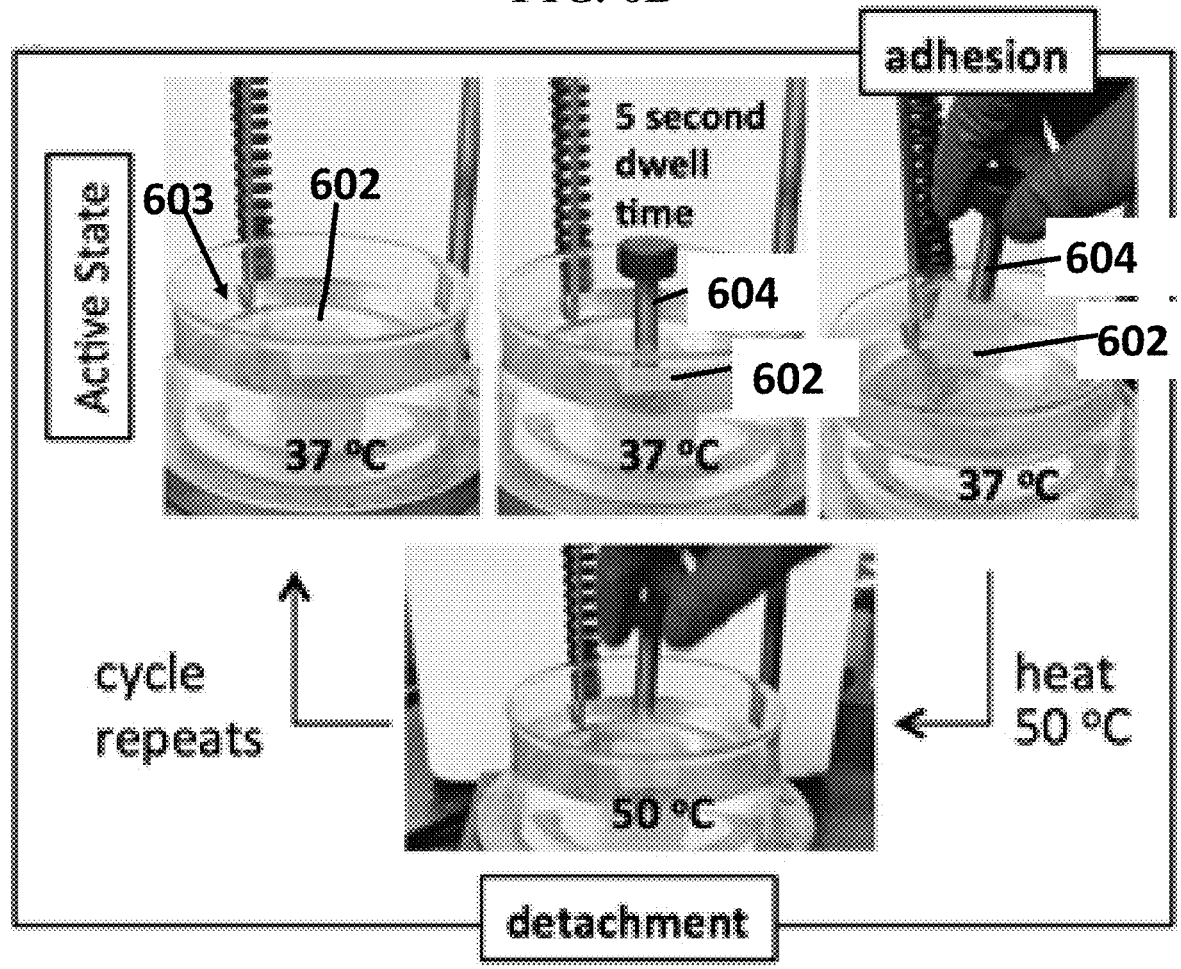
FIG. 6B shows a procedure for testing the adhesion under water where the adhesive is in an active state.

Utilizing this information, it can be hypothesized that a local temperature change will trigger adhesion by controlling the viscoelastic state of the adhesive underwater. FIGS. 6A and 6B show a procedure for testing the adhesion under water and the effects of heating. FIG. 6A shows a glass cube 602 (20 g) coated with PPGBC-56 in DI water 603 with a steel rod 604 (35 g, 50.3 mm² surface area) placed on top. One side of the 1 inch glass cube 602 (SiO₂, 20 g) was coated with PPGBC-56 and immersed in 21° C. DI water. A 35 gram metal rod 604 with a surface area of 50.3 mm² (8 mm diameter) was gently placed on the adhesive surface, let stand for 5 seconds, and subsequently removed. At 21° C., the adhesive on cube 604 is not able to bond to the rod 604 and the adhesive system is inactive. Upon heating the water to 37° C., the same metal rod 604 was gently placed on the adhesive coated glass surface of cube 603, let stand for 5 seconds, and removed from the water as shown in FIG. 6B. At 37° C., the metal rod 604 binds to the glass cube 602 with sufficient force that it is able to pick up and hold the glass cube 604. show at 37° C., there is sufficient bonding to pick up the glass cube. Raising the temperature of the water to 50° C. detaches the metal rod from the glass cube. At this higher temperature of 50° C., heating the system expands the polymeric volume, and releases the rod 604 as intermolecular van der Waals forces wane and cohesive failure detaches the cube 602. Repeated 37 and 21° C. cycles of the rod/cube system display reversibility with the same adhesive coating attaching and detaching the rod. The adhesive detaches through cohesive failure, but remains on each respective surface and polymeric mass is not lost into the water. Replacing PPGBC-56 with DUCT® tape at either 21 or 37° C. did not result in bonding between the metal rod and glass cube, likely because the applied axial force (weight of the rod) is not sufficient to induce spreading and contact bonding of the adhesive.

Although these polycarbonates are composed of relatively benign building blocks, evaluation of toxicity is warranted with the synthesis of new materials. Preliminary in vitro transwell cytotoxicity studies with PPGBC-56 and NIH 3T3 fibroblasts demonstrated that after 24 hours, no cytotoxicity was observed at concentrations as high as 20 mg/mL of terpolymer (data not shown). Similarly, exposure of RAW 264.7 macrophages to PPGBC-56 for 24 hour affords no immunogenicity up to concentrations of 20 mg/mL, as the expressed cytokine IL-6 levels are comparable to the negative control (data not shown).

CONCLUSION

In conclusion, a series of polycarbonate terpolymers are synthesized using a cobalt(III) salen catalyst in high turnover frequency, high polymer selectivity, moderate molecular weight, and low dispersity. Being composed of building blocks known to be on the GRAS list, present in foods, or our atmosphere, these new terpolymers are attractive materials for potential commercial use from both environmental and biomedical perspectives. Of the synthesized polymers, PPGBC-56 exhibits stronger adhesion than commercial SCOTCH™ tape and comparable adhesion to duct tape. Furthermore, this adhesive sticks to a variety of chemically distinct materials. At 20° C., applied pressure dependent adhesion is observed with increased pressures affording greater tack strength forces. This dependency is absent at a high temperature of 37° C., and the adhesive itself is able to wet and subsequently bond surfaces with minimal applied contact force and time. The high viscosity of the adhesive at room temperature enables a thermo-responsive temperature trigger of adhesion to induce bonding and debonding. Through judicious choice of polymer with an eco-design, our approach opens new avenues of research as well as catalyzes the investigation of unique functional materials to meet the ever-increasing demands from society.

Experimental

1. General Information.

1.1 Procedures for handling air-an/or water-sensitive compounds, NMR experiments, Size Exclusion Chromatography, MALDI-ToF, Differential Scanning Calorimetry, 180° Peel Strength, and Cell Culture were done as described above in the Experimental section of Example 1.

1.2 Probe Tack. All tack testing was performed on a Discovery Hybrid Rheometer (DHR-2 series) with 8 mm stainless steel-sand blasted parallel plate geometry with a Peltier plate. The adhesive was placed on the bottom plate and a top probe moving at 100 μm/sec rested on the adhesive until the desired axial force was reached. The adhesive soaked for 5 seconds, and then the top probe pulled away at a rate of 100 pim/sec. The peak of the force curve is defined as the tack strength and the area under the curve is defined as the tack energy as calculated by:

$$\text{Tack Energy } (J/m^2) = 2 * \frac{r}{A} \int_{ti}^{tf} F(t)dt \left( A = m^2, r = \frac{m}{s}, t = s \right);$$

where m=meter, s=second.

1.3 Frequency Sweeps. All oscillatory sweeps were performed on a Discovery Hybrid Rheometer (DHR-2 series) with 8 mm stainless steel parallel plate geometry with a gap size of 50 μm. Frequency sweeps were performed from 0.1 to 100 rad/s or 1 to 500 rad/s at 1% strain (determined to be in the linear viscoelastic region with a previous strain sweep) at specified temperatures (20° C., 25° C., 37° C., 50° C.) controlled by a Peltier plate.

1.4 In Vitro Evaluation of Cytotoxicity. NIH 3T3 cells were seeded in a 96-well plate at a density of 20,000 cells/well and were allowed to adhere for 24 h. The media was then replaced with fresh media, and cells were incubated with polymer samples in 5% DMSO using transwell inserts (0.4 μm pores). Cell viability was assessed 24 h after treatment via the MTS in vitro cytotoxicity assay (CellTiter 96 Aqueous One, Promega).

1.5 In Vitro Evaluation of Immunogenicity. RAW 264.7 cells were seeded in a 96-well plate at a density of 30,000 cells/well and were allowed to adhere for 24 h. The media was then replaced with fresh media, and cells were incubated with polymer samples in 5% DMSO using transwell inserts (0.4 μm pores). IL-6 levels were measured via ELISA kit (Abcam) and compared to those of RAW 264.7 treated with lipopolysaccharide—a molecule known to stimulate IL-6 production and immunogenicity in vitro.

2. Synthetic Proceedures.

The monomers were prepared as described above in the Experimental section of Example 1.

2.1 Polymer Synthesis. In a glovebox, glycidyl butyrate (0.67 mL, 5 mmol) propylene oxide (0.35 mL, 5 mmol) were added into a high pressure autoclave, followed by the addition of (S,S)-SalcyCo$^{III}$DNP (5.21 mg, 0.005 mmol). The autoclave was transferred out of the glovebox and charged with $CO_2$ to 2.7 MPa. The reaction was allowed to run at 40° C. for 10 hr. Subsequently, the reaction vessel was placed in an ice bath for 10 minutes and the $CO_2$ pressure was released. The reaction mixture was diluted in minimal amount DCM. The mixture was added dropwise into cold MeOH (50 ml) and the precipitated polymer was collected. The precipitation was repeated for a total of 3 times until complete removal of the catalyst and unreacted monomer. The resultant material was dried under vacuum to yield ~300 mg of a viscous liquid.

REFERENCES

50. Benedek, I. *Pressure-Sensitive Adhesives and Applications. Pressure-Sensitive Adhesives and Applications* (Marcel Dekker Inc., 2010).
51. Khan, I. & Poh, B. T. Natural Rubber-Based Pressure-Sensitive Adhesives: A Review. *J. Polym. Environ.* 19, 793-811 (2011).
52. Sasaki, M. et al. The effect of tackifier on phase structure and peel adhesion of a triblock copolymer pressure-sensitive adhesive. *Int. J. Adhes. Adhes.* 28, 372-381 (2008).
53. Nakamura, Y. et al. Tack and viscoelastic properties of an acrylic block copolymer/tackifier system. *Int. J. Adhes. Adhes.* 29, 806-811 (2009).
54. Felton, L. A., Austin-Forbes, T. & Moore, T. A. Influence of surfactants in aqueous-based polymeric dispersions on the thermomechanical and adhesive properties of acrylic films. *Drug Dev. Ind. Pharm.* 26, 205-210 (2000).
55. Tic, W. & Guzialowska-Tic, J. Properties of a PVAc emulsion adhesive using a nonphthalate plasticizer obtained by condensation of 2-methylpropanal. *J. Adhes. Sci. Technol.* 32, 1861-1875 (2018).
56. Mazzoni, A. et al. Cross-linking effect on dentin bond strength and MMPs activity. *Dent. Mater.* 34, 288-295 (2018).
57. Zhao, S. et al. Fully bio-based soybean adhesive in situ cross-linked by interactive network skeleton from plant oil-anchored fiber. *Ind. Crops Prod.* 122, 366-374 (2018).
58. Diaz, M. F., Barbosa, S. E. & Capiati, N. J. Reactive compatibilization of PE/PS blends. Effect of copolymer chain length on interfacial adhesion and mechanical behavior. *Polymer* 48, 1058-1065 (2007).
59. Moyano, M. A., Paris, R. & Martin-Martinez, J. M. Viscoelastic and adhesion properties of hot-melts made with blends of ethylene-co-n-butyl acrylate (EBA) and ethylene-co-vinyl acetate (EVA) copolymers. *Int. J. Adhes. Adhes.* 88, 34-42 (2019).
60. Zhao, Z. et al. Hot-melt pressure-sensitive adhesives based on SIS-g-PB copolymer for transdermal delivery of hydrophilic drugs. *Int. J. Adhes. Adhes.* (2019).
61. Anderson, K. S. & Hillmyer, M. A. The influence of block copolymer microstructure on the toughness of compatibilized polylactide/polyethylene blends. *Polymer* 45, 8809-8823 (2004).
62. Shibano, T. Pressure Sensitive-Adhesive Tapes or Sheets. (U.S. patent, 1987).
63. Kawabe, M., Tasaka, S. & Inacaki, N. Effects of surface modification by oxygen plasma on peel adhesion of pressure-sensitive adhesive tapes. *J. Appl. Polym. Sci.* 78, 1392-1401 (2000).
64. Webster, I. Recent developments in pressure-sensitive adhesives for medical applications. *Int. J Adhes. Adhes.* 17, 69-73 (1997).
65. Birkholz, R. B. Pressure Sensitive Adhesive Label. (U.S. patent, 1990).
66. Luhmann, B. Pressure Sensitive Adhesive Hook. (U.S. patent, 1995).
67. Sun, S., Li, M. & Liu, A. A review on mechanical properties of pressure sensitive adhesives. *Int. J. Adhes. Adhes.* 41, 98-106 (2013).
68. Pulidindi, K. & Chakraborty, S. Pressure Sensitive Adhesive Market. *Global Market Insights* (2019). Avail- 68. able at: https://www.gminsights.com/pressrelease/pressure-sensitive-adhesives-market. (Accessed: 20 Feb. 2019)
69. Zhong, C. et al. Strong underwater adhesives made by self-assembling multi-protein nanofibres. *Nat. Nanotechnol.* 9, 858-866 (2014).
70. Hamilton, W. et al. Adhesive force of a single gecko foot-hair. *Nature* 405, 671-702 (2000).
71. Baik, S., Lee, H. J., Kim, D. W., Kim, J. W. & Lee, Y. Bioinspired Adhesive Architectures: From Skin Patch to Integrated Bioelectronics. *Adv. Mater.* 1-18 (2019).
72. Del Campo, A., Greiner, C., Alvarez, I. & Arzt, E. Patterned surfaces with pillars with controlled 3D tip geometry mimicking bioattachment devices. *Adv. Mater.* 19, 1973-1977 (2007).
73. Zhou, M., Pesika, N., Zeng, H., Tian, Y. & Israelachvili, J. Recent advances in gecko adhesion and friction mechanisms and development of gecko-inspired dry adhesive surfaces. *Friction* 1, 114-129 (2013).
74. Lee, H., Lee, B. P. & Messersmith, P. B. A reversible wet/dry adhesive inspired by mussels and geckos. *Nature* 448, 338-341 (2007).
75. Zhao, Y. et al. Bio-inspired reversible underwater adhesive. *Nat. Commun.* 8, 1-8 (2017).
76. Schneider, T. & Budisa, N. Expanding the DOPA universe by genetically encoded, mussel-inspired bioadhesives for material sciences and medicine. *ChemBioChem* (2019). doi: 10.1002/cbic.201900030
77. li, weijun et al. Enhanced adhesion of carbon nanotubes by dopamine modification. *Langmuir* 35, 4527-4533 (2019).
78. Ahn, B. K. Perspectives on Mussel-Inspired Wet Adhesion. *J. Am. Chem. Soc.* 139, 10166-10171 (2017).
79. Lin, Q. et al. Adhesion mechanisms of the mussel foot proteins mfp-1 and mfp-3. *Proc. Natl. Acad. Sci.* 104, 3782-3786 (2007).
80. Ricapito, N. G., Ghobril, C., Zhang, H., Grinstaff, M. W. & Putnam, D. Synthetic biomaterials from metabolically derived synthons. *Chem. Rev.* 116, 2664-2704 (2016).
81. Zhang, X., Fevre, M., Jones, G. O. & Waymouth, R. M. Catalysis as an Enabling Science for Sustainable Polymers. *Chem. Rev.* 118, 839-885 (2017).
82. Gross, R. A. & Kalra, B. Biodegradable polymers for the environment. *Science* 297, 803-807 (2002).
83. Inoue, S., Koinuma, H. & Tsuruta, T. Copolymerization of Carbon dioxide and Epoxide. *J. Polym. Sci. Part B Polym. Lett.* 7, 287-292 (1969).
84. Qin, Z., Thomas, C. M., Lee, S. & Coates, G. W. Cobalt-Based Complexes for the Copolymerization of Propylene Oxide and $CO_2$: Active and Selective Catalysts for Polycarbonate Synthesis. *Angew. Chem. Int. Ed.* 42, 5484-5487 (2003).
85. Lu, X. B. & Darensbourg, D. J. Cobalt catalysts for the coupling of CO 2 and epoxides to provide polycarbonates and cyclic carbonates. *Chem. Soc. Rev.* 41, 1462-1484 (2012).
86. Ren, W. M. et al. Highly active, bifunctional Co(III)-salen catalyst for alternating copolymerization of $CO_2$ with cyclohexene oxide and terpolymerization with aliphatic epoxides. *Macromolecules* 43, 1396-1402 (2010).
87. Taherimehr, M. & Pescarmona, P. P. Green polycarbonates prepared by the copolymerization of CO2 with epoxides. *J. Appl. Polym. Sci.* 131, 1-17 (2014).
88. Beharaj, A., Ekladious, I. & Grinstaff, M. W. Poly(Alkyl Glycidate Carbonate)s as Degradable Pressure-Sensitive Adhesives. *Angew. Chem. Int. Ed.* 58, 1407-1411 (2019).
89. Zhang, H., Lin, X., Chin, S. & Grinstaff, M. W. Degradable Analogue of Poly (Acrylic Acid). *J. Am. Chem. Soc.* 137, 12660-12666 (2015).
90. Zhang, H. & Grinstaff, M. W. Synthesis of Atactic and Isotactic Poly(1,2-glycerol carbonate)s: Degradable Polymers for Biomedical and Pharmaceutical Applications. *J. Am. Chem. Soc.* 135, 6806-6809 (2013).
91. Saxby, M. J. A survey of chemicals causing taints and off-flavours in food. in *Food Taints and off-Flavours* (Springer, 1996).

Example 3 Glycerol Terpolycarbonates as Pressure Sensitive Medical Device Adhesives In the closure of tissue from surgical resections, a collagen buttress is sutured to the resection site to secure damaged tissue and prevent leaks. During the surgical procedure, the buttress must fasten to a dual cutting and stapling medical device. The most common means of securing the buttress is through a polymeric adhesive layer, however synthetic adhesives are limited in mismatches of biocompatibility and non-biodegradability, while biological derived glues suffer from immunogenicity and sterility concerns, economical constraints, as well as non-ideal adhesive profiles. Herein is describe the synthesis of a novel adhesive polymeric library with a green synthetic pathway and generally recognized as safe (GRAS) degradation products. Poly(glycidyl acetate-co-glycidyl butyrate carbonate)s (GA-co-GB)s are synthesized via the terpolymerization of glycidyl acetate, glycidyl butyrate, and $CO_2$, catalyzed by a cobalt salen complex bearing a quaternary ammonium salt. Peel testing shows the adhesive strength of the polymer library range from SCOTCH™ tape to hot-melt glues. Cell studies indicate these polymers are non-toxic and non-immunogenic in vitro. Polymer (GA-co-GB)-87 exhibits the proper adhesive strength to sufficiently adhere a collagen buttress to the jaws of a surgical stapler and facilely release the material after resection, as determined by an ovine lung model.

Pressure sensitive adhesives (PSAs) are a class of non-Newtonian fluids that adhere dissimilar surfaces under light contact pressure.[92] For medical applications, PSAs are utilized in surgical tapes[93,94], biomedical electrodes for patient monitoring[95], and transdermal drug delivery systems[96-99]. They are also employed in medical surgical devices to temporarily hold an implantable, such as a collagen buttress, in a surgical stapler.[100-104] For example, surgeons reinforce resected tissue areas (lung, colon, stomach) with a collagen buttress to prevent risk of air/fluid leakage, tissue tearing at the staple line, and staple pullout. Specifically, an adhesive layer fastens the collagen buttress to the jaws of the surgical stapler. This adhesive must perform the conflicting tasks of adhering the buttress with sufficient force so that it will not fall off during normal operation, but also must easily be released from the surgical stapling device after the staples are fired Common adhesives systems in the practice of resection surgery include cyanoacrylate adhesives[105]. However, due to their strong adhesive bond, removing the buttress after firing of the instrument is difficult and the collagen must be torn or cut from the device, adding extra steps to an already delicate situation. Weaker adhesives, which possess great biocompatibility, such as aqueous solutions of cellulose derivatives, exhibit sufficient tackticity but must be applied for each buttress and each firing just prior surgery.[106] This procedure is time consuming and is complicated by the fact that the water based solvent of the adhesive evaporates with time. The ideal adhesive system for this application, or similar ones requiring a temporary adhesive, is a releasable, biocompatible, nonvolatile, and degradable polymer applied without heat or organic solvent with tunable and predictable adhesion via specific changes in chemical composition. Towards this goal, herein is disclose the synthesis of a novel series of polycarbonates as pressure sensitive adhesive with controllable adhesion properties. One polymer possesses the balanced adhesive profile appropriate for securing a collagen buttress to a surgical stapler used in a lung resection surgery.

From a biocompatibility design perspective, there is recognize the need to consider the polymer breakdown products, and judiciously chose material whose degradation products are naturally occurring for human consumption. Thus, a synthetic pathway incorporating glycidol derived oxiranyl monomers and carbon dioxide catalyzed by an organometallic complex to produce a perfectly alternating carbonate copolymer was used. This synthetic methodology was first reported by Inoue et al.[107] and optimized by Lu et al.[108], with a highly efficient catalyst. The polymerization system accommodates various epoxide monomers[109-121], allowing for the fine-tuning of the polymer composition and microstructure to attain desired performance properties.

Utilizing this green synthetic pathway, poly(glycidyl acetate-co-glycidyl butyrate carbonate) (GA-co-GB) was synthesized via the terpolymerization of glycidyl acetate (GA), glycidyl butyrate (GB), and 2.7 MPa of $CO_2$ catalyzed by a salen cobalt complex (2000:1 catalyst loading) at 40° C. FIG. 7 the synthetic pathway for producing GA-co-GB as well as their lifecycle. The ester side chain of glycidyl butyrate imparts adhesivity through van der Waals interactions, while glycidyl acetate raises polymeric cohesive strength through smaller polymer volume by tighter compaction of polymer chains. The monomeric units formed during decomposition of (GA-co-GB) are biologically benign and are comprised of glycerol, a food additive identified as Generally Recognized as Safe (GRAS) by the FDA, butyric acid, a compound responsible for the sharp smell of feta cheese[122], as well as acetic acid, a compound in vinegar, and $CO_2$, an atmospheric gas.

Specifically, a small library of new polymers with varying monomeric feed ratios of glycidyl acetate (GA), and glycidyl butyrate (GB) were synthesized to characterize the polymer reaction as well as to prepare materials for structure-property analysis (Table 3). The catalyst polymerized GA with high turn-over frequency (164 h–1), high polymer selectivity (>99%), moderate molecular weight (13.3 kg/mol), and low dispersity (1.13). Under the same conditions, the catalyst polymerized GB with lower TOF (74 h–1), lower polymer selectivity (85%), similar molecular weight of (12.4 kg/mol), and similar dispersity (~1.2). In the $CO_2$/GA/GB terpolymerization, increased GA monomer feed percentages led to sequentially higher TOFs compared to GB alone. Autoclaving the polymers for 30 minutes to sterilize them resulted in no change in molecular weight, as determined by GPC.

TABLE 3

$CO_2$/GA/GB terpolymerization mediated by (S,S)-[SalcyCo$^{III}$DNP]DNP

| Entry | Feed [A] | Time (h) | GB linkages (mol %) [B] | TOF ($n^{-1}$) [C] | Selectivity (%) [D] | $M_n$ (Kg/mol) [E] | Đ [F] |
|---|---|---|---|---|---|---|---|
| PGBC-100 | GB | 24 | 100 | 74 | 85 | 12.4 | 1.20 |
| (GA-co-GB)-87 | GA/GB(1/9) | 24 | 87 | 58 | 96 | 18.9 | 1.15 |
| (GA-co-GB)-67 | GA/GB(3/7) | 16 | 67 | 102 | 91 | 17.8 | 1.17 |
| (GA-co-GB)-49 | GA/GB(5/5) | 12 | 49 | 112 | 94 | 17.2 | 1.16 |
| (GA-co-GB)-29 | GA/GB(7/3) | 7 | 29 | 142 | 88 | 11.6 | 1.21 |
| (GA-co-GB)-12 | GA/GB(9/1) | 6 | 12 | 140 | 87 | 12.1 | 1.14 |
| PGAC-100 | GA | 6 | 0 | 164 | 99 | 13.3 | 1.13 |

The reaction was performed in neat epoxide (10 mmol) in 15 mL autoclave under 2.7 MPa CO2 pressure at 40° C. with 2000:1 catalyst loading. [A] Molar ratio. [B] Percent incorporated in polymer as determined by NMR. [C] Turnover frequency (TOF)=mole of product (polycarbonates)/mol of catalyst per hour. [D] Percent of polymer formed vs. cyclic carbonate as determined by $^1$H NMR. [F] Molecular weight determined by gel permeation chromatograph in THF, calibrated with polystyrene. [F] Determined by DSC analysis.

A bimodal distribution of chain length is observed for all polymers by GPC analysis, while dispersities remained low at ~1.2. This observable phenomenon is due to adventitious water molecules as MALDI-ToF spectroscopy revealed two initiating groups (hydroxyl and dinitrophenoxide) for polymeric chains and one terminating group (hydroxyl) (data not shown).

Figure 8A:
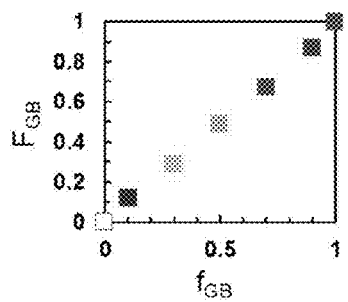
FIG. 8A shows are composition diagrams for terpolymerization of three monomers.
Figure 8B:
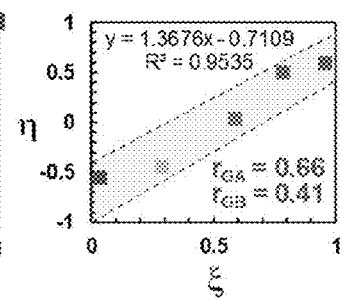
FIG. 8B shows a Kelen-Tudos plot of the terpolymerization.
Figure 8C:
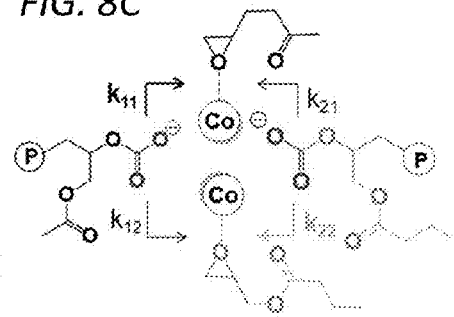
FIG. 8C shows the possible reaction pathways for monomer addition to the growing polymer chain in the terpolymerization.

FIG. 8A shows are composition diagrams for terpolymerization of GA with GB and $CO_2$. Analysis of monomer feed ratio to polymer composition shows a high agreement with each other. Due to peak overlap of the methine proton in GA-co-GB polymers in $^1$H NMR spectra, low conversion reaction rate kinetics were not able to be conducted, and thus, an extended Kelen-Tudos-(high conversion) linearization method is used to derive the reactivity ratios from the $^1$H NMR spectra of pure polymers via the integration of the two distinct pendant esters. FIG. 8B shows a Kelen-Tudos plot of GA/GB/CO$_2$ terpolymerization. Reactivity ratios for GA and GB are $r_{GA}$=0.66 and $r_{GB}$=0.41, respectively, with a high linear correlation of $R^2$=0.95. FIG. 8C shows the possible reaction pathways for GA or GB addition to the growing polymer chain. GA and GB generally prefer cross-propagation during polymerization, and polymer compositional distribution mirrors feed composition.

The glass transition temperature, as measured by differential scanning calorimetry, is 25° C. and –7° C. for poly GA and poly GB, respectively. As GB content in the polymer increases, the glass transition decreases from 5° C. to –21° C. Three of the formulations, PGBC-100, (GA-co-GB)-87, and (GA-co-GB)-67 are viscous liquids at room temperature. FIG. 8D shows the glass transition temperatures of all the polymer materials vs. % GB incorporation in the polymer chain. The image to the left shows and adhesive polymer with glass transition temperature below zero (viscoelastic liquids in a vial), the image to the right shows an adhesive polymer with glass transition temperature above zero (solids seen in a vial).

Figure 9A:
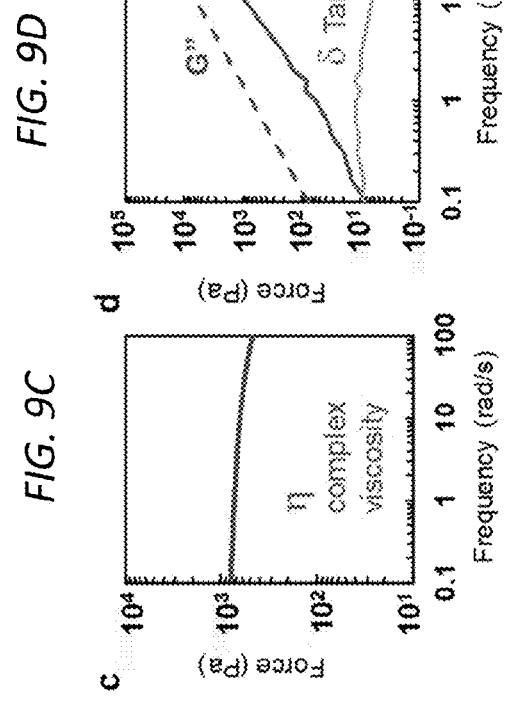
FIG. 9A illustrates a peel test.

A method for characterizing the adhesive profile of pressure sensitive adhesives is peel testing, where the force per width required to separate a flexible substrate from a rigid substrate is measured (American Society for Testing and Materials (ASTM) procedure D903). 180° peel testing on the viscous polymers PGBC-100, (GA-co-GB)-87, and (GA-co-GB)-67, as well as SCOTCH™ tape and DUCT® tape for comparative purposes of relative adhesive strength was performed. The peel test is illustrated in FIG. 9A. Glass slides 902 (SiO$_2$) were used as the base stock and A4 paper 904 (2.6 cm×8 cm), wetted with neat adhesive 906, was used as the face stock. Testing was performed on an Instron 5944 series at 180° peel angle, in the direction shown by arrow 908, at a rate of 360 mm/min.

Figure 9B:
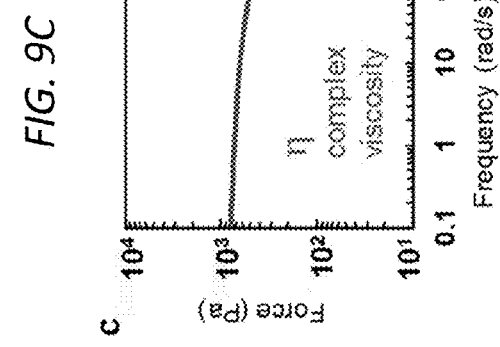
FIG. 9B is a plot showing the peel strength of some adhesives.

FIG. 9B is a plot showing the peel strength of PBBC-100, Ga-co-GB)-87, (GA-co-GB)-67, SCOTCH™ tape (3M 810) and DUCT® tape (3M 2929). SCOTCH™ tape and DUCT® tape exhibit peel strengths of 2.1±0.20 and 4.1±0.48 N/cm, respectively. In the plot, * signifies statistically significant (ANOVA p<0.05) and N.S. signifies statistically not significant (ANOVA p>0.05). PGBC-100, copolymer purely consisting of GB, exhibits peel strength of 2.6±0.23 N/cm. Incorporation of 23% GA substituents, (GA-co-GB)-87, reduces the peel strength to 1.8±0.18 N/cm, comparable to SCOTCH™ tape. Increasing GA content in the terpolymer to 33% significantly raises the peel strength to (3.6±0.55 N/cm), comparable to DUCT® tape.

Figure 9C:
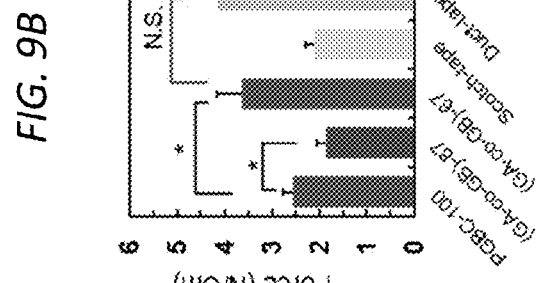
FIG. 9C is a plot showing Frequency sweep of the complex viscosity of an adhesive according to some embodiments.
Figure 9D:
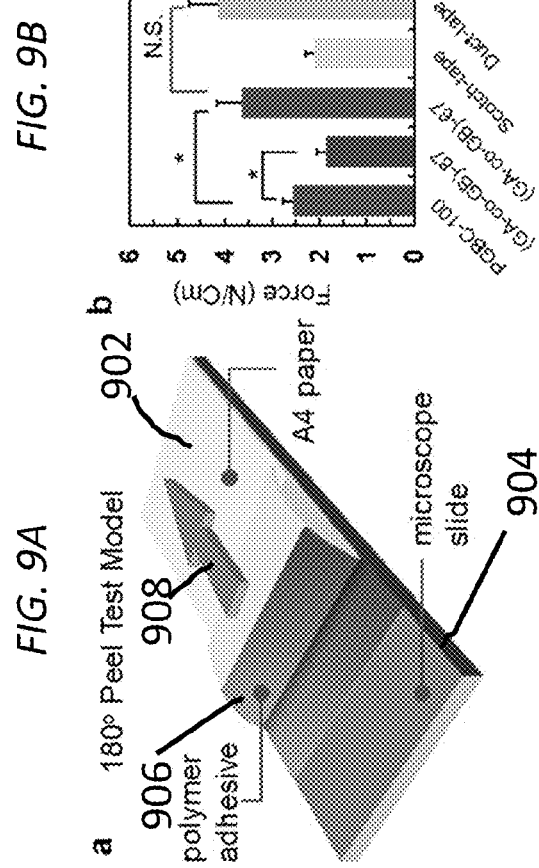
FIG. 9D is a plot showing Frequency sweep of the Storage (G') and Loss (G") modulus of an adhesive.

To compare the adhesion energy of all polymer formulations, dynamic mechanical analysis on each terpolymer via oscillatory frequency sweeps was conducted. The storage modulus (G') of the polymers trends upward with increased GA concentration in the polymer chain. All polymer adhesives undergo cohesive failure due to weaker bulk forces than surface bonding forces. Oscillatory frequency sweeps of (GA-co-GB)-87 indicate non-Newtonian behavior with higher flow than elastic deformation. FIG. 9C is a plot showing Frequency sweep (1% strain, 25° C.) of the complex viscosity of (GA-co-GB)-87. FIG. 9D is a plot showing Frequency sweep (1% strain, 25° C.) of the Storage (G') and Loss (G") modulus of (GA-co-GB)-87.

While (GA-co-GB)-67 possess a stronger adhesive profile, (GA-co-GB)-87 exhibits lower viscosity and better flow-ability. As such, (GA-co-GB)-87 was selected as an adhesive for further testing because it can be easily spread onto a collagen surface without the need of solvents or heat.

Given that (GA-co-GB)-87 exhibits the desired adhesive profile as well as being non-cytotoxic and noncytoimmunogenic its performance as an adhesive for securing a collagen buttress to the jaws of a surgical stapler was evaluated based on four criteria. First, the stapler is able to grip the collagen and remove it from its packaging with the force of the adhesive alone. Second, agitation of the stapler does not detach the buttress. Third, after stapler firing, the jaw of the device is easily removed from the buttress with nothing other than a mild pull force, as to not tear the buttress or disturb the underlying tissue. Finally, closure of the tissue resection line occurs with no air leakage.

Figure 10A:
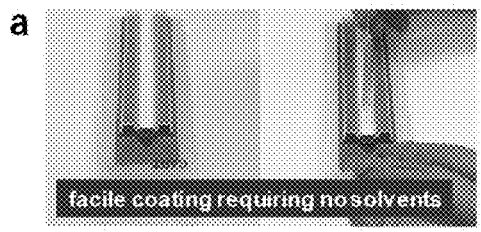
FIG. 10A shows the collagen buttress as received from the manufacture (panel A) and coating of an adhesive according to some embodiments to a collagen buttress (panel B).
Figure 10B:
FIG. 10B is an image showing attachment of the adhesive coated collagen buttress to the jaws of a surgical stapler and removal from the manufacture packaging.
Figure 10C:
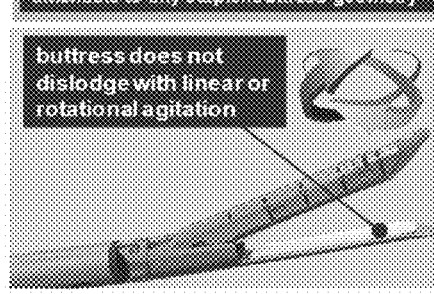
FIG. 10C illustrates that continual agitation, rotation, and closing/opening of the surgical stapler does not detach the buttress from the jaws.

FIG. 10A panel A shows the collagen buttress as received from the manufacture. FIG. 10A panel B shows coating of (GA-co-GB)-87 adhesive to bovine pericardium collagen buttress without use of solvents. FIG. 10B is an image showing attachment of the adhesive coated collagen buttress to the jaws of a surgical stapler and removal from the manufacture packaging. Closing of the stapler jaw provides sufficient force for adhesive coating to secure the buttress to the jaws for facile removal. FIG. 10C illustrates that continual agitation, rotation, and closing/opening of the surgical stapler does not detach the buttress from the jaws.

Figure 10D:
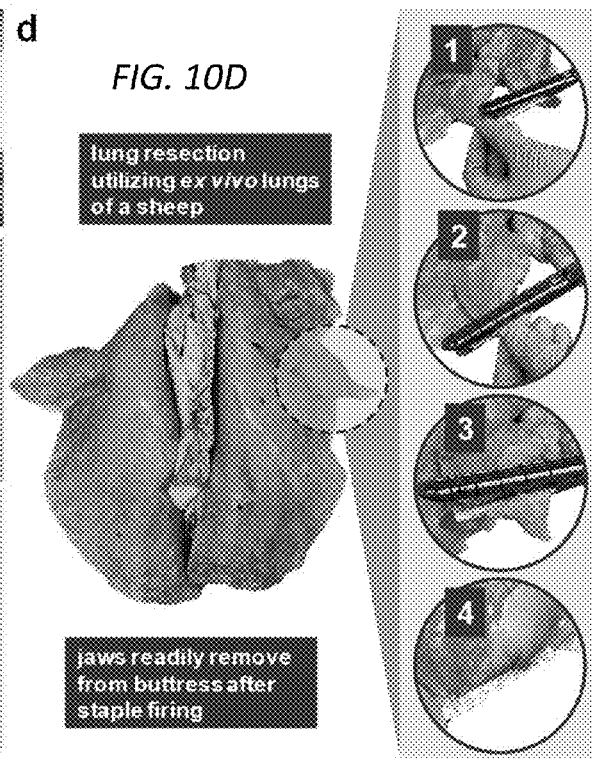
FIG. 10D on the left side shows a sheep lung and on the right side from top to bottom are detailed views of the lung undergoing surgical resectioning using a surgical stapler comprising an adhesive.

FIG. 10D on the left side shows a sheep lung and on the right side from top to bottom are detailed views of the lung undergoing surgical resectioning using a surgical stapler comprising the GA-co-GB adhesive. In detailed view 1, the section to remove is pinched and the surgical stapler is brought into position. In detailed view 2 the stapler is fired. In detailed view 3, after stapler firing, the buttress is detected from the jaws with a slight pulling force requiring no other object/human intervention. Detailed view 4 shows the buttress in position after the procedure.

The rheometric testing of this formulation, at a frequency of 0.1 rad/s (FIG. 9C) revealed a low complex viscosity of 782 Pa. Thus, the collagen buttress (bovine pericardium, PERI-STRIP DRY®, Synovis) was coated without the aid of solvents or, the stapler jaws (ENDO GIA™ Ultra universal stapler and reloads, Medtronic) are able to pull the collagen from the packaging after application of a mild force from jaw closure. Agitation by sequential jaw closing/opening and rotation did not detach the buttress from the device, as shown in. After tissue resection, the jaws of the stapler facilely detach themselves from the collagen as shown in. Lastly, the resected stapled lung tissue, when placed under water and sequentially inflated/deflated for 5 trials, does not show signs of leaks, air bubbles, or perforations in the resection line.

Cobalt$^{(III)}$ salen catalyzed terpolymerizaton of CO$_2$, glycidyl acetate (GA), and glycidyl butyrate (GB) affords a series of new polycarbonates with high efficiency. Of the synthesized polymers, (GA-co-GB)-87, and (GA-co-GB)-67 are pressure sensitive adhesives with peel strengths comparable to SCOTCH™ tape and DUCT® tape, respectively. Neat (GA-co-GB)-87 flows readily at room temperature and can be easily coated on a collagen buttress, without the aid of exogenous solvents, to adhere it to a surgical stapler. The (GA-co-GB)-87 adhesive secures the buttress to the jaws of the surgical stapler without being dislodged during agitation, and detaches from the jaws after stapler firing with minimal force, requiring no further human intervention. With a $CO_2$ sequestration based polymer synthesis, benign degradation products after chain scission, and tunable adhesivity, these terpolymers will be of interest for a variety of clinical uses that require a temporary and specifically tailored adhesive strength.

REFERENCES

92. Creton, C. *MRS Bull.* 2003, 28, 434-439.
93. Webster, I. *Int. J. Adhes. Adhes.* 1999, 19, 29-34.
94. Copeland, F. Breathable Surgical Adhesive Tapes. U.S. Pat. No. 3,121,021, 1964.
95. Zbigniew Czech; Kowalczyk, A.; Swiderska, J. *Wide Spectra Qual. Control* 2011.
96. Tan, H. S.; Pfister, W. R. *Pharm. Sci. Technol. Today* 1999, 2, 60-69.
97. Prausnitz, M.; Langer, R. *Nat. Biotechnol.* 2008, 26, 1261-1268.
98. Wokovich, A. M.; Prodduturi, S.; Doub, W. H.; Hussain, A. S.; Buhse, L. F. *Eur. J. Pharm. Biopharm.* 2006, 64, 1-8.
99. Subedi, R. K.; Oh, S. Y.; Chun, M. K.; Choi, H. K. *Arch. Pharm. Res.* 2010, 33, 339-351.
100. Hunt, J. Adhesive and Mechanical Fastenener. U.S. Pat. No. 7,780,685 B2, 2010.
101. Grant, R. Adhesive for Attaching Butress Materials to a Surgical Fastening Device. U.S. Pat. No. 6,592,597 B2, 2003.
102. Murray, M. Surgical Fastening Device with Initiator Impregnation of a Matrix or Butress to Improve Adhesive Applications. U.S. Pat. No. 7,708,180 B2, 2010.
103. Shelton, F. Malleable Bioresorbable Polymer Adhesive for Releasably Attaching a Staple Butress to a Surgical Stapler. U.S. Pat. No. 10,172,617 B2, 2019.
104. Shalaby, W. Polyester/Cyanoacrylate Tissue Adhesive Formulations. U.S. Pat. No. 6,299,631 B1, 2001.
105. Gravener, R. Surgical Fastener Applying Aparatus with Resilient Film, 1995.
106. Francis, R. Aparatus and Method for Producing a Reinforced Surgical Fastener Suture Line. U.S. Pat. No. 5,752,965, 1998.
107. Inoue, S.; Koinuma, H.; Tsuruta, T. *J. Polym. Sci. Part B Polym. Lett.* 1969, 7, 287-292.
108. Ren, W. M.; Zhang, X.; Liu, Y.; Li, J. F.; Wang, H.; Lu, X. B. *Macromolecules* 2010, 43, 1396-1402.
109. Taherimehr, M.; Pescarmona, P. P. *J. Appl. Polym. Sci.* 2014, 131, 1-17.
110. Kamphuis, A. J.; Picchioni, F.; Pescarmona, P. P. *Green Chem.* 2019, 21, 406-448.
111. Poland, S. J.; Darensbourg, D. *J. Green Chem.* 2017, 19, 4990-5011.
112. Darensbourg, D. J.; Tsai, F. Te. *Macromolecules* 2014, 47, 3806-3813.
113. Nozaki, K.; Nakano, K.; Hiyama, T. *J. Am. Chem. Soc.* 1999, 121, 11008-11009.
114. Byrne, C. M.; Allen, S. D.; Lobkovsky, E. B.; Coates, G. W. *J. Am. Chem. Soc.* 2004, 126, 11404-11405.
115. Tsai, F.-T.; Wang, Y.; Darensbourg, D. J. *J. Am. Chem. Soc.* 2016, 138, 4626-4633.
116. Lu, X. B.; Ren, W. M.; Wu, G. P. *Acc. Chem. Res.* 2012, 45, 1721-1735.
117. Zhang, H.; Grinstaff, M. W. *J. Appl. Polym. Sci.* 2014, 131, 1-7.
118. Martin, C.; Kleij, A. W. *Macromolecules* 2016, 49, 6285-6295.
119. Beharaj, A.; Ekladious, I.; Grinstaff, M. W. *Angew. Chem. Int. Ed.* 2019, 58, 1407-1411.
120. Zhang, H.; Lin, X.; Chin, S.; Grinstaff, M. W. *J. Am. Chem. Soc.* 2015, 137, 12660-12666.
121. Konieczynska, M. D.; Lin, X.; Zhang, H.; Grinstaff, M. W. *ACS Macro Lett.* 2015, 4, 533-537.
122. Saxby, M. J. In *Food Taints and off-Flavours*; Springer: Boston, Mass., 1996.

All patents and other publications identified in the specification and examples are expressly incorporated herein by reference for all purposes. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow. Further, to the extent not already indicated, it will be understood by those of ordinary skill in the art that any one of the various embodiments herein described and illustrated can be further modified to incorporate features shown in any of the other embodiments disclosed herein.

What is claimed is:

1. A polymer of comprising:
(i) a repeating unit represented by Formula (I); and
(ii) a repeating unit represented by Formula (II)
where:

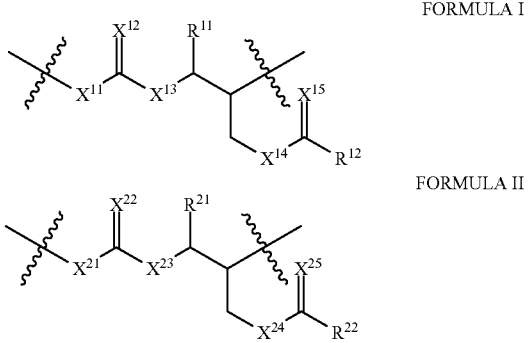

FORMULA I

FORMULA II wherein:
$X^{11}$, $X^{12}$, $X^{13}$, $X^{14}$, $X^{15}$, $X^{21}$, $X^{22}$, $X^{23}$, $X^{24}$ and $X^{25}$ are independently selected from the group consisting of O, S, Se, and NH;

$R^{11}$ and $R^{21}$ are independently hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly(ethylene oxide), poly(hydroxyacid), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, or an ionically crosslinkable group, wherein alkyl, alkenyl, cycloalkyl, aryl, heterocyclyl, heteroaryl, silyl, alkylsilyl, arylsilyl, alkylaryl, and arylalkyl is optionally substituted by one or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen;

$R^{12}$ and $R^{22}$ are independently unsubstituted alkyl; provided that $R^{12}$ and $R^{22}$ are different, and wherein a mol/mol ratio of Formula (I) to Formula (II) is from about 5:95 to about 30:70.

2. The polymer of claim 1, wherein $X^{11}$, $X^{12}$, $X^{13}$, $X^{14}$ and $X^{15}$ are O.

3. The polymer of claim 1, wherein $R^{11}$ is hydrogen or $C_1$-$C_{10}$alkyl, wherein $C_1$-$C_{10}$alkyl is optionally substituted with one, two, three, four, five or six substituents selected independently from the group consisting of hydroxyl, hydroxyether, carboxyl, amino, mono- or di-substituted amino, thiol, thioester, and halogen.

4. The polymer of claim 1, wherein $X^{21}$, $X^{22}$, $X^{23}$, $X^{24}$ and $X^{25}$ are O.

5. The polymer of claim 1, wherein $R^{21}$ is hydrogen or $C_1$-$C_{10}$alkyl, wherein $C_1$-$C_{10}$alkyl is optionally substituted with one, two, three, four, five or six substituents selected independently from the group consisting of hydroxyl, hydroxyether, carboxyl, amino, mono- or di-substituted amino, thiol, thioester, and halogen.

6. A composition comprising a polymer of claim 1.

7. The composition of claim 6, wherein the composition is in form of a solution, polymeric film, sheet, mesh, foam, fiber or particle.

8. An adhesive composition comprising a polymer of claim 1.

9. The adhesive composition of claim 8, wherein the adhesive is pressure-sensitive and/or thermo-responsive.

10. The adhesive composition of claim 8, wherein the adhesive has a minimum peel force of at least 1 N/cm.

11. The adhesive composition of claim 8, wherein the adhesive has a minimum tack strength of at least 20N.

12. A method for bonding at least two sites together, the method comprising applying a polymer of 32 to at least one site and contacting the at least two sites together.

13. The method of claim 12, where at least one site is a biological surface.

14. The method of claim 12, wherein at least one site is a synthetic surface.

15. The method of claim 14, wherein the synthetic surface is a surface of a medical device.

16. A method of forming an adhesive composition, the method comprising preparing an adhesive polymer of claim 1.

17. The polymer of claim 1, wherein $R^{12}$ and $R^{22}$ are independently unsubstituted $C_1$-$C_{10}$ alkyl.

18. The polymer of claim 1, wherein $R^{12}$ and $R^{22}$ are independently methyl, ethyl, propyl, iso-propyl, butyl, but-2-yl, 2-methylpropyl, t-butyl, pentyl or hexyl.

19. The polymer of claim 1, wherein $X^{11}$, $X^{12}$, $X^{13}$, $X^{14}$, $X^{15}$, $X^{21}$, $X^{22}$, $X^{23}$, $X^{24}$ and $X^{25}$ are O; $R^{11}$ and $R^{21}$ are independently hydrogen or $C_1$-$C_{10}$ alkyl; and $R^{12}$ and $R^{22}$ are independently unsubstituted $C_1$-$C_{10}$ alkyl.

20. The polymer of claim 1, wherein $X^{11}$, $X^{12}$, $X^{13}$, $X^{14}$, $X^{15}$, $X^{21}$, $X^{22}$, $X^{23}$, $X^{24}$ and $X^{25}$ are O; $R^{11}$ and $R^{21}$ are independently hydrogen; and $R^{12}$ and $R^{22}$ are independently methyl, ethyl, propyl, iso-propyl, butyl, but-2-yl, 2-methylpropyl, t-butyl, pentyl or hexyl.

21. The polymer of claim 1, wherein more than 50% of adjacent stereocenters in the polymer have the same stereochemistry or greater than 50% of the stereocenters are of the same stereochemistry.

22. The polymer of claim 1, wherein the polymer is prepared by terpolymerization of $CO_2$ with glycidyl esters.

23. A polymer comprising:
(i) a repeating unit represented by Formula (I); and
(ii) a repeating unit represented by Formula (II)
where:

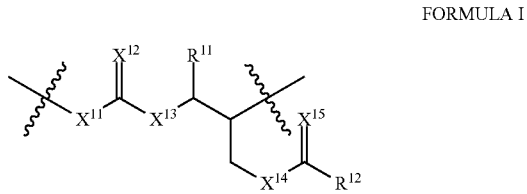

FORMULA I

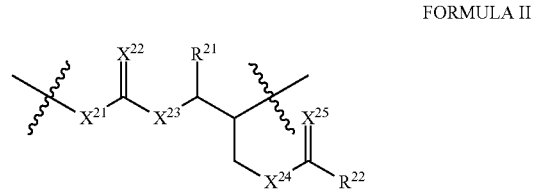

FORMULA II wherein:
$X^{11}$, $X^{12}$, $X^{13}$, $X^{14}$, $X^{15}$, $X^{21}$, $X^{22}$, $X^{23}$, $X^{24}$ and $X^{25}$ are independently selected from the group consisting of O, S, Se, and NH;

$R^{11}$ and $R^{21}$ are independently hydrogen, alkyl, alkenyl, cycloalkyl, aryl, heterocyclyl, heteroaryl, silyl, alkylsilyl, arylsilyl, alkylaryl, arylalkyl, poly(ethylene glycol), poly(ethylene oxide), poly(hydroxyacid), a carbohydrate, a protein, a polypeptide, an amino acid, a nucleic acid, a nucleotide, a lipid, an oligosaccharide, a polysaccharide, an antibody, a pharmaceutical agent, an imaging agent, an epitope for a biological receptor, a photocrosslinkable group, or an ionically crosslinkable group, wherein alkyl, alkenyl, cycloalkyl, aryl, heterocyclyl, heteroaryl, silyl, alkylsilyl, arylsilyl, alkylaryl, and arylalkyl is optionally substituted by one or more substituents selected independently from the group consisting of hydroxyl, hydroxyether, carboxyl, carboxyester, carboxyamide, amino, mono- or di-substituted amino, thiol, thioester, sulfate, phosphate, phosphonate, and halogen;

$R^{12}$ is methyl; and
$R^{22}$ is propyl;
and
wherein:
a mol/mol ratio of Formula (I) to Formula (II) is from about 5:95 to about 45:55.

24. The polymer of claim 23, wherein $X^{11}$, $X^{12}$, $X^{13}$, $X^{14}$ and $X^{15}$ are O.

25. The polymer of claim 23, wherein $R^{11}$ is hydrogen or $C_1$-$C_{10}$alkyl, wherein $C_1$-$C_{10}$alkyl is optionally substituted with one, two, three, four, five or six substituents selected independently from the group consisting of hydroxyl, hydroxyether, carboxyl, amino, mono- or di-substituted amino, thiol, thioester, and halogen.

26. The polymer of claim 23, wherein $X^{21}$, $X^{22}$, $X^{23}$, $X^{24}$ and $X^{25}$ are O.

27. The polymer of claim 23, wherein $R^{21}$ is hydrogen or $C_1$-$C_{10}$alkyl, wherein $C_1$-$C_{10}$alkyl is optionally substituted with one, two, three, four, five or six substituents selected independently from the group consisting of hydroxyl, hydroxyether, carboxyl, amino, mono- or di-substituted amino, thiol, thioester, and halogen.

28. The polymer of claim 23, wherein $X^{11}$, $X^{12}$, $X^{13}$, $X^{14}$, $X^{15}$, $X^{21}$, $X^{22}$, $X^{23}$, $X^{24}$ and $X^{25}$ are O; and $R^{11}$ and $R^{21}$ are independently hydrogen or $C_1$-$C_{10}$ alkyl.

29. The polymer of claim 23, wherein $X^{11}$, $X^{12}$, $X^{13}$, $X^{14}$, $X^{15}$, $X^{21}$, $X^{22}$, $X^{23}$, $X^{24}$ and $X^{25}$ are O; and $R^{11}$ and $R^{21}$ are independently hydrogen.

30. The polymer of claim 23, wherein more than 50% of adjacent stereocenters in the polymer have the same stereochemistry or greater than 50% of the stereocenters are of the same stereochemistry.

* * * * *